United States Patent
Kobayashi

(10) Patent No.: US 11,282,265 B2
(45) Date of Patent: Mar. 22, 2022

(54) IMAGE PROCESSING APPARATUS AND IMAGE PROCESSING METHOD FOR TRANSMITTING DATA OF A 3D MODEL

(71) Applicant: SONY CORPORATION, Tokyo (JP)

(72) Inventor: Goh Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 16/623,878

(22) PCT Filed: Jun. 15, 2018

(86) PCT No.: PCT/JP2018/022858
§ 371 (c)(1),
(2) Date: Dec. 18, 2019

(87) PCT Pub. No.: WO2019/003953
PCT Pub. Date: Jan. 3, 2019

(65) Prior Publication Data
US 2021/0142551 A1    May 13, 2021

(30) Foreign Application Priority Data
Jun. 29, 2017    (JP) .............................. JP2017-127550

(51) Int. Cl.
*G06T 15/04*    (2011.01)
*G06T 15/20*    (2011.01)
*G06T 17/20*    (2006.01)

(52) U.S. Cl.
CPC .............. *G06T 15/20* (2013.01); *G06T 15/04* (2013.01); *G06T 17/20* (2013.01)

(58) Field of Classification Search
CPC ......... G06T 15/20; G06T 17/20; G06T 17/10; G06T 15/04
See application file for complete search history.

(56) References Cited

U.S. PATENT DOCUMENTS 8,885,020 B2 * 11/2014 Kuno .................... H04N 13/366
348/46
2009/0303507 A1 * 12/2009 Abeloe ................... B33Y 30/00
358/1.9

(Continued)

FOREIGN PATENT DOCUMENTS

JP        2002-157603 A      5/2002
JP        2008-504596 A      2/2008

(Continued)

OTHER PUBLICATIONS

Koyama et al., Real Time Transmission and Display of 3D Video in a Large-Scale Space, IEICE Technical Report, May 23, 2003, pp. 61-66, vol. 103 No. 96, The Institute of Electronics, Information and Communication Engineers.

*Primary Examiner* — Said Broome
(74) *Attorney, Agent, or Firm* — Paratus Law Group, PLLC

(57) ABSTRACT

There is provided an image processing apparatus and an image processing method capable of transmitting data of a 3D model in object units. The image processing apparatus includes a 3D model selection unit that selects an object that satisfies a predetermined condition from among objects of a plurality of 3D models and a transmitter that transmits 3D model data of the selected object. The present technology is applied to, for example, an apparatus and the like for transmitting 3D model data of a 3D model via a network.

21 Claims, 46 Drawing Sheets

(56) References Cited

U.S. PATENT DOCUMENTS

2013/0321593 A1    12/2013  Kirk et al.
2016/0055266 A1*   2/2016   Tomono .................. G06F 30/00
                                                        703/1

FOREIGN PATENT DOCUMENTS

JP          2015-114716 A    6/2015
WO    WO 2016/086266 A1     6/2016

* cited by examiner

FIG. 3

```
ply
format ascii 1.0
element vertex 91 721
property float x
property float y
property float z
element face 179999
property list uchar int vertex_indices
end_header
17972.1 2872.51 -4.46783
17979.4 2870.08 -4.60881
17976.3 2870.63 -5.29425
17987.2 2868.07 -3.55248
17991.5 2866.42 -4.31194
17995.5 2866.64 -3.9358
17959.8 2879.55 -5.84194
17945.5 2876.76 -0.35964
17962.1 2877 -5.23317
          :
          :
```

| OBJECT ID | GLOBAL POSITION INFORMATION |
|---|---|
| 0 | |
| 1 | |
| 2 | |
| 3 | |
| 4 | |
| 5 | |

B

| Bounding box | VALUE |
|---|---|
| xmin | |
| xmax | |
| ymin | |
| ymax | |
| zmin | |
| zmax | |

*FIG. 11*

SPECIFIED BY REPRODUCTION SIDE

| OBJECT ID |
|---|
| 1 |
| 3 |
| 5 |

ALL OBJECTS

| OBJECT ID | GEOMETRY INFORMATION | COLOR INFORMATION |
|---|---|---|
| 0 | | |
| 1 | | |
| 2 | | |
| 3 | | |
| 4 | | |
| 5 | | |

AFTER SELECTION

| OBJECT ID | GEOMETRY INFORMATION | COLOR INFORMATION |
|---|---|---|
| 1 | | |
| 3 | | |
| 5 | | |

```
<crop_info>
    <normOffsetX>0.05</normOffset>
    <occupancyX>0.5</occupancyX>
    <normOffsetY>0.01</normOffsetY>
    <occupancyY>0.5</occupancyY>
</crop_info>
```

FIG. 34

```
<crop_info>
    <normOffsetX>0.33</normOffset>
    <occupancyX>0.33</occupancyX>
    <normOffsetY>0.8</normOffsetY>
    <occupancyY>0.2</occupancyY>
</crop_info>
<camera_id>1</crop_info>
```

```
<raw>4</raw>
<column>3</column>
<camera_id>2,1,4,
              3,6,7,
              5,8,10,
              12,11,9
</camera_id>
```

| OBJECT ID | offsetX | rangeX | offsetY | rangeY | zmin | zmax |
|---|---|---|---|---|---|---|
| 0 | | | | | | |
| 1 | | | | | | |
| 2 | | | | | | |
| 3 | | | | | | |
| 4 | | | | | | |
| 5 | | | | | | |

IMAGE PROCESSING APPARATUS AND IMAGE PROCESSING METHOD FOR TRANSMITTING DATA OF A 3D MODEL

CROSS REFERENCE TO PRIOR APPLICATION

This application is a National Stage Patent Application of PCT International Patent Application No. PCT/JP2018/022858 (filed on Jun. 15, 2018) under 35 U.S.C. § 371, which claims priority to Japanese Patent Application No. 2017-127550 (filed on Jun. 29, 2017), which are all hereby incorporated by reference in their entirety.

TECHNICAL FIELD

The present technology relates to an image processing apparatus and an image processing method, and particularly, to an image processing apparatus and an image processing method capable of transmitting data of a 3D model in object units.

BACKGROUND ART

In computer graphics, as a measure to reduce a processing load of a local terminal, there is a method called frustum culling that renders only a model in a frustum displayed on a display. A technology using this frustum culling method for a server client system has been proposed (for example, refer to Patent Document 1).

CITATION LIST

Patent Document

Patent Document 1: US 2013/321593 A1

SUMMARY OF THE INVENTION

Problems to be Solved by the Invention

However, it is not considered to transmit the 3D model in object units when the 3D model is transmitted.

The present technology has been made in consideration of such a situation and capable of transmitting data of a 3D model in object units.

Solutions to Problems

An image processing apparatus according to a first aspect of the present technology includes a 3D model selection unit that selects an object that satisfies a predetermined condition from among objects of a plurality of 3D models and a transmitter that transmits 3D model data of the selected object.

An image processing method according to the first aspect of the present technology includes steps of, by an image processing apparatus, selecting an object that satisfies a predetermined condition from among objects of a plurality of 3D models and transmitting 3D model data of the selected object.

In the first aspect of the present technology, the object that satisfies the predetermined condition is selected from among the objects of the plurality of 3D models, and the 3D model data of the selected object is transmitted.

An image processing apparatus according to a second aspect of the present technblogy includes a receiver that receives 3D model data of an object selected as the object that satisfies a predetermined condition from among the objects of a plurality of 3D models and a drawing unit that generates a display image of the object from a point of view of a virtual camera on the basis of the received 3D model data of the object.

An image processing method according to the second aspect of the present technology includes steps of, by an image processing apparatus, receiving 3D model data of an object selected as the object that satisfies a predetermined condition from among objects of a plurality of 3D models and generating a display image of the object from a point of view of a virtual camera on the basis of the received 3D model data of the object.

In the second aspect of the present technology, the 3D model data of the object selected as the object that satisfies the predetermined condition is selected from among the objects of a plurality of 3D models and the display image of the object from the point of view of the virtual camera is generated on the basis of the received 3D model data of the object.

Note that the image processing apparatus according to the first and second aspects of the present technology can be realized by causing a computer to execute a program.

Furthermore, the program executed by the computer to realize the image processing apparatus according to the first and second aspects of the present technology can be provided by transmitting the program via a transmission medium or recording the program in a recording medium.

Note that the program can be provided by transmitting the program via a transmission medium or recording the program in a recording medium.

Note that the image processing apparatus may be an independent device or an internal block forming a single device.

Effects of the Invention

According to a first aspect of the present technology, data of a 3D model can be transmitted in object units.

According to a second aspect of the present technology, the data of the 3D model transmitted in object units can be received and displayed.

Note that the effects described herein are not necessarily limited and that the effect may be any effects described in the present disclosure.

BRIEF DESCRIPTION OF DRAWINGS

FIG. 3 is a diagram of an example of geometry information in a point cloud format.

FIG. 10 is a diagram for explaining object specification information in the second embodiment.

FIG. 11 is a diagram for explaining processing by of a 3D model selection unit in FIG. 9.

FIG. 34 is a diagram of a specific example of packing area metadata.

MODE FOR CARRYING OUT THE INVENTION

Embodiments for carrying out the present technology (referred to as embodiment below) will be described below. Note that, the description will be made in the following order.

1. Outline of Embodiments
2. Exemplary Configuration of Image Processing System
3. First Embodiment of Selection Device (Selection Device 24A)
4. Second Embodiment of Selection Device (Selection Device 24B)
5. Third Embodiment of Selection Device (Selection Device 24C)
6. Fourth Embodiment of Selection Device (Selection Device 24D)
7. Fifth. Embodiment of Selection Device (Selection Device 24E)
8. Sixth Embodiment of Selection Device (Selection Device 24F)
9. Seventh Embodiment of Selection Device (Selection Device 24G)
10. Distribution Processing And Reproduction Processing
11. Exemplary Configuration of Computer
12. Application example 1. Outline of Embodiments First, an outline of an image processing system to which the present technology is dpplied will be described with reference to FIGS. 1 and 2.

The image processing system to which the present technology is applied includes a distribution side that generates a 3D model of an object from a captured image obtained by imaging the object by a plurality of imaging devices and distributes the generated 3D model and a reproduction side that receives the 3D model transmitted from the distribution side and reproduces and displays the 3D model.

The distribution side can obtain a plurality of captured images by imaging a predetermined imaging space from the outer periphery by the plurality of imaging devices. The captured image includes, for example, a moving image. Each imaging device includes a distance measuring device and can measure a distance to a subject in addition to texture information of the subject. Then, by using the captured images obtained from the plurality of imaging devices in different directions, 3D models of plural objects to be displayed in the imaging space are generated. The generation of the 3D model of the object is referred to as reconstruction of the 3D model because the texture information and the distance information of the overlapping area of the same object are combined from the plurality of captured images and the distance information obtained by the plurality of imaging devices or texture information and distance information of an area that cannot be viewed by a single imaging device are reconstructed by supplementing the texture information and the distance information obtained by the other imaging device.

Figure 1:
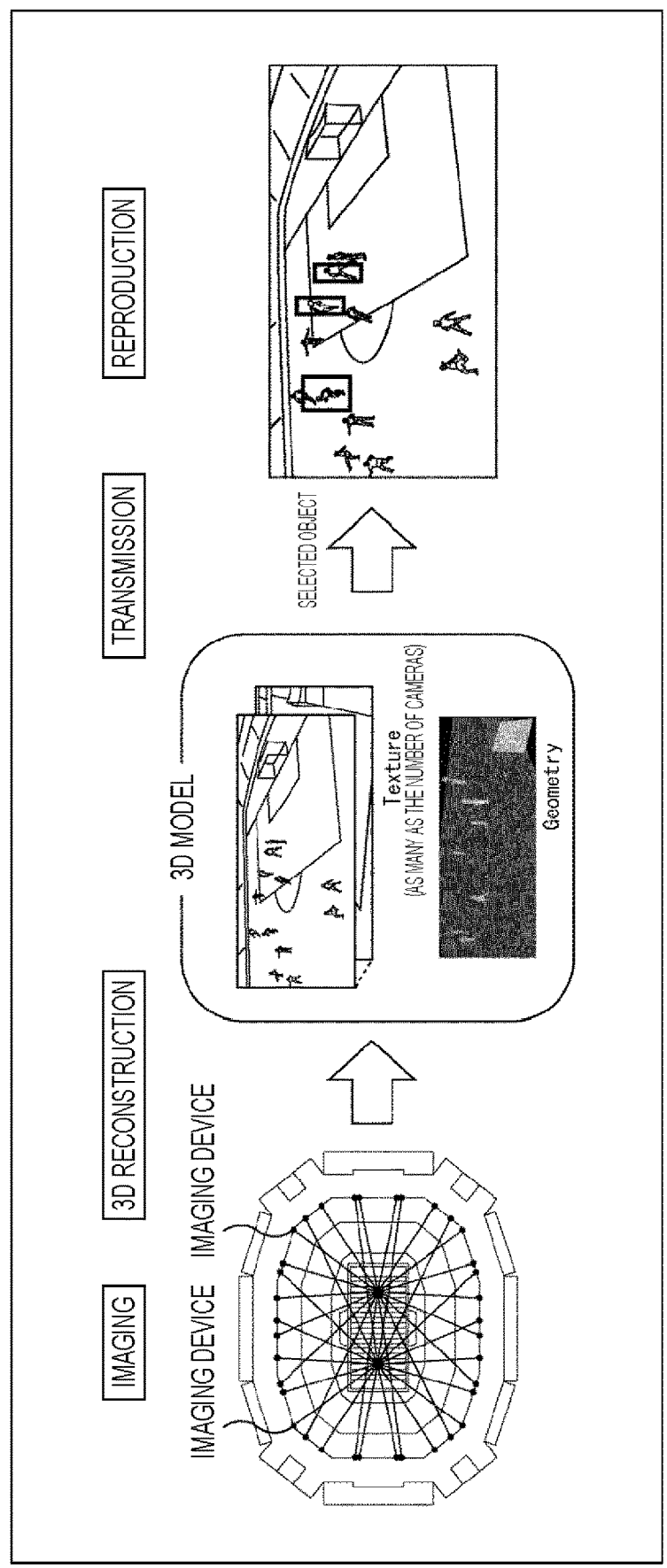
FIG. 1 is a diagram for explaining an outline of an image processing system to which the present technology is applied.

In the example in FIG. 1, an example is illustrated in which the imaging space is set in a field of a soccer stadium, and a plurality of imaging devices provided on a stand side that is an outer periphery of the field images players and the like on the field. By reconstructing the 3D models, for example, players, a referee, a soccer ball, a soccer goal, and the like on the field are extracted as objects, and a 3D model of each object is generated (reconstructed).

Data of the generated 3D models of a large number of objects (referred to as 3D model data below) is stored in a predetermined storage device. A data format of the 3D model data will be described later with reference to FIG. 2.

Then, a 3D model of a predetermined object from among a large number of objects existing in the imaging space stored in the predetermined storage device is transmitted in response to a request of the reproduction side, and the reproduction side reproduces and displays the 3D model.

The reproduction side requests only the object to be viewed from among a large number of objects existing in the imaging space and displays the object on a display device. For example, the reproduction side assumes a virtual camera of which an imaging range is a viewing range of a viewer, requests only an object captured by the virtual camera from among a large number of objects existing in the imaging space, and displays the object on the display device. A point of view of the virtual camera can be set to an arbitrary position so that the viewer can see the field from an arbitrary point of view in the real world.

In the example in FIG. 1, only three players surrounded by squares from among a large number of players as the generated objects are displayed on the display device.

Figure 2:
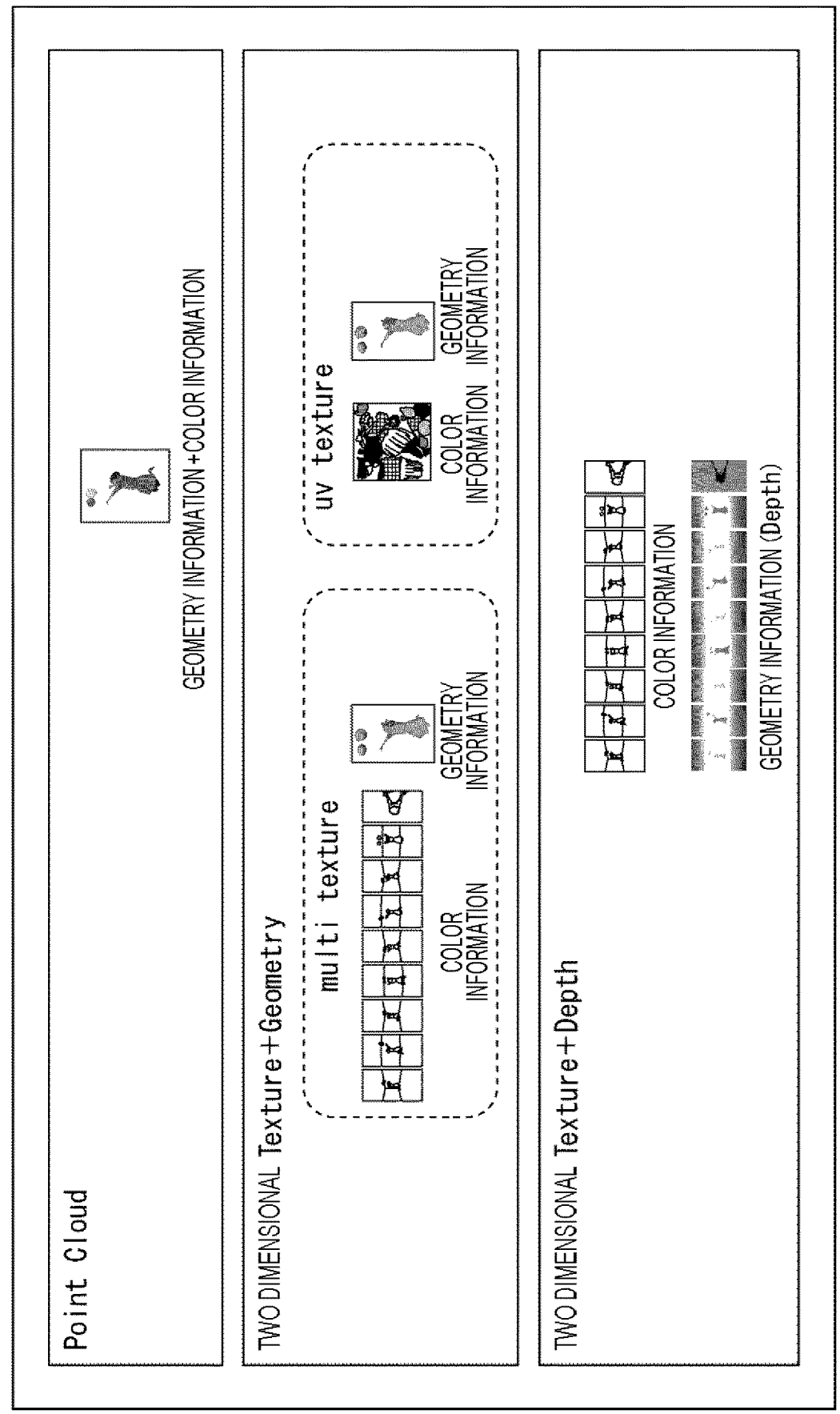
FIG. 2 is a diagram for explaining an outline of an image processing system to which the present technology is applied.

In FIG. 2, an example of the data format of the 3D model data is illustrated.

Various formats may be used as the data format of the 3D model data.

One of data formats is a format that represents geometry information (shape information) of the object as a set (point group) of points (vertex) of three dimensional positions of the objects and holds color information of the object corresponding to each point. In this format, a single piece of geometry information and a single piece of color information are held for one object. In the present embodiment, this format is described as a point cloud format.

FIG. 3 illustrates an example of the geometry information in the point cloud format.

In an area indicated by a broken iine in FIG. 3, three pieces of data corresponding to the x coordinate, the y coordinate, and the z coordinate of one point of the object are listed for each row.

Another data format is a format in which the geometry information of the object is represented by a set of points (point group) sjmilar to that in the point cloud format or a connection between vertices referred to as polygon meshes and the color information of the object is held by the captured image imaged by each imaging device (two-dimensional texture image). In this format, a single piece of the geometry information and the color information including the captured images (two-dimensional texture image) as many as the number of imaging devices are held for one object. In the present embodiment, this format is described as a multi-texture geometry format.

Still another data format is a format in which the geometry information of the object is represented by the polygon meshes, and the color information of the object is held in correspondence with each polygon mesh. The two-dimensional texture image as the color information to be attached to each polygon mesh is expressed by a UV coordinate system. In this format, a single piece of the geometry information and the color information including the single two-dimensional texture image are held for one object. In the present embodiment, this format is described as a UV texture geometry format. The UV texture geometry format is a format standardized by MPEG-4 Animation Framework eXtension (AFX).

Yet another data format is a format in which the geometry information of the object is represented by distance information corresponding to the captured image imaged by each imaging device and the color information of the object is held as the captured image imaged by each imaging device (two-dimensional texture image). As the distance information corresponding to the captured image imaged by each imaging device, a depth image is adopted that stores a distance to the subject in a depth direction as a depth value in association with each pixel of the captured image. In this format, the geometry information including the depth images as many as the number of imaging devices and the color information including the captured images as many as the number of imaging devices (two-dimensional texture image) are held for one object. In the present embodiment, this format is described as a multi-texture depth format. An advantage of the multi-texture depth format is that the Advanced Video Coding (NYC) method, the High Efficiency Video Coding (HEVC) method, or the like can be used as an encoding method in a case where the 3D model data is transmitted and the 3D model data can be compressed with high efficiency.

The point cloud format and the UV texture geometry format are View Independent formats of which the color information is the same regardless of the position of the virtual camera (virtual point of view).

On the other hand, the multi-texture geometry format and the multi-texture depth format are View Dependent formats in which the color information may change according to the position of the virtual camera (virtual point of view).

An arbitrary data format is adopted from among various data formats of the 3D model data as described above. The reproduction side may specify the data format, and the distribution side may determine the data format. Furthermore, the data format may be determined in advance for each application.

2. Exemplary Configuration of Image Processing System

Figure 4:
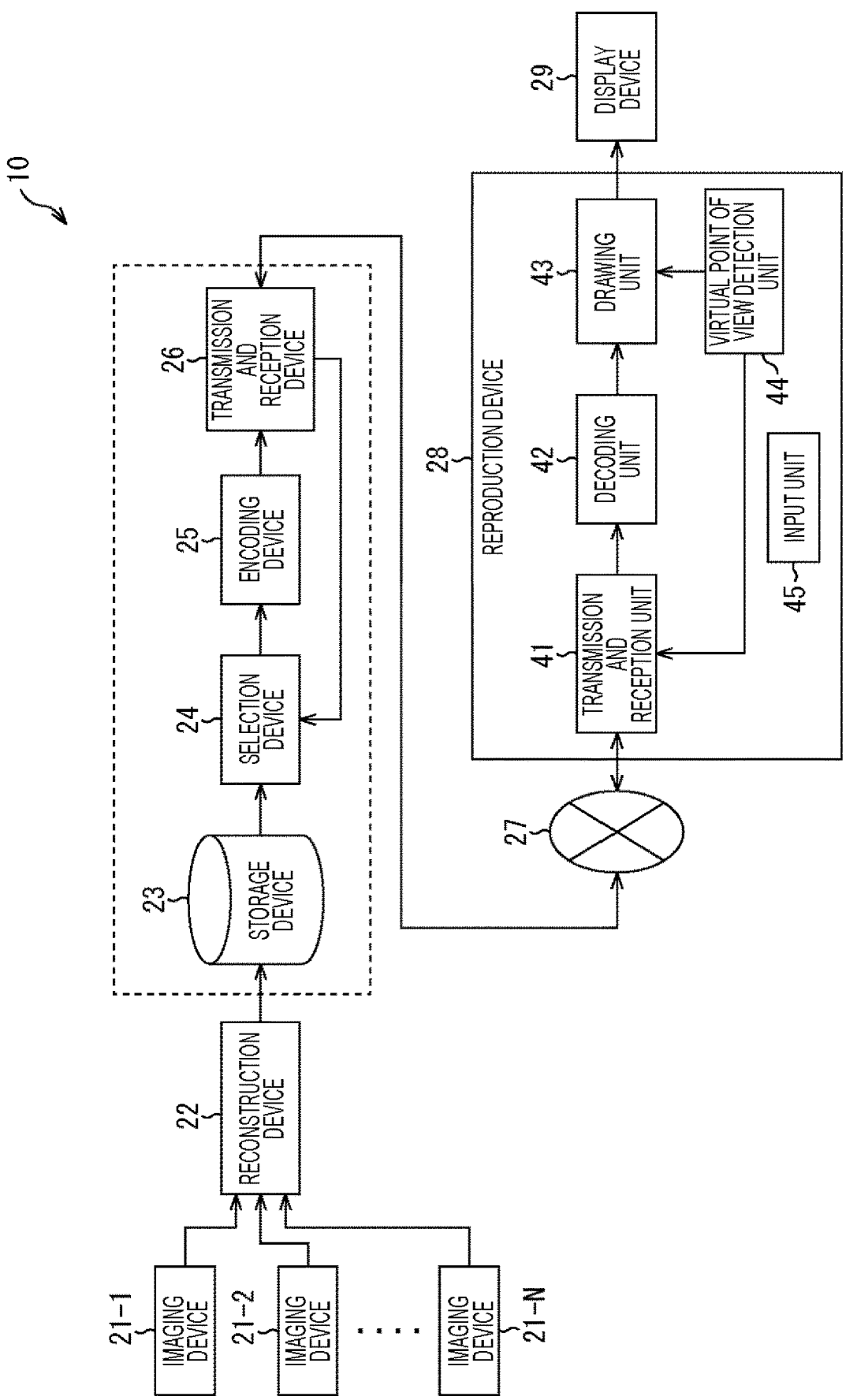
FIG. 4 is a block diagram of an exemplary configuration of the image processing system to which the present technology is applied.

FIG. 4 is a block diagram of an exemplary configuration of an image processing system to which the present technology is applied.

An image processing system 10 in FIG. 4 includes imaging devices 21-1 to 21-N (N>1), a reconstruction device 22, a storage device 23, a selection device 24, an encoding device 25, and a transmission and reception device 26 as the distribution side described in FIG. 1.

Furthermore, the image processing system. 10 includes a reproduction device 28 and a display device 29 as the reproduction side described in FIG. 1. The transmission and reception device 26 on the distribution side and the reproduction device 28 on the reproduction side are connected via a network 27.

The imaging device 21 (imaging devices 21-1 to 21-N) is arranged at a predetermined position on the outer periphery of a predetermined imaging space, images the imaging space, and supplies a moving image obtained as a result of imaging to the reconstruction device 22. In the following description, a case will be described where the number of imaging devices 21 is seven as an example, unless otherwise stated.

The imaging device 21 includes a distance measuring device, can measure a distance to the subject in addition to a texture image (texture information) of the subject, generates a moving image of a depth image from a point of view same as that of the texture image, and supplies the moving image to the reconstruction device 22.

The respective imaging devices 21-1 to 21-N are arranged at different positions and image the imaging space from a directon different from that of the other imaging devices 21. A position of each imaging device 21 on the world coordinate system is known, and a camera parameter (external parameter and internal parameter) of each imaging device 21 is supplied to the reconstruction device 22.

The reconstruction device 22 generates a 3D model for each object regarding a large number of objects existing in the imaging space by using the texture image and the moving image of the depth image in the imaging space supplied from each of the imaging devices 21-1 to 21-N and supplies data of the generated 3D model of each object (referred to as 3D model data below) to the storage device 23.

The storage device 23 stores the 3D model data of each object generated by the reconstruction device 22.

In the storage device 23, the 3D model data of each object may be stored in all the formats including the point cloud format, the UV texture geometry format, the multi-texture geometry format, and the multi-texture depth format described with reference to FIG. 2. In a case where the data format is specified by an application of the image processing system 10, the 3D model data is stored at least in the specified data format.

In the present embodiment, any one of the subjects in the imaging space that appear in the moving images imaged by the plurality of imaging devices 21 may be used as a target object of which a 3D model is generated. The object may be determined with any method, and a predetermined subject in the moving image is determined as an object and appropriately separated from the other objects, and the 3D model thereof is generated.

Furthermore, the reconstruction device 22 calculates global position information (referred to as global position information below) of each object, of which the 3D model data is generated, from the camera parameter of each imaging device 21 and makes the storage device 23 store the calculated information together with the camera parameter of each imaging device 21.

In other words, in the present embodiment, it is assumed that the 3D models of the plural objects that may be transmitted to the reproduction device 28 be appropriately separated for each object and the position on the world coordinate system be stored in the storage device 23 in a known state.

The selection device 21 selects a predetermined object from among the plurality of objects stored in the storage device 23 on the basis of object specification information made by specifying a predetermined object by the reproduction device 28 and supplies the 3D model data of the selected object to the encoding device 25. The object specification information is received by the transmission and reception device 26 from the reproduction device 28 via the network 27 and is supplied from the transmission and reception device 26 to the selection device 24.

The encoding device 25 encodes the 3D model data of the predetermined object supplied from the selection device 24, for example, with a predetermined encoding method such as the AVC method and the HEVC method. An encoded stream of the 3D model obtained by encoding is supplied to the transmission and reception device 26.

The transmission and reception device 26 transmits the encoded stream of the 3D model supplied from the encoding device 25 to the reproduction device 28 via the network 27. Furthermore, the transmission and reception device 26 receives (acquires) the object specification information transmitted from the reproduction device 28 via the network 27 and supplies the received information to the selection device 24.

Note that the reconstruction device 22, the storage device 23, the selection device 24, the encoding device 25, and the transmission and reception device 26 on the distribution side may be individually formed, and two or more devices may be integrated. For example, as indicated by a broken line in FIG. 4, the storage device 23, the selection device 24, the encoding device 25, and the transmission and reception device 26 may form a single distribution device. In this case, the storage device 23, the selection device 24, the encoding device 25, and the transmission and reception device 26 respectively configure a storage unit, a selection unit, an encoding unit, and a transmission and reception unit of the distribution device.

The network 27 is, for example, the Internet, a telephone line network, a satellite communication network, various Local Area Networks (LAN) including the Ethernet (registered trademark), Wide Area Network (WAN), a dedicated line network such as Internet Protocol-Virtual Private Network (IP-VPN), and the like.

The reproduction device 28 includes a transmission and reception unit 41, a decoding unit 42, a drawing unit 43, a virtual point of view detection unit 44, and an input unit 45.

The transmission and reception unit 41 of the reproduction device 28 receives (acquires) the encoded stream obtained by encoding the 3D model data of each object supplied from the transmission and reception device 26 and supplies the encoded stream to the decoding unit 42. Furthermore, the transmission and reception unit 41 acquires the object specification information for specifying the predetermined object from the virtual point of view detection unit 44 and transmits the object specification information to the transmission and reception device 26 via the network 27.

The decoding unit 42 decodes the encoded stream supplied from the transmission and reception unit 41 with a method corresponding to the encoding method of the encoding device 25. The decoding unit 42 supplies the 3D model data of one or more objects obtained by decoding to the drawing unit 43.

The drawing unit 43 generates an image of the object (object image) from the point of view of the virtual camera as a display image on the basis of the 3D model data of one or more objects supplied from the decoding unit 42 and supplies the display image to the display device 29. The virtual point of view detection unit 44 supplies virtual camera viewing range information indicating a viewing range based on the point of view of the virtual camera to the drawing unit 43, and the image of the object from the point of view of the virtual camera is generated by performing perspective projection on the 3D model of one or more objects supplied from the decoding unit 42 in the viewing range of the virtual camera.

The virtual point of view detection unit 44 detects the point of view of the virtual camera, generates the virtual camera viewing range information indicating the viewing range based on the point of view of the virtual camera, and supplies the information to the drawing unit 43. Furthermore, the virtual point of view detection unit 44 generates the object specification information for specifying one or more objects existing in the viewing range of the virtual camera and supplies the generated information to the transmission and reception unit 41. The virtual point of view detection unit 44 may detect a viewing position and the viewing range of the viewer by imaging a marker and the like attached to a head mount display as the display device 29.

The input unit 45 includes an input device such as a controller and a mouse. The input unit 45 receives, for example, an instruction of the viewing position by the viewer, specification of the object, to be displayed, and the like. Various input information received by the input unit 45 is supplied to each unit in the reproduction device 28 as necessary.

The display device 29 includes, for example, a two-dimensional head mount display (HMD), a two-dimensional monitor, and the Like. The display device 29 two-dimensionally displays the display image supplied from the drawing unit 43.

Note that the display device 29 may include a three-dimensional head mount display, a three-dimensional monitor, and the like. In this case, the drawing unit 43 supplies the depth image in addition to the display image, and the display device 29 three-dimensionally displays the display image on the basis of the display image and the depth image supplied from the drawing unit 43.

In the image processing system 10 configured as described above, the selection device 24 selects only an object that satisfies a predetermined condition from among all the objects included in the imaging space stored in the storage device 23 and transmits 3D model data of the selected object to the reproduction device 28.

The reproduction device 2$ acquires the 3D model data of the object that satisfies the predetermined condition of all the objects included in the imaging space stored in the storage device 23, generates an object image on the basis of the acquired 3D model data of the object, and makes the display device 29 display the object image.

By transmitting only the 3D model data of the object necessary for display among all the objects included in the imaging space by the distribution side and the reproduction side, it is possible to reduce a processing load of the reproduction side and reduce a transmission band while securing image quality of the object image viewed by the viewer.

Note that, here, only video information will be described as transmission data to be transmitted from the distribution side to the reproduction side, and description regarding voice information is omitted.

However, voice information corresponding to the moving image is also transmitted.

Hereinafter, various configurations that may be used as the selection device 24 will be described in detail.

3. First Embodiment of Selection Device (Exemplary Configuration of Selection Device)

Figure 5:
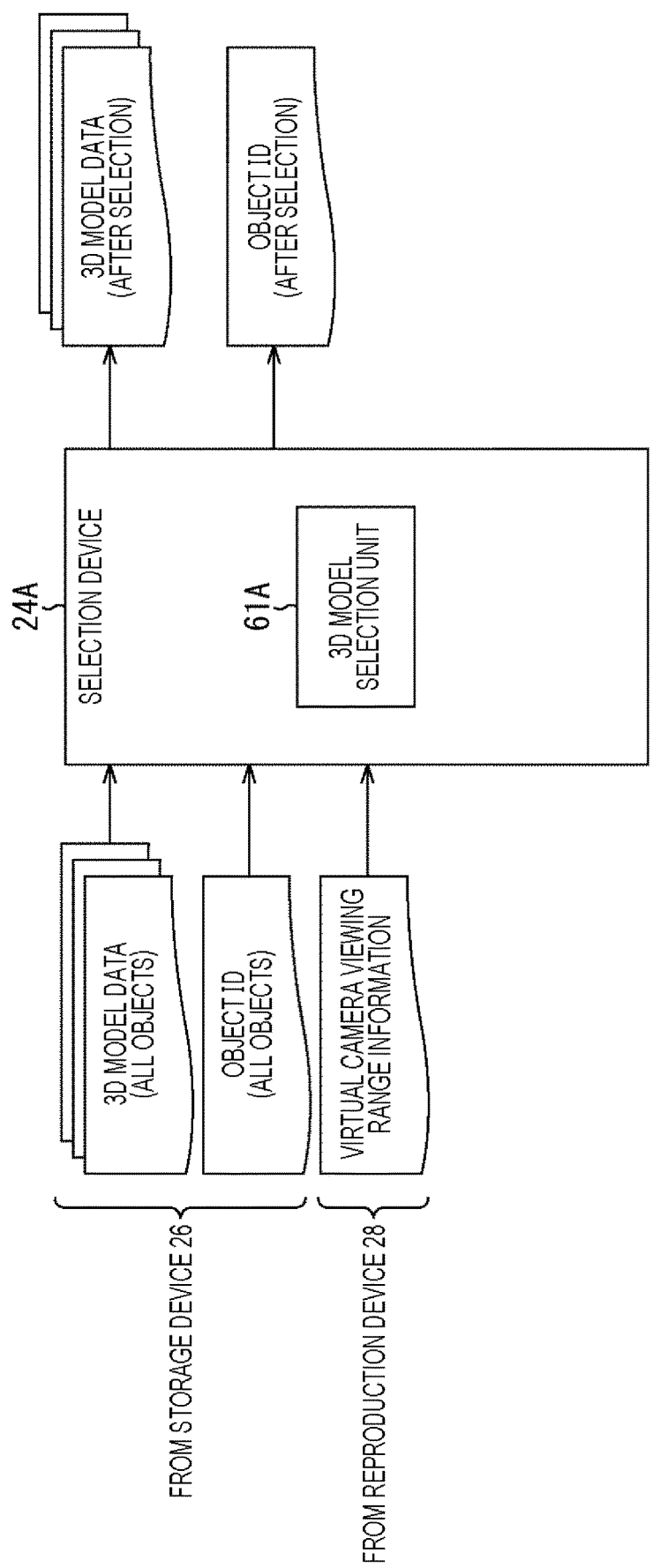
FIG. 5 is a block diagram of an exemplary configuration of a first embodiment of a selection device.

FIG. 5 illustrates an exemplary configuration of a selection device 24A as a first embodiment of the selection device 24.

The selection device 24A includes a 3D model selection unit 61A.

In the selection device 24A, one or both of the point cloud format and the UV texture geometry format are applied as the data format of the 3D model data.

To the selecton device 24A, object IDs that are identification information for identifying each object and 3D model data of all the objects stored in the storage device 23 are supplied as input data.

Since the data format of the 3D model data is one or both of the point cloud format and the UV texture geometry format, the 3D model data is one or both of the geometry information represented by a set of points (point group) and the color information for each point and the geometry information represented by the polygon meshes and the color information of each polygon mesh.

Furthermore, the selection device 24A receives the virtual camera viewing range information that is supplied from the reproduction device 28 as the object specification information and that is information regarding the viewing range based on the point of view of the virtual camera. The virtual camera viewing range information includes, for example, the external parameter and the internal parameter of the virtual camera, Near information indicating a front ciippng plane of a frustum and Far information indicating a rear clipping plane of a frustum.

Figure 6:
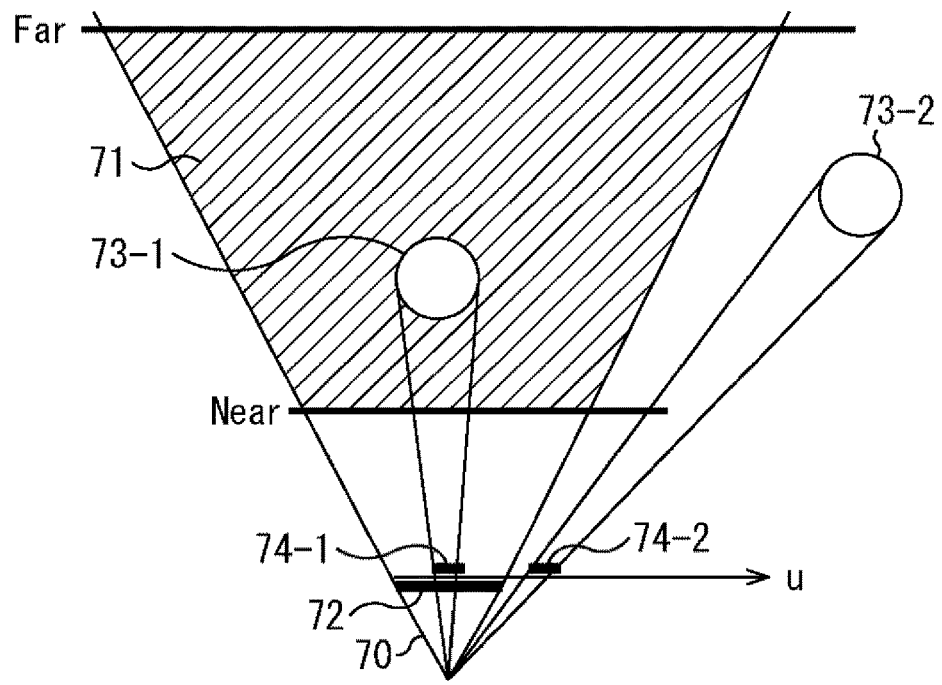
FIG. 6 is a aiagram for explaining processing of a 3D model selection unit in FIG. 5.

As illustrated in FIG. 6, the 3D model selection unit 61A determines whether or not each of all the objects stored in the storage device 23 is included in a viewing range of a virtual camera 70, specifically, a frustum 71 indicated by hatching on the basis of the virtual camera viewing range information supplied from the reproduction device 28 and selects (determine) an object of a 3D model to be transmitted.

More specfically, the 3D model selection unit 61A projects vertex information of each vertex included in the object on an image plane 72 of the virtual camera 70, and in a case where at least one of the UV coordinates corresponding to the vertex information is included in the image plane 72 of the virtual camera 70, the 3D model selection unit 61A determines the object as the object of which the 3D model data is transmitted to the reproduction device 28. On the other hand, in a case where all the UV coordinates corresponding to the vertex information of each vertex are not included in the image plane 72 of the virtual camera 70, the object is determined as the object of which the 3D model data is not transmitted to the reproduction device 28.

In the example in FIG. 6, since a projection plane 74-1 on which an object 73-1 is projected is included in the image plane 72 of the virtual camera 70, the object 73-1 is determined as the object to be transmitted.

Since a projection plane 74-2 on which an object 73-2 is projected is not included in the image plane 72 of the virtual camera 70, the object 73-2 is determined as the object that is not transmitted. The image plane 72 of the virtual camera 70 is represented by a UV coordinate system.

The 3D model selection unit 61A outputs an object ID and 3D model data of the object selected as the object of the 3D model to be transmitted to the reproduction device 28 to the encoding device 25 as output data.

Note that, when processing for projecting the information regarding all the vertices of each object on the image plane 72 of the virtual camera 70 is executed on all the objects stored in the storage device 23, a processing load is large.

Therefore, for example, a representative value of the global position information of each object is calculated in advance and is stored in the storage device 23, and only the representative value is projected on the image plane 72 of the virtual camera 70. Then, it may be determined whether or not the object is the object of the 3D model to be transmitted. As the representative value of the global position information of the object, for example, as average value of the information regarding all the vertices of the object and the like can be used.

Figure 7:
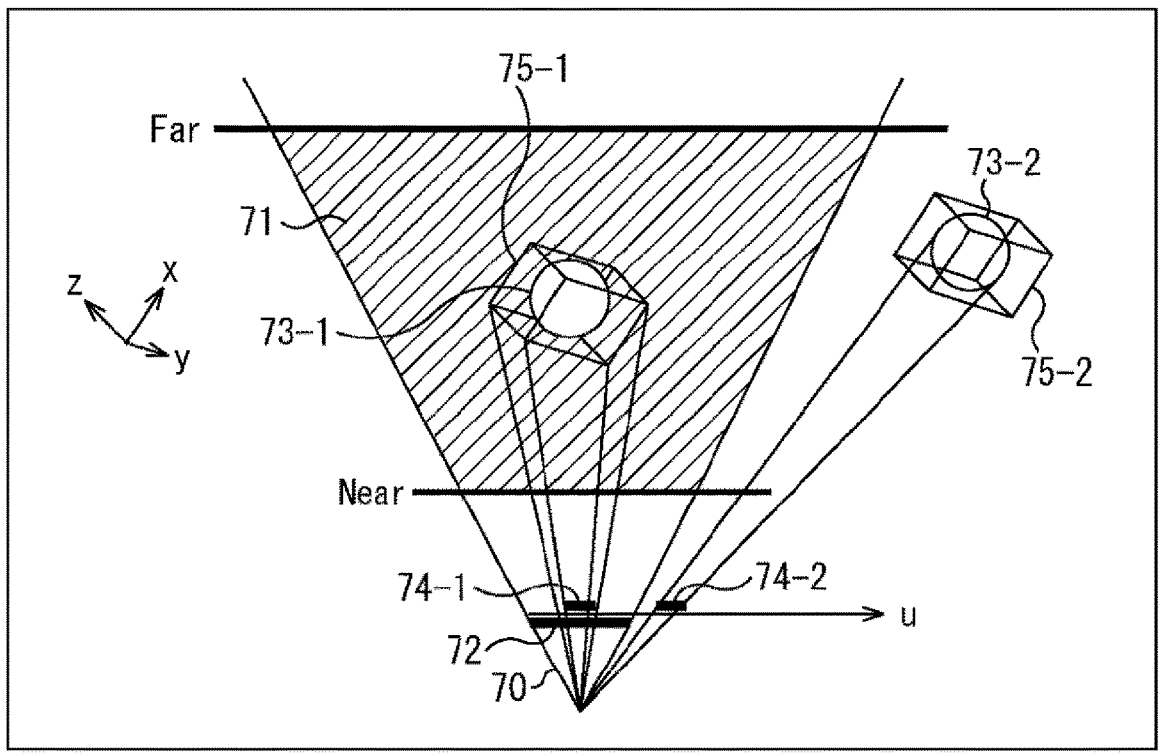
FIG. 7 is a diagram for explaining the processing by the 3D model selection unit in FIG. 5.

Alternatively, as illustrated in FIG. 7, as the representative value of the global position information of each object, a bounding box is calculated for each object in advance and is stored in the storage device 23, and the vertex of the bounding box is projected on the image plane 72 of the virtual camera 70. Then, it may be determined whether or not the object is the object of the 3D model to be transmitted.

FIG. 7 illustrates an example in which a bounding box 75-1 of the object 73-1 and a bounding box 75-2 of the object 73-2 are projected on the image plane 72 of the virtual camera 70.

(First Object Selection Processing)

Figure 8:
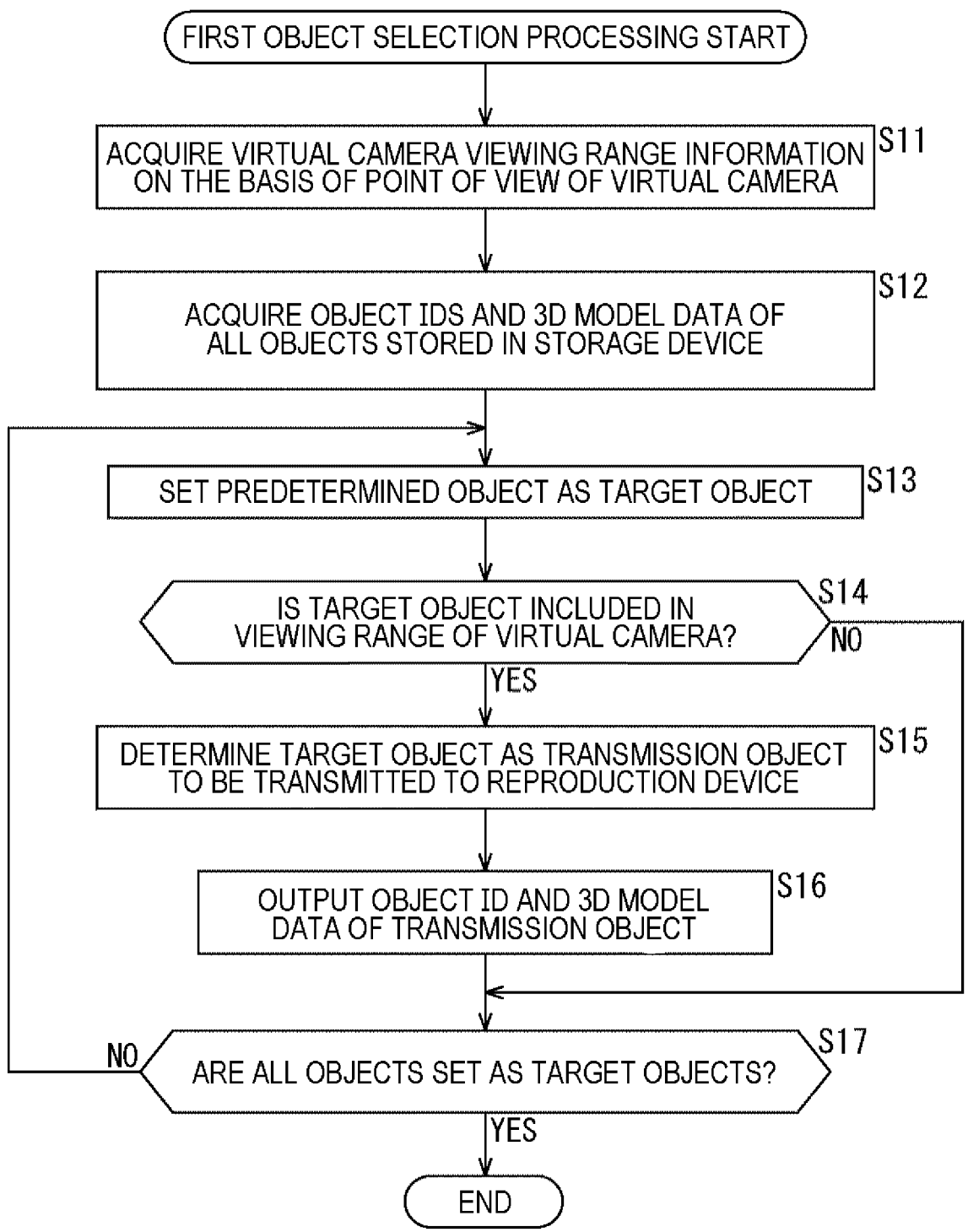
FIG. 8 is a flowchart for explaining first object selection processing.

FIG. 8 is a flowchart for explaining object selection processing (first object selection processing) by the selection device 24A. This processing is started, for example, when the virtual camera viewing range information is supplied from the reproduction device 28 via the transmission and reception device 26.

First, in step S11, the 3D model selection unit 61A acquires the virtual camera viewing range information based on the point of view of the virtual camera 70 supplied from the reproduction device 28 via the transmission and reception device 26.

In step S12, the 3D model selection unit 61A acquires the object IDs used to identify the objects and the 3D model data of all the objects stored in the storage device 23.

In step S13, the 3D model selection unit 61A sets a predetermined object among all the objects acquired from the storage device 23 as a target object.

In step S14, the 3D model selection unit 61A determines whether or not the target object is included in the viewing range of the virtual camera 70.

More specifically, the 3D model selection unit. 61A projects the information regarding all the vertices included in the target object on the image plane 72 of the virtual camera 70 and determines whether or not at least one of the UV coordinates corresponding to each piece of the vertex information is included in the image plane 72 of the virtual camera 70.

Alternatively, in a case of easy calculation, the 3D model selection unit 61A projects a representative value of global position information of the target object on the image plane 72 of the virtual camera 70 and determines whether or not at least one of the DV coordinates corresponding to the representative value is included in the image plane 72 of the virtual camera 70.

In a case where it is determined in step S14 that the target object is included in the viewing range of the virtual camera 70, the processing proceeds to step S15, and the 3D model selection unit 61A determines the target object as a transmission object of which the 3D model data is transmitted to the reproduction device 28. In step S16, the 3D model selection unit 61A outputs an object ID and 3D model data of the transmission object to the encoding device 25.

On the other hand, in a case where it is determined in step 814 that the target object is not included in the viewing range of the virtual camera 70, steps S15 and S16 are skipped.

In step S17, the 3D model selection unit 61A determines whether or not all the objects acquired from the storage device 23 are set as the target objects.

In a case where it is determined in step 817 that all the objects have not been set as the target objects yet, the processing returns to step S13, and the processing in steps S13 to S17 is repeated. In other words, the object that has not been set as the target object is set as a next target object, and it is determined whether or not the above object is an object included in the viewing range of the virtual camera 70.

On the other hand, in a case where it is determined in step S17 that all the objects have been set as the target objects, the first object selection processing is terminated.

According to the first object selection processing, since the 3D model data of the object in the viewing range of the virtual camera 70 is transmitted to the reproduction device 28, a transmission band can be reduced by transmitting only the 3D model data of the objects necessary for generation of the display image.

4. Second Embodiment of Selection Device (Exemplary Configuration of Selection Device)

Figure 9:
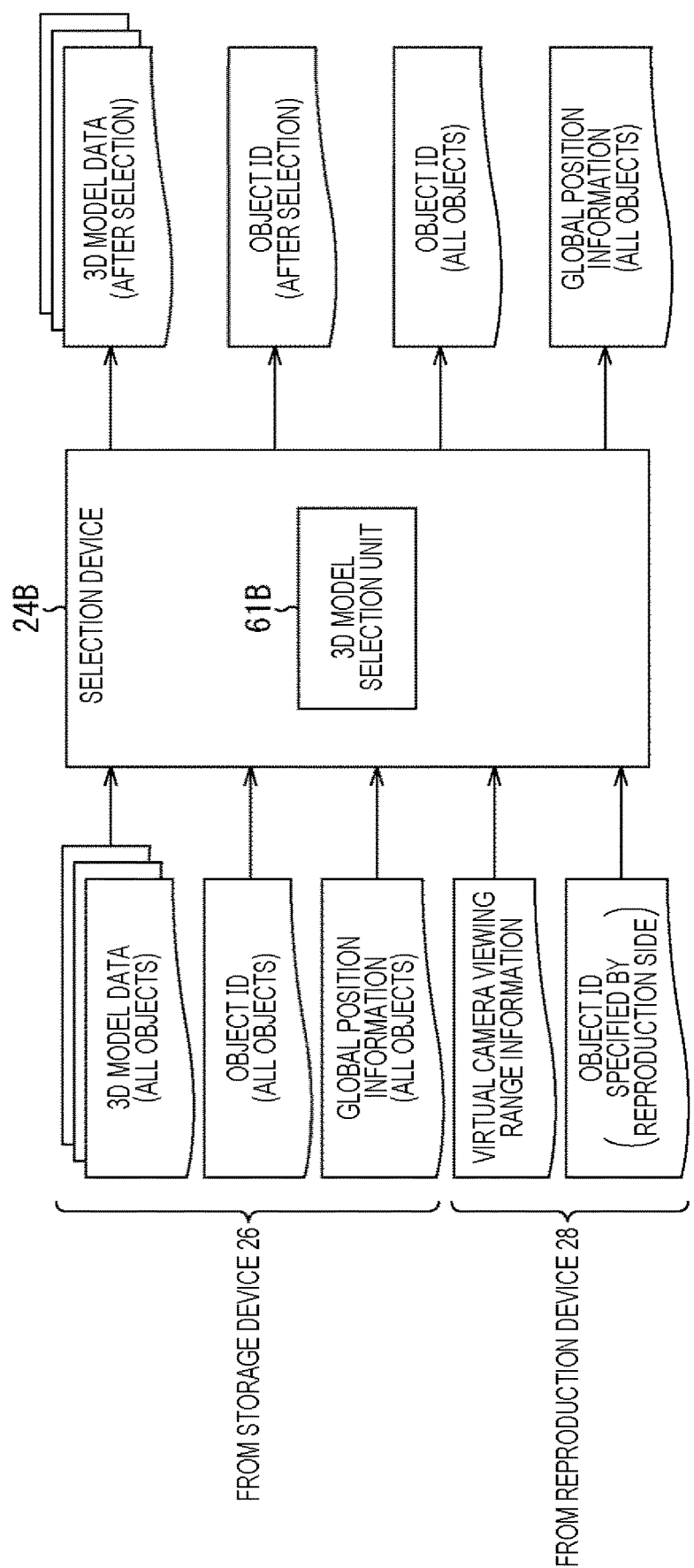
FIG. 9 is a block diagram of an exemplary configuration of a second embodiment of the selection device.

FIG. 9 illustrates an exemplary configuration of a selection device 24B as a second embodiment of the selection device 24.

The selection device 24B includes a 3D model selection unit 61B.

In the selection device 24B, one or both of the point cloud format and the UV texture geometry format are applied as the data format of the 3D model data. Therefore, as in the first embodiment, the 3D model data is one or both of the geometry information represented by a set of points (point group) and the color information for each point and the geometry information represented by the polygon meshes and the color information for each polygon mesh.

In the second embodiment, an object ID of an object specified by the viewer as a display target, not the virtual camera viewing range information based on the point of view of the virtual camera is supplied from the reproduction device 28 to the selection device 24B as the object specification information.

Therefore, first, the 3D model selection unit 61B transmits the object IDs and the global position information of all the objects stored in the storage device 23 to the reproduction device 28 as illustrated in A of FIG. 10.

As illustrated in B of FIG. 10, as the global position information of each object, for example, a minimum value xmin and a maximum value xmax of an x coordinate of the vertex of the bounding box, a minimum value ymin and a maximum value ymax of a y coordinate, and a minimum value zmin and a maximum value zmax of a z coordinate can be adopted.

To the selection device 24B, instead of the virtual camera viewing range information based on the point of view of the virtual camera in the first embodiment, the object IDs of the one or more objects specified by the viewer are transmitted from the reproduction device 28 as the object specification information.

For example, as illustrated in FIG. 11, it is assumed that the object specification information indicating 1, 3, and 5 as the object IDs be transmitted from the reproduction device 28 to the selection device 24B.

The 3D model selection unit 61B of the selection device 24B determines objects having the object IDs 1, 3, and 5 as transmission objects of which 3D model data is transmitted to the reproduction device 28 on the basis of the object specification information transmitted from the reproduction devdce 28. Then, the 3D model selection unit 61B acquires the 3D model data of each object determined as the transmission object, in other words, the geometry information and the color information from the storage device 23 and supplies the acquired information to the encoding device 25.

Note that, in the second embodiment, the acquisition of the virtual camera viewing range information from the reproduction device 28 can be omitted.

(Second Object Selection Processing)

Figure 12:
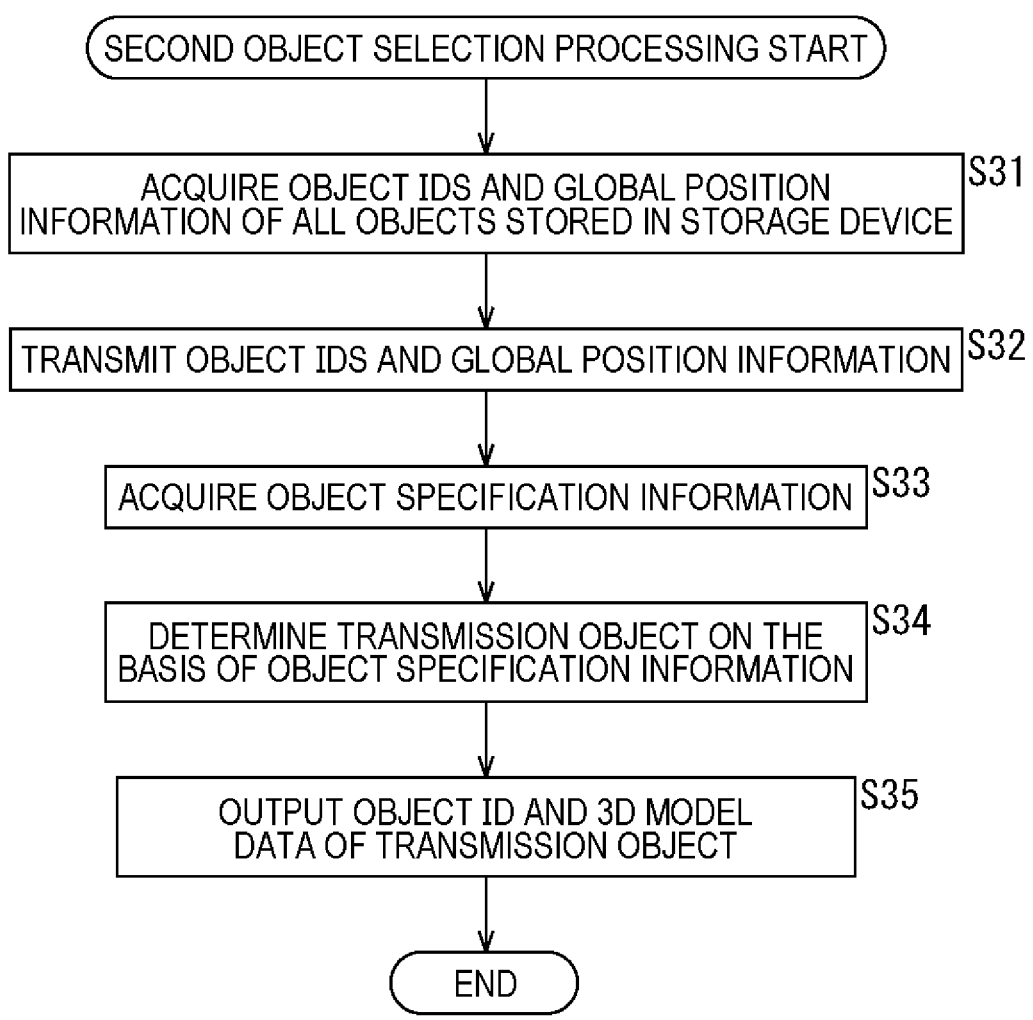
FIG. 12 is a flowchart for explaining second object selection processing.

FIG. 12 is a flowchart for explaining object selection processing (second object selection processing) by the selection device 24B. This processing is started, for example, when the reproduction device 28 is turned on and the viewer performs an operation for starting reproduction.

First, in step S31, the 3D model selection unit 61B acquires the object IDs and the global position information of all the objects stored in the storage device 23.

In step S32, the 3D model selection unit 61B transmits the acquired object IDs and global position information of all the objects to the reproduction device 28. The object IDs and the global position information of all the objects are output from the 3D model selection unit 61 to the encoding device 25 and transmitted to the reproduction device 28 via the encoding device 25, the transmission and reception device 26, and the like.

In step S33, the 3D model selection unit 61B acquires the object specification information transmitted from the reproduction device 28 via the transmission and reception device 26.

In step S34, the 3D model selection unit 61B determines the transmission object of which the 3D model data is transmitted to the reproduction device 28 on the basis of the object specification information.

In step S35, the 3D model selection unit 61B outputs an object ID and 3D model data of the transmission object to the encoding device 25.

The second object selection processing is terminated as described above.

According to the second object selection processing, since the 3D model data of the object specified by the viewer as the display target is transmitted to the reproduction device 28, the viewer can specify whether or not to display the object for each object. Furthermore, only the 3D model data of the object specified by the viewer as the display target is transmitted so as to reduce the transmission band.

5. Third Embodiment of Selection Device (Exemplary Configuration of Selection Device)

Figure 13:
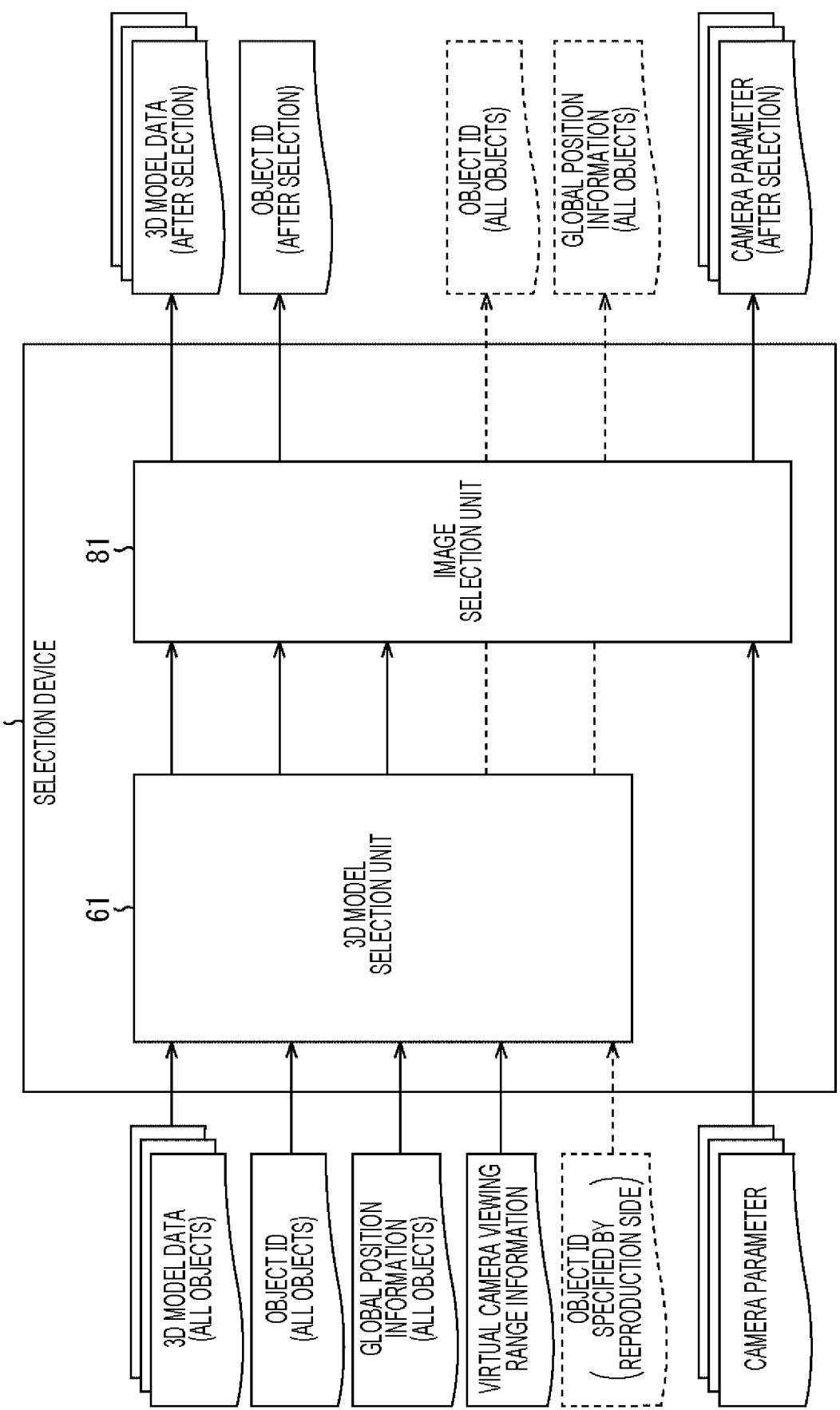
FIG. 13 is a block diagram of an exemplary configuration of a third embodiment of the selection device.

FIG. 13 illustrates an exemplary configuration of a selection device 24C as a third embodiment of the selection device 24.

The selection device 24C includes a 3D model selection unit 61 and an image selection unit 81.

In the selection device 24C, the multi-texture geometry format is applied as the data format of the 3D model data. Therefore, the 3D model data is represented by the geometry information represented by the polygon meshes and the captured images (texture image) as many as the number of imaging devices 21.

The 3D model selection unit 61 includes the 3D model selection unit 61A in the first embodiment or the 3D model selection unit 61B in the second embodiment, selects only an object that satisfies a predetermined condition from among all the objects stored in the storage device 23, and determines the selected object as the transmission object.

Although detailed description is omitted, in a case where the 3D model selection unit 61 includes the 3D model selection unit 61A, the 3D model selection unit 61 acquires the virtual camera viewing range information as the object specification information from the reproduction device 28 and determines the transmission object from among all the objects stored in the storage device 23 on the basis of the virtual camera viewing range information.

On the other hand, in a case where the 3D model selection unit 61 includes the 3D model selection unit 61B, the 3D model selection unit 61 acquires the object specification information indicating the object specified by the viewer from the reproduction device 28 and determines the transmission object from among all the objects stored in the storage device 23 on the basis of the object specification information.

The object ID as the object specification information that is the input data and the object IDs and the global position information of all the objects stored in the storage device 23 that are output data, which are indicated by broken lines in FIG. 13, indicate input and output data in a case where the 3D model selection unit 61 includes the 3D model selection unit 61B.

The 3D model selection unit 61 supplies the object ID and the 3D model data of the determined transmission object and the global position information of all the objects to the image selection unit 81.

Furthermore, the storage device 23 supplies the camera parameters of all the imaging devices 21 to the image selection unit 81.

In the third embodiment, as described above, the 3D model data includes the geometry information of the polygon meshes and the captured images as many as the number of imaging devices 21. There is a case where an image that does not include the transmission object determined by the 3D model selection unit 61 is included in the captured images as many as the number of imaging devices 21 that are a part of the 3D model data.

The image selection unit 81 selects only the captured image including the transmission object from among the plurality of captured images (as many as the number of imaging devices 21) that is a part of the 3D model data of the transmission object.

Figure 14:
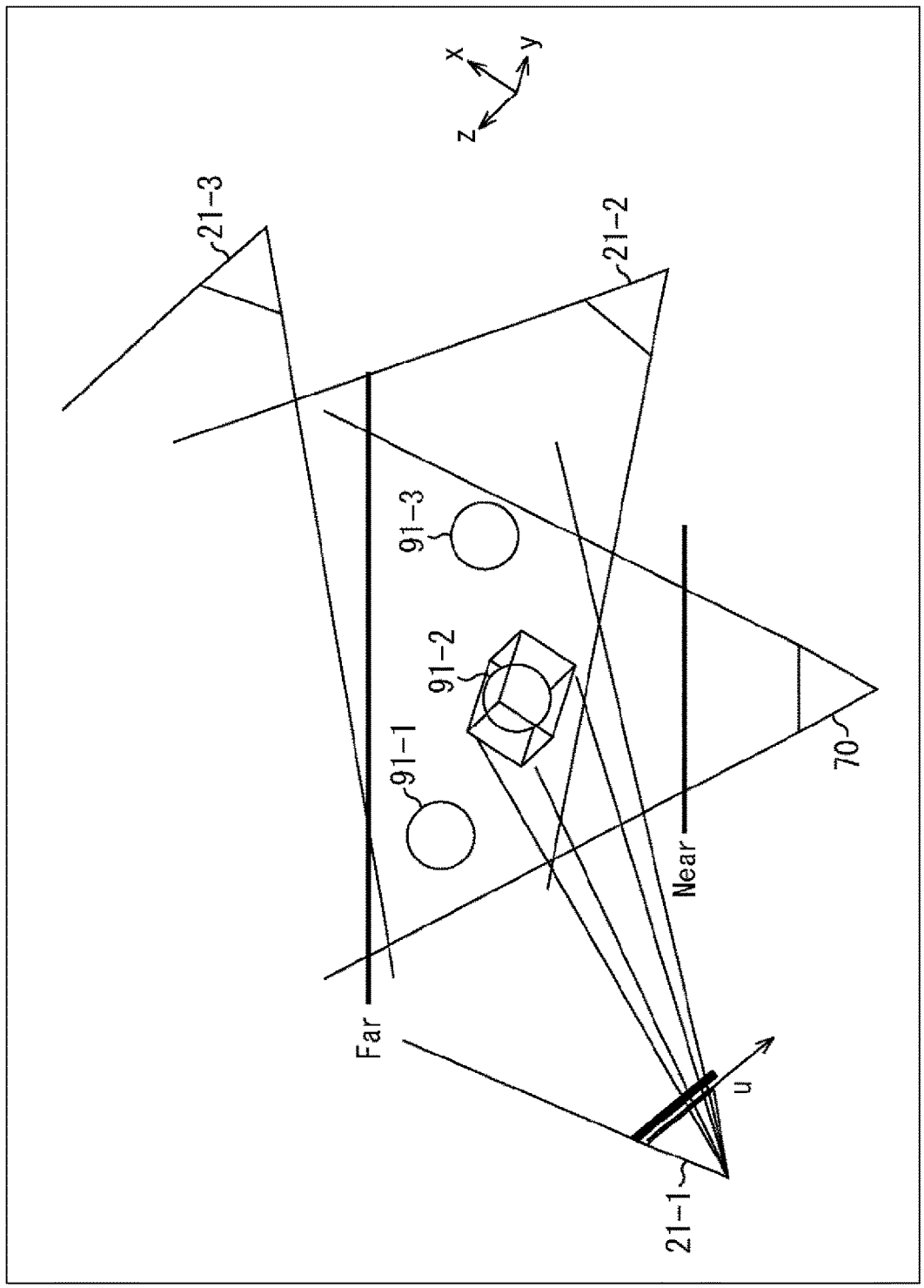
FIG. 14 is a diagram for explaining processing of an image selection unit in FIG. 13.

For example, as illustrated in FIG. 14, it is assumed that the 3D model selection unit 61 determine an object 91-2 as a transmission object according to the specification of the viewer from among three objects 91-1 to 91-3 included in the viewing range of the virtual camera 70. The two objects 91-1 and 91-3 are objects that are not transmitted to the reproduction device 26 (referred to as non-transmission object below).

Similar to the 3D model selection unit 61A, the image selection unit 81 projects the vertex information of the object 91-2 on the image plane of each of the plurality of imaging devices 21 and determines whether or not the object 91-2 is included in the image plane, in other words, the object 91-2 is included in the captured image.

In the example in FIG. 14, three imaging devices 21-1 to 21-3 are illustrated. Since the object 91-2 is included in the image planes of the imaging device 21-1 and the imaging device 21-2, captured images imaged by the imaging device 21-1 and the imaging device 21-2 are determined as the captured images to be transmitted (referred to as transmission captured image below). On the other hand, since the object 91-2 is not included in the image plane of the imaging device 21-3, the captured image imaged by the imaging device 21-3 is determined as the captured image that is not transmitted (referred to as non-transmission captured image below).

Note that, as in the first embodiment, in order to reduce a calculation load, it is possible to calculate whether or not the object is included in the captured image imaged by each imaging device 21 by using the representative value of the global position information of each object such as vertex coordinates of the bounding box and determine the image to be transmitted.

Figure 15:
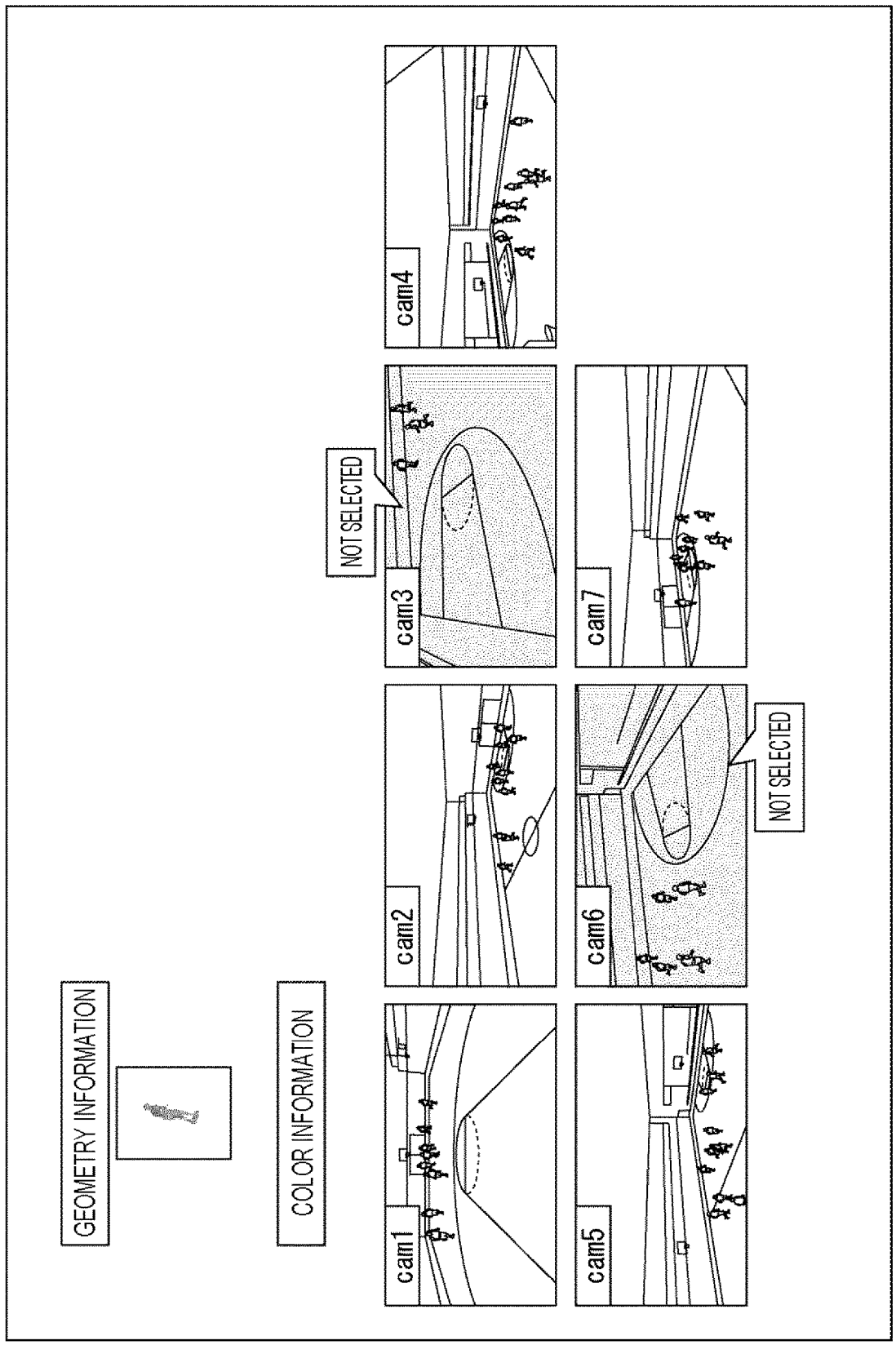
FIG. 15 is a diagram for explaining the processing of the image selection unit in FIG. 13.

For example, as illustrated in FIG. 15, 3D model data of a single transmission object includes a single polygon mesh as the geometry information and captured images as many as the number of imaging devices 21, in other words, seven as the color information. However, as a result of the image selection processing by the image selection unit 81, captured images imaged by the imaging devices 21-3 and 21-6 are determined as the captured images that are not transmitted (not selected).

The image selection unit 81 outputs the object ID and the 3D model data of the transmission object to the encoding device 25. However, regarding the color information, the 3D model data of only the captured image including the transmission object is output from among the captured images as many as the number of imaging devices 21. Furthermore, the image selection unit 81 outputs the camera parameter of the imaging device 21 corresponding to the captured image to be transmitted as the 3D model data to the encoding device 25.

(Third Object Selection Processing)

Figure 16:
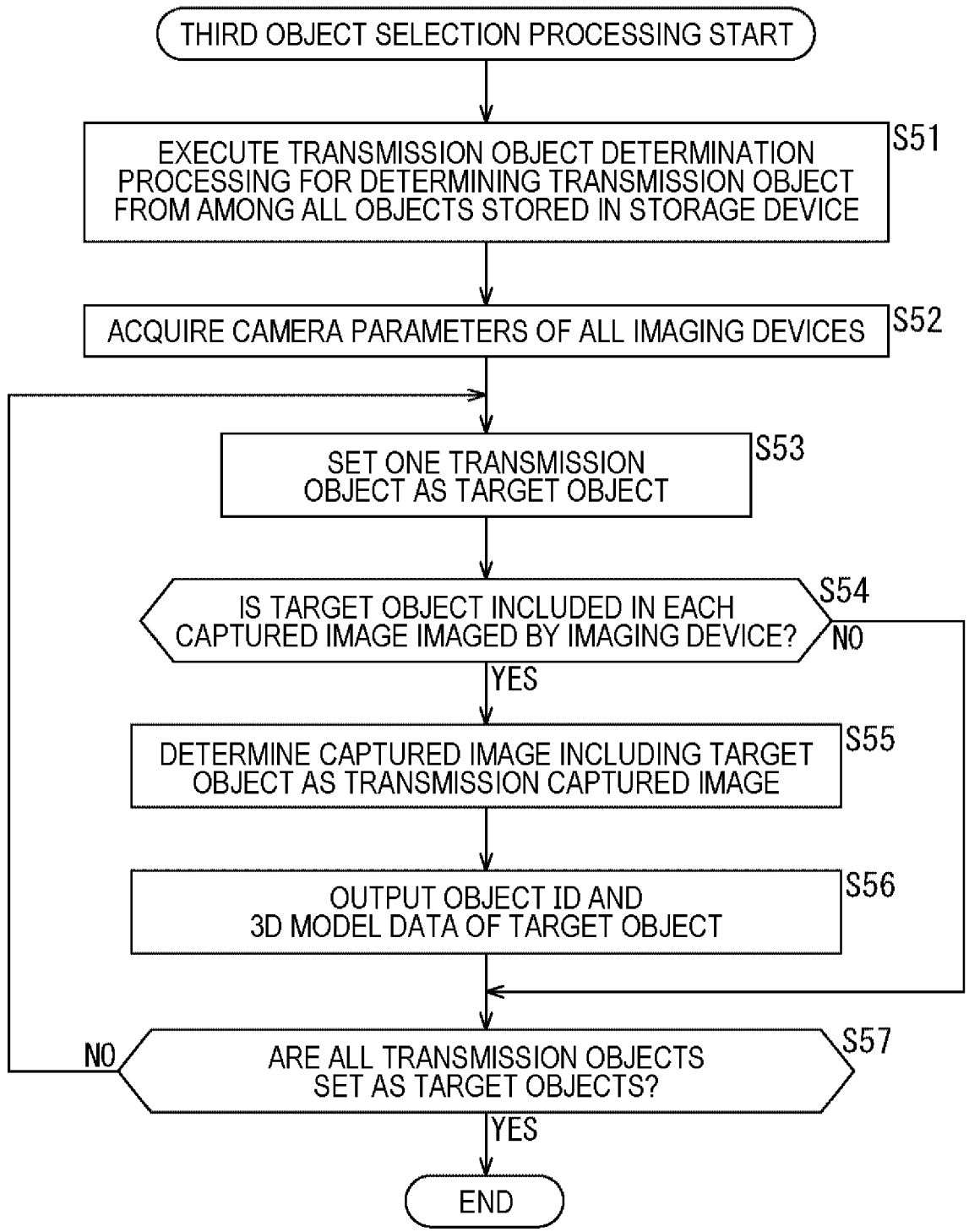
FIG. 16 is a flowchart for explaining third object selection processing.

FIG. 16 is a flowchart for explaining object selection processing (third object selection processing) by the selection device 24C. This processing is started, for example, when the reproduction device 28 is turned on and the viewer performs an operation for starting reproductjon.

First, in step S51, the 3D model selection unit 61 executes transmission object determination processing for determining the transmission object from among all the objects stored in the storage device 23.

In other words, in step S51, the 3D model selection unit 61 executes the first object selection processing in FIG. 8 for determining the transmission object on the basis of the virtual camera viewing range information as the object specification information or the second object selection processing in FIG. 12 for determining the transmission object on the basis of the object specification information indicating the object specified by the viewer. The object ID and the 3D model data of the transmission object obtained as a result of the processing are supplied to the image selection unit 81.

In step S52, the image selection unit 81 acquires the camera parameters of all the imaging devices 21 from the storage device 23.

In step S53, the image selection unit 81 sets one of the transmission objects as a target, object to be focused.

In step S54, the image selection unit 81 determines whether or not the target object is included in each of the captured images imaged by the plurality of imaging devices 21.

In a case where it is determined in step S54 that the target object is included in at least one of the captured images imaged by the imaging devices 21, the processing proceeds to step S55, and the image selection unit 81 determines the captured image including the target object as the transmission captured image. On the other hand, the captured image that does not include the target object is determined as the non-transmission captured image.

In step S56, the image selection unit 81 outputs the object ID and the 3D model data of the target object to the encoding device 25. However, regarding the color information, the 3D model data of only the captured image determined as the transmission captured image in step S55 from among the seven captured images as many as the number of imaging devices 21 is output. Furthermore, the image selection unit 81 outputs the camera parameter of the imaging device 21 corresponding to the transmission captured image to the encoding device 25.

On the other hand, in a case where it is determined in step S54 that the target object is not included in all the captured images imaged by the plurality of imaging devices 21, the processing in steps S55 and S56 is skipped.

In step S57, the image selection unit 81 determines whether or not all the transmission objects have been set as the target objects.

In a case where it is determined in step S57 that all the transmission objects have not been set as the target objects yet, the processing returns to step S53, and the processing in steps S53 to S57 is repeated. In other words, a transmission object that has not been set as a target object yet is set as a next target object, and it is determined each captured image imaged by each of the plurality of imaging devices 21 is the transmission captured image or the non-transmission captured image.

On the other hand, in a case where it is determined in step S57 that all the transmission objects have been set as the target objects, the third object selection processing is terminated.

Note that, in the processing described above, a method is adopted in which the transmission objects are set as the target objects one by one and the processing in steps S54 to S56 is repeatedly executed. However, regarding all the transmission objects, it may be simultaneously determined whether or not each captured image imaged by each of the plurality of imaging devices 21 is a transmission captured image or a non-transmission captured image.

According to the third object selection processing, since only the 3D model data of the object specified by the object specification information is transmitted to the reproduction device 28, the transmission band can be reduced.

Furthermore, the captured image that does not include the object specified by the object specification information in the 3D model data of the object specified by the object specification information is not transmitted as the non-transmission captured image, the transmission band can be further reduced.

6. Fourth Embodiment of Selection Device (Exemplary Configuration of Selection Device)

Figure 17:
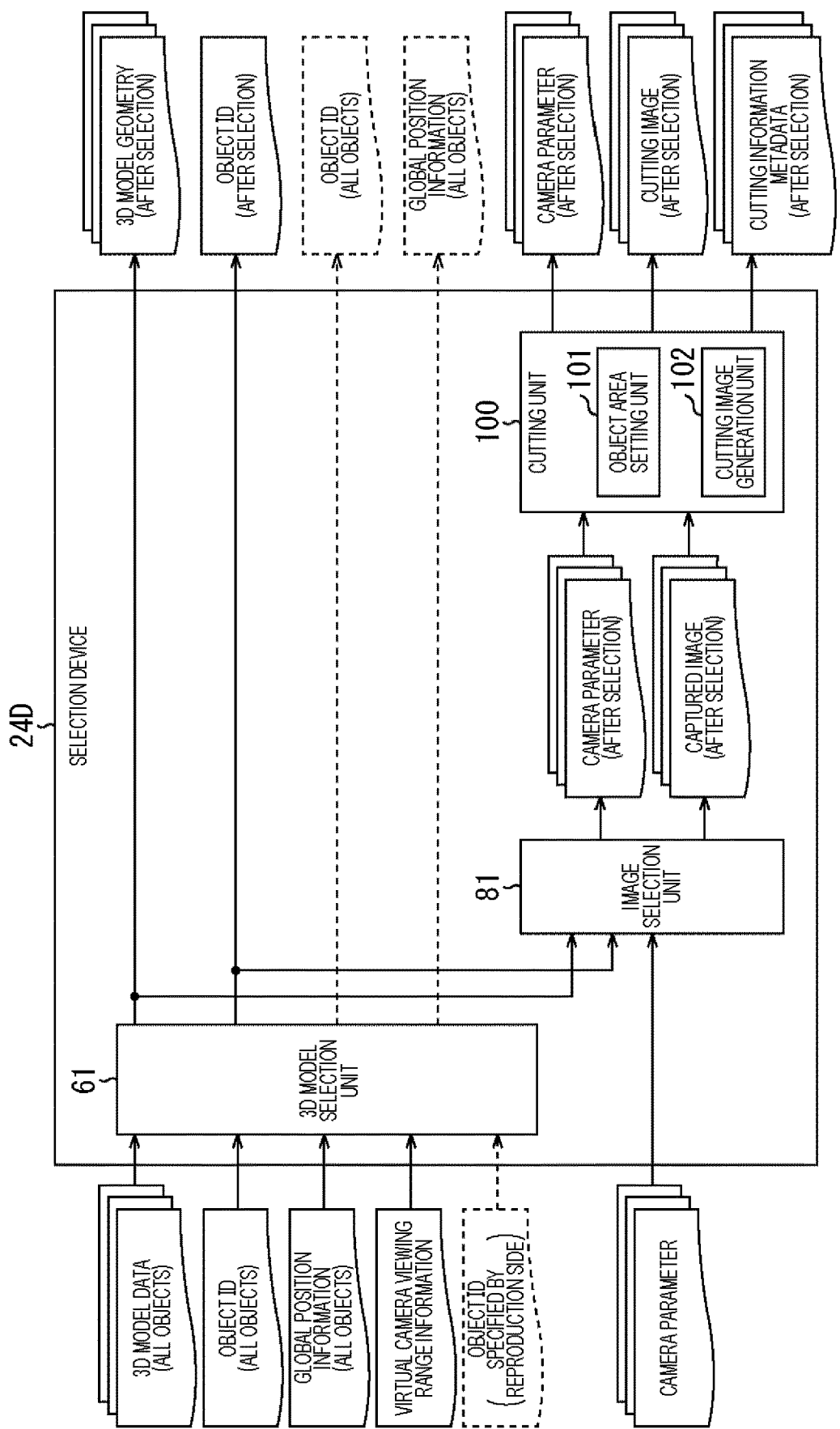
FIG. 17 is a block diagram of an exemplary configuration of a fourth embodiment of the selection device.

FIG. 17 illustrates an exemplary configuration of a selection device 24D as a fourth embodiment of the selection device 24.

In the fourth embodiment, components corresponding to those of the first to third embodiments are denoted with the same reference numerals, and the description thereof will be omitted.

In the selection device 24D, the multi-texture geometry format is applied as the data format of the 3D model data as in the third embodiment.

The selection device 24D includes a 3D model selection unit 61, an image selection unit 81, and a cutting unit 100.

In other words, the selection device 24D according to the fourth embodiment has a configuration in which the cutting unit 100 is added, in addition to the 3D model selection unit 61 and the image selection unit 81 similar to those in the third embodiment. Other configuration of the fourth embodiment is the same as that of the third embodiment.

When the selection device 24C of the third embodiment is compared with the selection device 24D of the fourth embodiment regarding the output data, the 3D model data in the third embodiment is changed to 3D model geometry, a cutting image, and cutting information metadata in the fourth embodiment.

The 3D model geometry indicates the geometry information represented by the polygon mesh included in the 3D model data in the third embodiment. Therefore, there is no difference between the third embodiment and the fourth embodiment as to the geometry information of the 3D model data.

On the other hand, regarding the color information of the 3D model data, the captured image including the transmission object that is the output data in the third embodiment is changed to the cutting image obtained by cutting the transmission object part from the captured image including the transmission object and the cutting information metadata that is information indicating a position of a cutting area in the fourth embodiment.

Regarding the input data, the third embodiment is similar to the fourth embodiment.

The cutting unit 100 includes an object area setting unit 101 and a cutting image generation unit 102.

The cutting unit 100 cuts an image of the cutting area including the transmission object from the captured image including the transmission object supplied from the image selection unit 81 so as to generate a cutting image. Here, to cut an image is to cut a part of the image, for example, to cut a necessary part of the image, and is referred to as cropping.

The object area setting unit 101 sets an object area including the transmission object in the captured image including the transmission object on the basis of the 3D model represented by the 3D model data.

The cutting image generation unit 102 cuts an image of the object area from the captured image to generate the cutting image. Furthermore, the cutting image generation unit 102 generates the cutting information metadata indicating the position of the cutting area in the captured image. The cutting image generation unit 102 supplies the cutting image, the cutting information metadata, and the camera parameter of each imaging device 21 to the encoding device 25.

The cutting processing executed by the cutting unit 100 will be described with reference to FIGS. 18 to 21.

Figure 18:
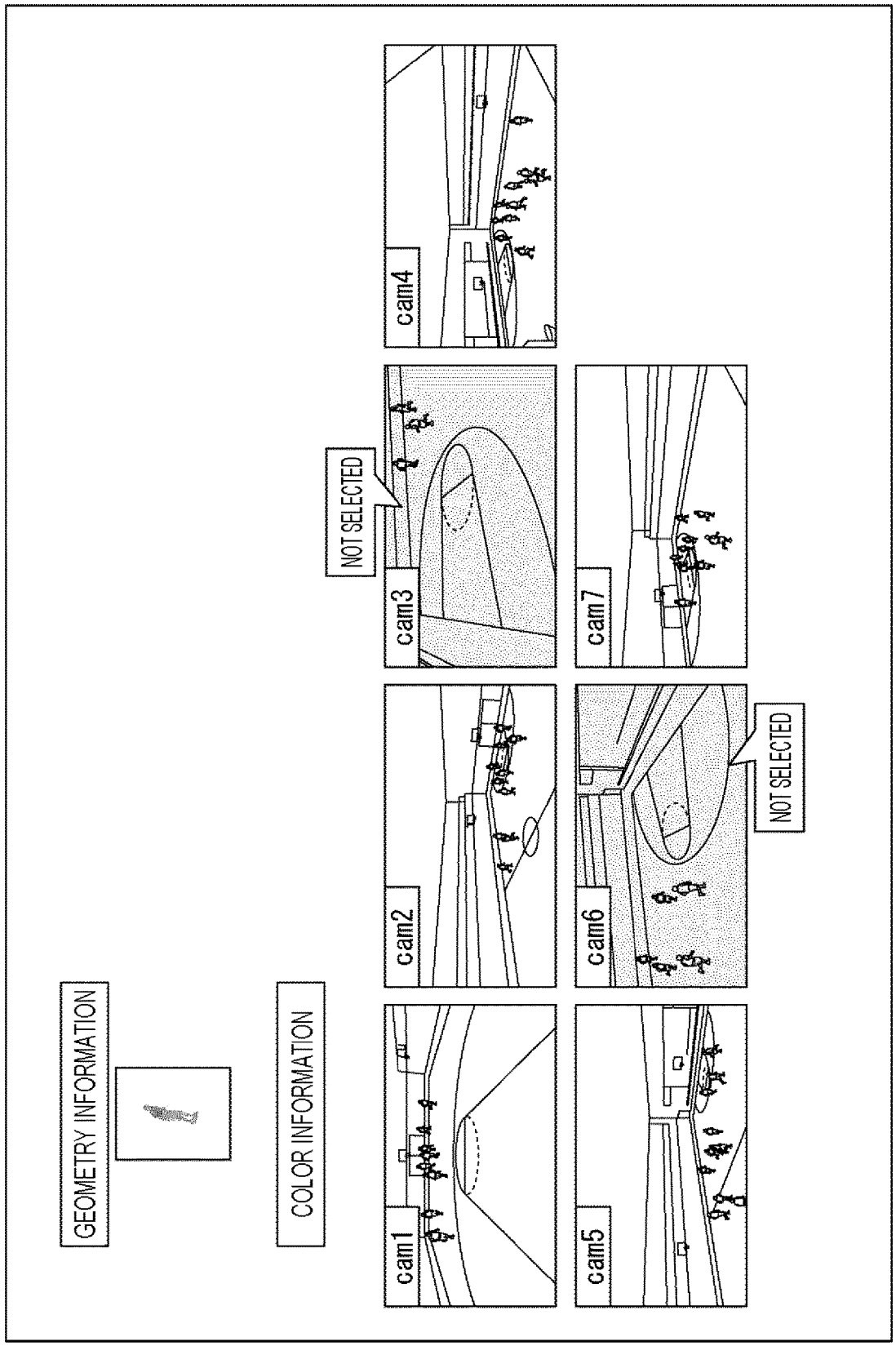
FIG. 18 is a diagram for explaining cutting processing by a cutting unit.

The captured image supplied from the image selection unit 81 to the cutting unit 100 is the captured image including the transmission object as illustrated in FIG. 18.

FIG. 18 is a diagram same as FIG. 15 indicated in the description of the third embodiment.

For example, captured images imaged by the imaging devices 21-1, 21-2, 21-4, 21-5, and 21-7 from among seven captured images as many as the number of imaging devices 21 are suppljed to the cutting unit 100 as the transmission captured images. On the other hand, captured images that do not include the transmission object and imaged by the imaging devices 21-3 and 21-6 are not supplied to the cutting unit 100.

The cutting unit 100 cuts the image of the cutting area including the transmission object from the captured image including the transmission object supplied from the image selection unit 81 so as to generate a cutting image.

Figure 19:
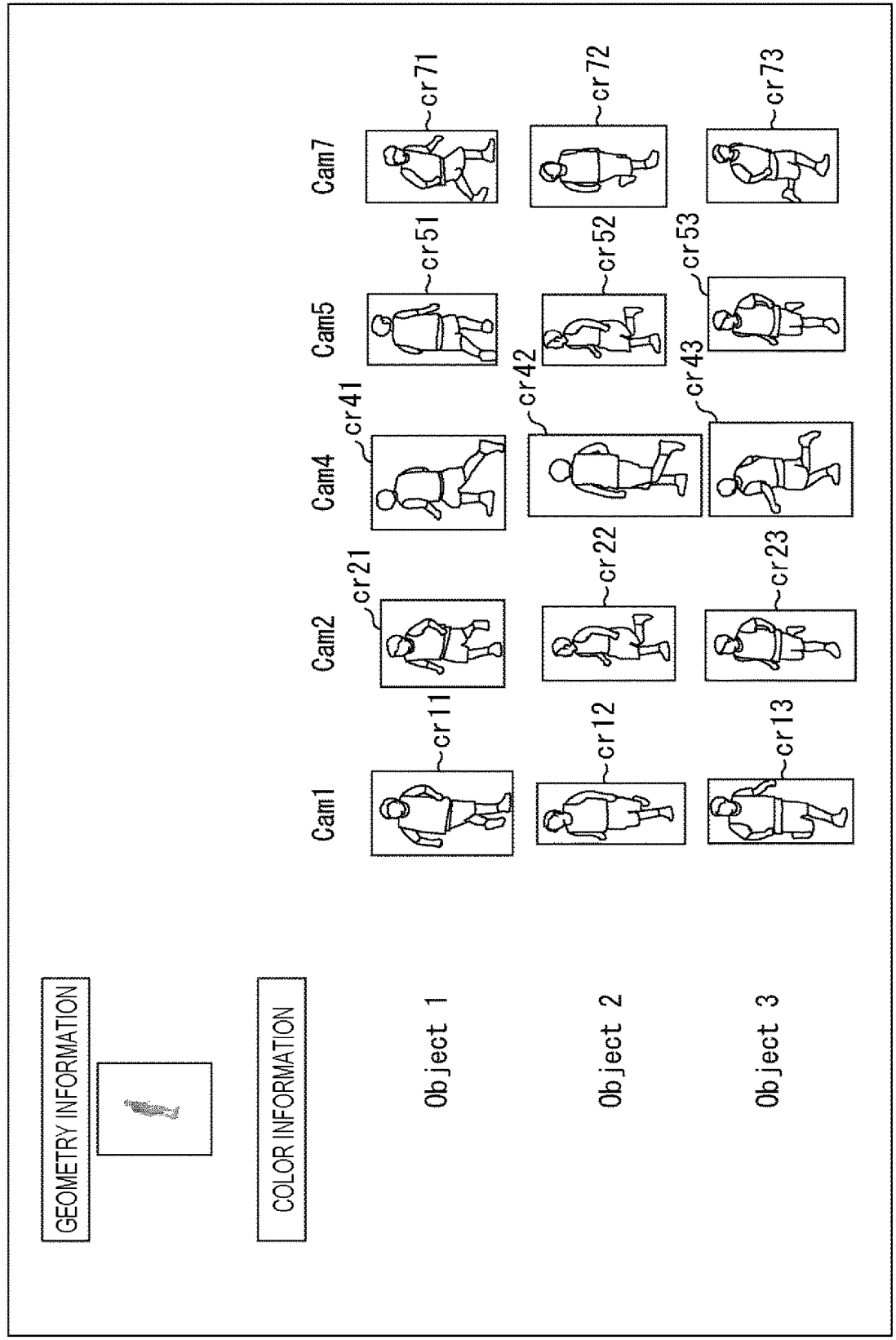
FIG. 19 is a diagram for explaining the cutting processing by the cutting unit.

Now, as illustrated in FIG. 19, it is assumed that each of the five captured images imaged by the imaging devices 21-1, 21-2, 21-4, 21-5, and 21-7 include three objects, i.e., an object 1 (Object 1), an object 2 (Object 2), and an object 3 (Object 3) as the transmission objects. All of the Objects 1 to 3 are portions corresponding to the players.

The cutting unit 100 generates cutting images cr11 to cr13 respectively including the Objects 1 to 3 from the captured image imaged by the imaging device 21-1.

Furthermore, the cutting unit. 100 generates cutting images cr21 to cr23 respectively including the Objects 1 to 3 from the captured image imaged by the imaging device 21-2.

Furthermore, the cutting unit 100 generates cutting images cr41 to cr43 respectively including the Objects 1 to 3 from the captured image imaged by the imaging device 21-4.

Furthermore, the cutting unit 100 generates cutting images cr51 to cr53 respectively including the Objects 1 to 3 from the captured image imaged by the imaging device 21-5.

Furthermore, the cutting unit 100 generates cutting images cr71 to cr73 respectively including the Objects 1 to 3 from the captured image imaged by the imaging device 21-7

Note that resolutions of the cutting images cr11 to cr73 including any one of the Objects 1 to 3 may be the same or different from each other.

Figure 20:
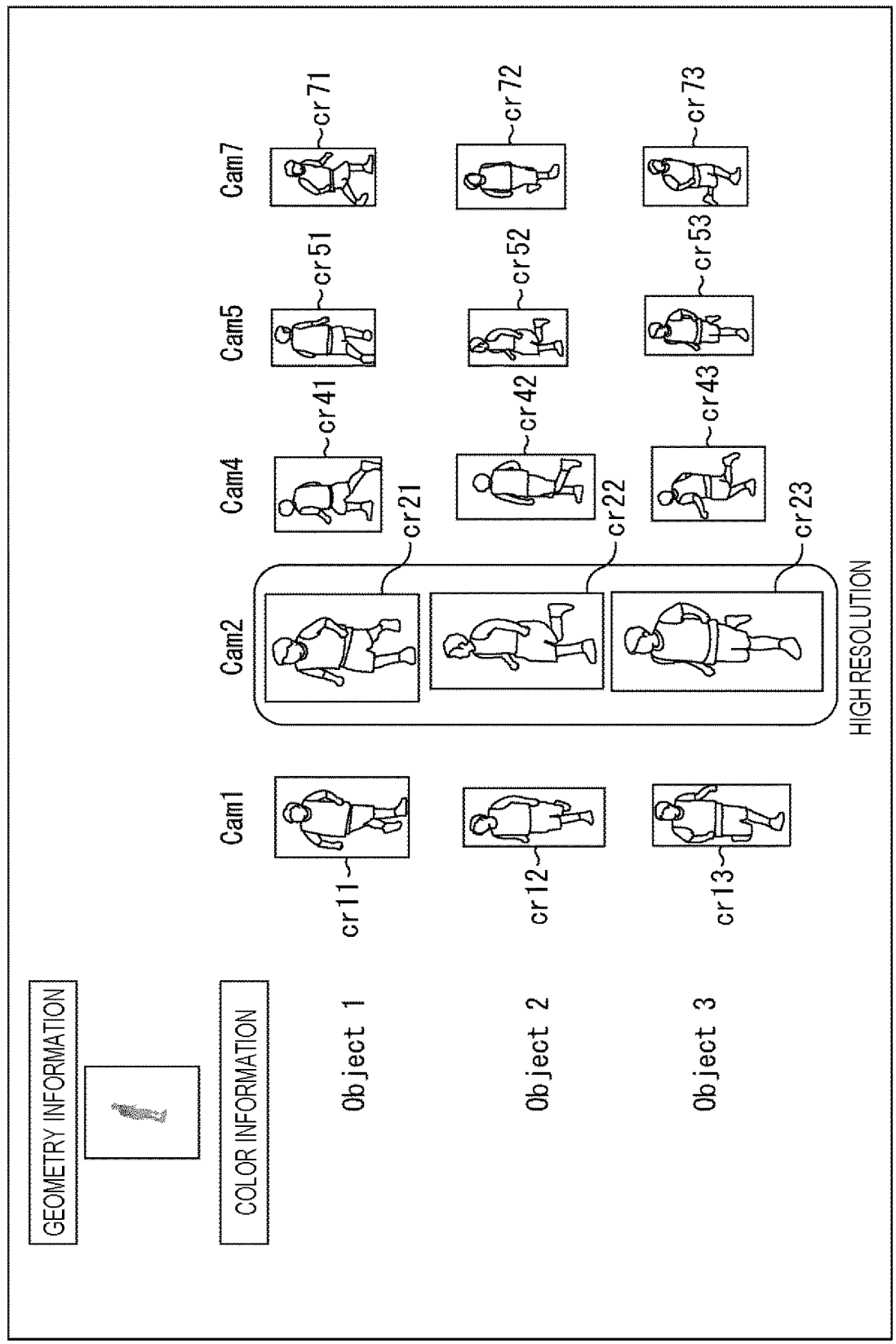
FIG. 20 is a diagram for explaining the cutting processing by the cutting unit.

In a case where the resolutions of the cutting images cr11 to cr73 are set to be different from each other, for example, as illustrated in FIG. 20, the resolution of the cutting image of the captured image imaged at a position closest to the position of the virtual camera 70 can be set to be high, and the resolutions of the cutting images of the other captured images can be set to be low.

In the example in FIG. 20, the imaging device 21 that has captured an image at the position closest to the position of the virtual camera 70 is the imaging device 21-2, and the resolutions of the cutting images cr21 to cr23 cut from the captured image imaged by the imaging device 21-2 are set to be high. The resolutions of the other cutting images cr11 to cr13 and cr41 to cr73 are set to be lower than the resolutions of the cutting images cr21 to cr23.

As another modification, a resolution may be set to be low or high for each object. For example, it is possible to set the resolutions of the cutting images cr11 to cr71 of the Object 1 to be high and to set the resolutions of the cutting images cr12 to cr72 of the Object 2 and the cutting images cr13 to cr73 of the Object 3 to be low.

Furthermore, the resolution of the cutting image may be adaptively changed and transmitted according to a network bandwidth and resources such as the loads of the distribution side and the reproduction side.

(Cutting Processing)

The cutting processing executed by the cutting unit 100 will be described with reference to the flowchart in FIG. 21.

First, in step S71, the object area setting unit 101 selects a predetermined one image from among the transmission captured images that are the captured images including the transmission objects supplied from the image selection unit 81.

In step S72, the object area setting unit 101 selects one transmission object included in the selected transmission captured image.

Figure 22:
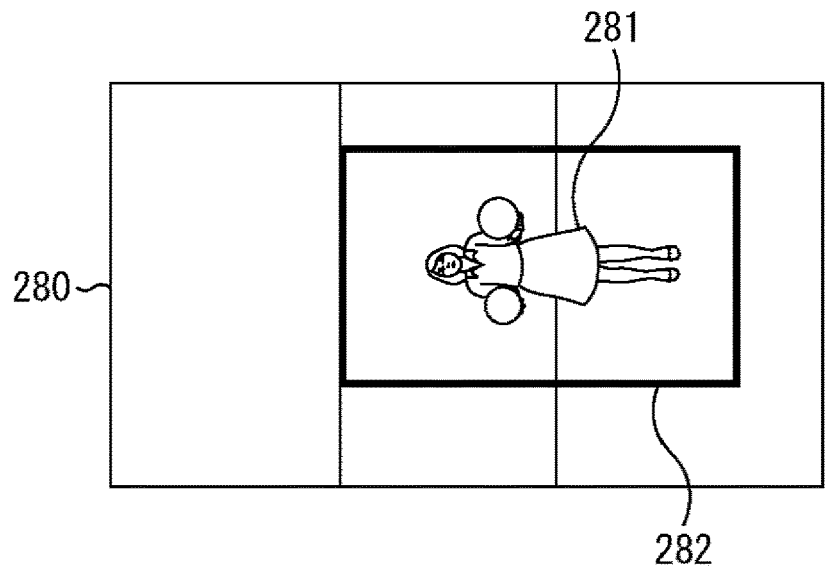
FIG. 22 is a diagram for explaining an object area

In step S73, the object area setting unit 101 sets an object area including the selected transmission object in the transmission captured image. For example, as illustrated in FIG. 22, a rectangular area including a transmission object 281 is set as an object area 282 in a transmission captured image 280.

In step S74, the cutting image generation unit 102 cuts an image of the object area from the captured image to generate the cutting image.

In step S75, the cutting image generation unit 102 generates the cutting information metadata indicating the position of the cutting area in the captured image.

Here, an example of the cutting information metadata will be described with reference to FIG. 23.

Figure 23:
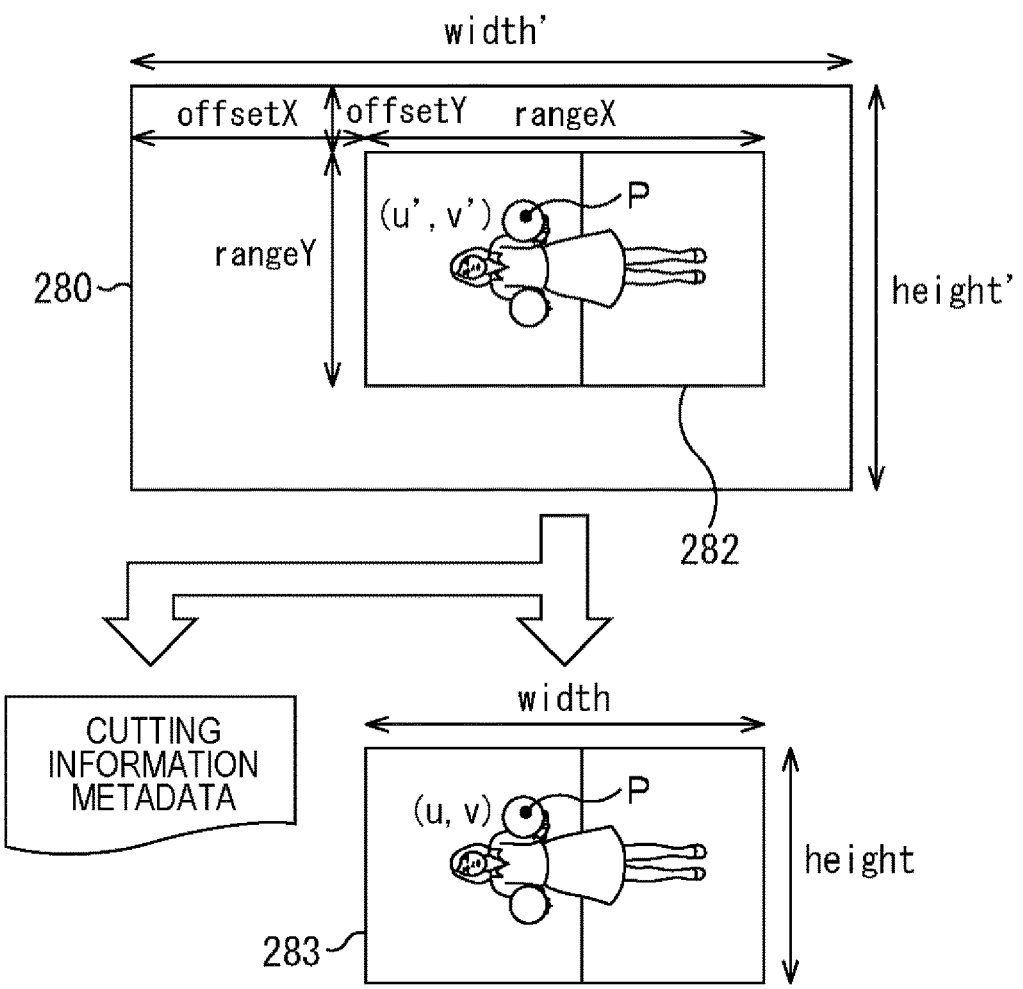
FIG. 23 is a diagram for explaining cutting information metadata.

FIG. 23 illustrates an example of a case where the object area 282 is set in the transmission captured image 280 and a cutting image 283 is cut.

For example, the cutting image generation unit 102 calculates each parameter included in the cutting information metadata according to the following formulas (1) to (4).

$$\text{occupancyX} = \text{rangeX}/\text{width}' \quad (1)$$

$$\text{occupancyY} = \text{rangeY}/\text{height}' \quad (2)$$

$$\text{normOffsetX} = \text{offsetX}/\text{width}' \quad (3)$$

$$\text{normOffsetY} = \text{offsetY}/\text{height}' \quad (4)$$

Here, width' indicates the width of the transmission captured image 280, and height' indicates the height of the transmission captured image 2801. The term rangeX indicates the width of the object area 282, and the term rangeY indicates the height of the object area 282. The term offsetX indicates a distance in an X direction (width direction) between the upper left corner of the transmission captured image 280 and the upper left corner of the object area 282, and the term offsetY indicates a distance in a Y direction (height direction) between the upper left corner of the transmission captured image 280 and the upper left corner of the object area 282.

Therefore, the term occupancyX indicates an occupancy of the object area 282 in the X direction in the transmission captured image 280, and the term occupancyY indicates an occupancy of the object area 282 in the Y direction in the transmission captured image 280. The term normOffsetX is a parameter obtained by normalizing offsetX, and the term normOffsetY is a parameter obtained by normalizing offsetY. These parameters indicate the position of the object area 282 in the transmission captured image 280.

Note that a relationship between coordinates (u', v') in the coordinate system of the transmission captured image 280 and coordinates (u, v) in the coordinate system of the cutting image 283 of a point P in FIG. 23 is expressed by the following formulas (5) and (6).

$$u = (u' - \text{normOffsetX})/\text{occupancyX} \quad (5)$$

$$v = (v' - \text{normOffsetY})/\text{occupancyY} \quad (6)$$

Figures 24, 25:
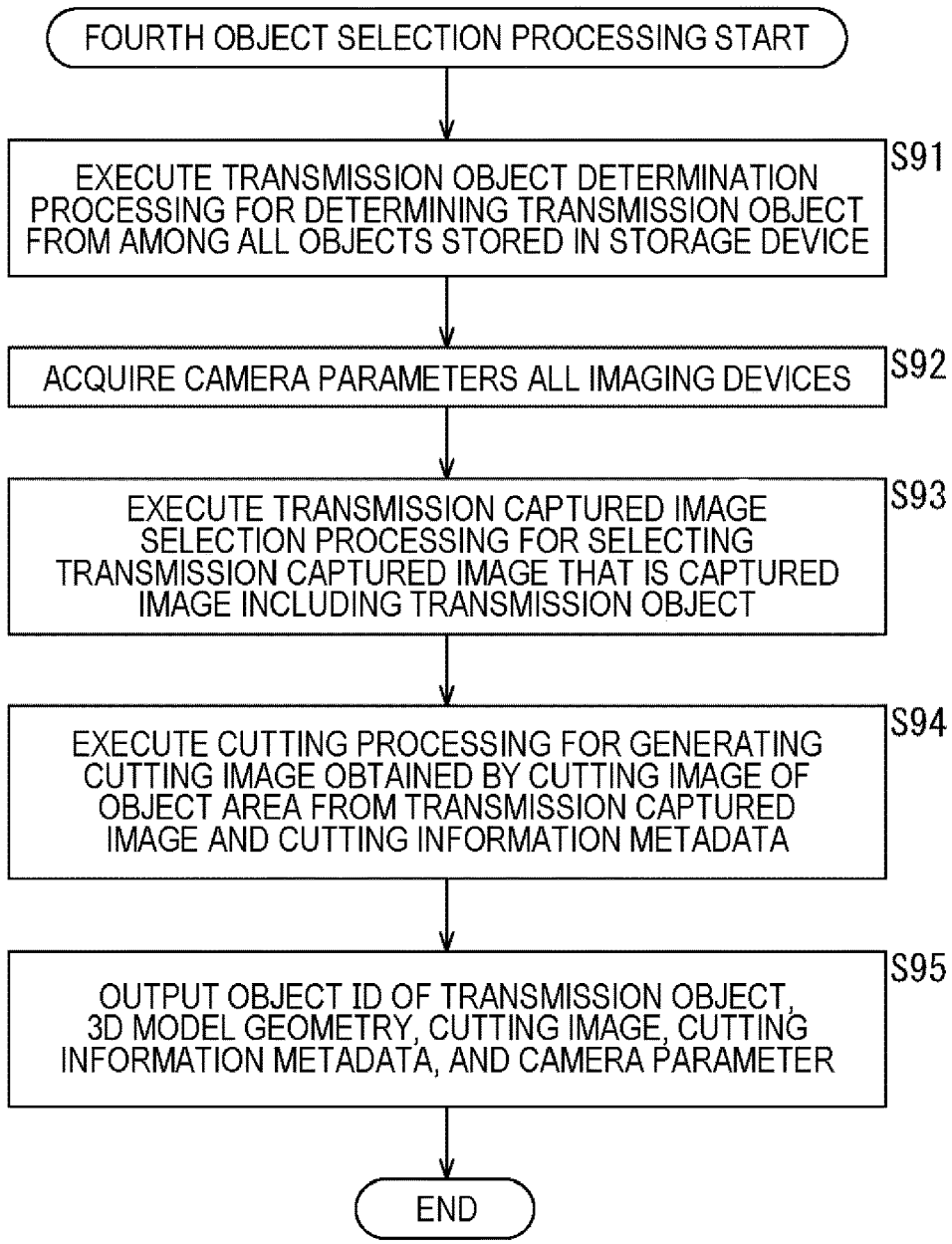
FIG. 24 is a diagram of a specific example of the cutting information metadata.
FIG. 25 is a flowchart for explaining fourth object selection processing.

FIG. 24 illustrates a specific example of the cutting information metadata.

In the example in FIG. 24, normOffsetX, occupancyX, normOffsetY, and occupancyY are respectively set to 0.05, 0.5, 0.01, and 0.5.

Figure 21:
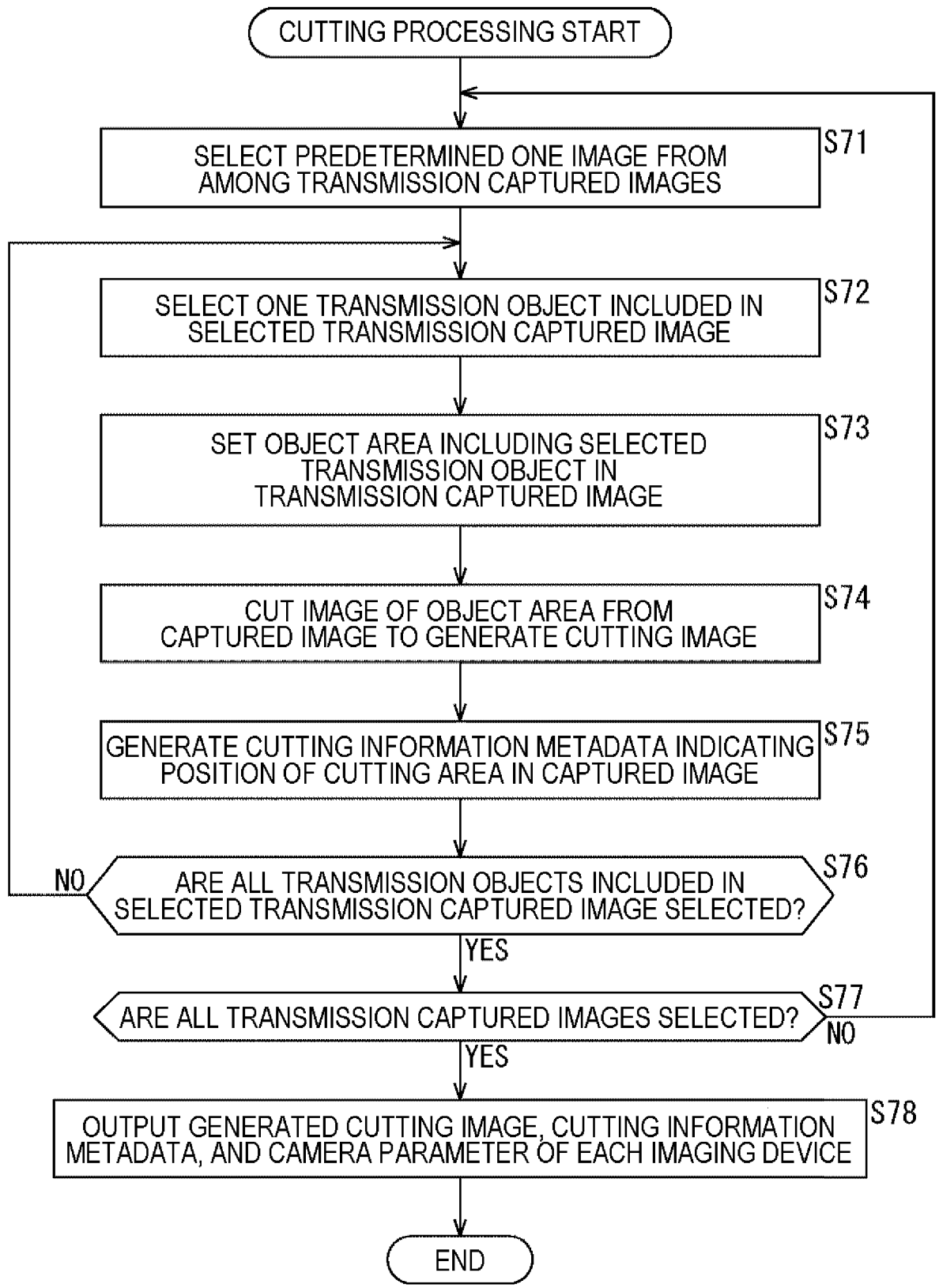
FIG. 21 is a flowchart for explaining the cutting processing.

Returning to the description of the flowchart in FIG. 21, the object area setting unit 101 determines in step S76 whether or not all the transmission objects included in the selected transmission captured image have been selected.

In a case where it is determined in step S76 that all the transmission objects included in the selected transmission captured image have not been selected yet, the processing returns to step S72, and the processing in steps S72 to S76 is repeated. In other words, the next transmission object included in the selected transmission captured image is selected, and similar processing is executed.

On the other hand, in a case where it is determined in step S76 that all the transmission objects included in the selected transmission captured image have been selected, the processing proceeds to step S77.

In step S77, the object area setting unit 101 determines whether or not all the transmission captured images supplied from the image selection unit 81 have been selected.

In a case where it is determined in step S77 that all the transmission captured images have not been selected yet, the processing returns to step S71, and the processing in steps S71 to S77 is repeated. In other words, the next transmission captured image that has not been selected yet is selected from among the transmission captured images supplied from the image selection unit 81, and the similar processing is executed.

On the other hand, in a case where it is determined in step S77 that all the transmission captured images have bees selected, the processing proceeds to step S78. Then, the cutting unit 100 outputs the generated cutting image, the cutting information metadata of the generated cutting image, and the camera parameter of each imaging device 21 to the encoding device 25, and the cutting processing is terminated.

(Fourth Object Selection Processing)

FIG. 25 is a flowchart for explaining object selection processing (fourth object selection processing) by the selection device 24D. This processing is started, for example, when the reproduction device 28 is turned on and the viewer performs an operation for starting reproduction.

First, in step S91, the 3D model selection unit 61 executes transmission object determination processing for determining the transmission object from among all the objects stored in the storage device 23.

In other words, in step S91, the 3D model selection unit 61 executes the first object selection processing in FIG. 8 for determining the transmission object on the basis of the virtual camera viewing range information as the object specification information or the second object selection processing in FIG. 12 for determining the transmission object on the basis of the object specification information indicating the object specified by the viewer. The object ID and the 3D model data of the transmission object obtained as a result of the processing are supplied to the image selection unit 81.

In step S92, the image selection unit 81 acquires the camera parameters of all the imaging devices 21 from the storage device 23.

In step S93, the image selection unit 81 executes transmission captured image selection processing for selecting the transmission captured image that is the captured image including the transmission object from among the captured images as many as the number of imaging devices 21. In other words, the image selection unit 81 executes the processing in steps 853 to S57 in FIG. 16. With this operation, one or more transmission captured images of the captured images imaged by the plurality of imaging devices 21 and the camera parameter of the imaging device 21 are supplied to the cutting unit 100.

In step S94, the cutting unit 100 executes the cutting processing for generating the cutting image obtained by cutting the image of the object area from one or more transmission captured images and the cutting information metadata indicating the position of the cutting area. In other words, the cutting unit 100 executes the processing in steps S71 to S77 in FIG. 21.

In step S95, the selection device 24D outputs the object ID of the transmission object, the 3D model geometry, the cutting image, and the cutting information metadata, and the camera parameter to the encoding device 25, and the processing is terminated. The object ID and the 3D model geometry of the transmission object are output from the 3D model selection unit 61, and the cutting image, the cutting information metadata, and the camera parameter are output from the cutting unit 100.

According to the fourth object selection processing, since only the 3D model data of the object specified by the object specification information is transmitted to the reproduction device 28, the transmission band can be reduced.

Furthermore, according to the transmission captured image selection processing, the captured image that does not include the object specified by the object specification information is not transmitted as a non-transmission captured image. Therefore, the transmission band can be further reduced.

Moreover, since the cutting image obtained by cutting the image of the object area from the captured image including the object is generated and transmitted, the transmission band can be further reduced than that in a case where the captured image is transmitted as it is.

Furthermore, in a case where the captured image is transmitted as setting the resolution of the cutting image of the captured image imaged at the position closest to the position of the virtual camera 70 to be high, the image can be viewed at an optimal resolution while reducing the transmission band.

7. Fifth Embodiment of Selection Device (Exemplary Configuration of Selection Device)

Figure 26:
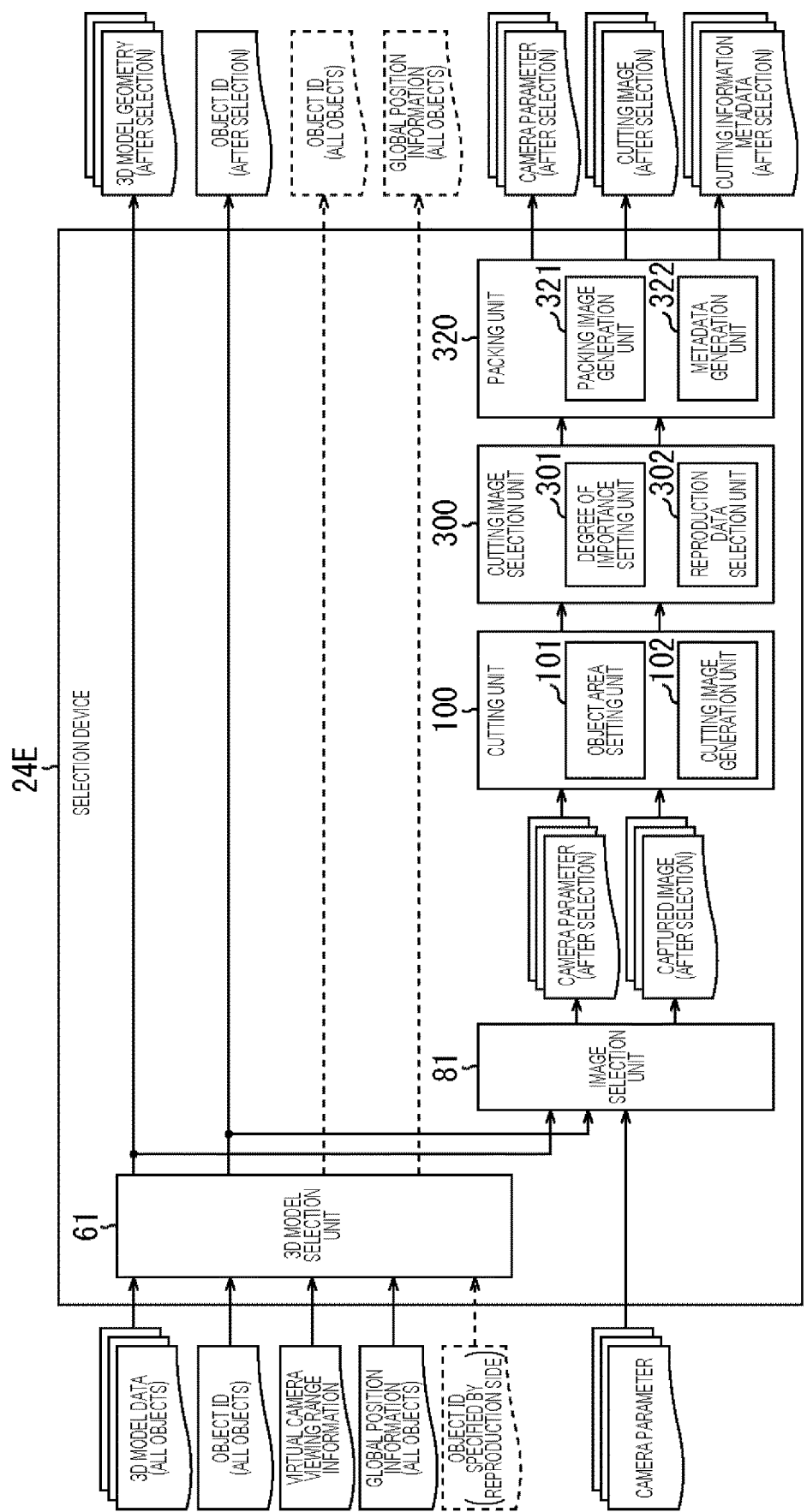
FIG. 26 is a block diagram of an exemplary configuration of a fifth embodiment of the selection device.

FIG. 26 illustrates an exemplary configuration of a selection device 24E as a fifth embodiment of the selection device 24.

In the fifth embodiment, components corresponding to those of the first to fourth embodiments are denoted with the same reference numerals, and the description thereof will be omitted.

In the selection device 24E, the multi-texture geometry format is applied as the data format of the 3D model data as in the third embodiment.

The selection device 24E includes a 3D model selection unit 61, an image selection unit 81, a cutting unit 100, a cutting image selection unit 300, and a packing unit 320.

In other words, the selection device 24E according to the fifth embodiment has a configuration to which the cutting image selection unit 300 and the packing unit 320 are added, in addition to the configuration in the fourth embodiment. Other configuration of the fifth embodiment is the same as that of the fourth embodiment.

The cutting image selection unit 300 selects a cutting image so that the number of cutting images to be transmitted as data for reproduction to the reproduction device 28 is equal to or less than Q (Q>0) that has been preset by a setting unit and the like (not illustrated). Regarding the single transmission object, in a case where the number of cutting images supplied from the cutting unit 100 is equal to or more than Q, the cutting image selection unit 300 reduces the number of cutting images to Q, and in a case where the number of cutting images is less than Q, the cutting images of which the number is the same as that transmitted from the cutting unit 100 are supplied to the packing unit 320.

The cutting image selection unit 300 includes a degree of importance setting unit 301 and a reproduction data selection unit 302.

To the selection device 24E, a camera parameter of the virtual camera is supplied, in addition to the camera parameter of each imaging device 21.

The degree of importance setting unit 301 sets a degree of importance of each imaging device 21 on the basis of the camera parameter of each imaging device 21 and the camera parameter of the virtual camera.

The reproduction data selection unit 302 selects Q or less cutting images on the basis of the degree of iimportance of each imaging device 21. Furthermore, the reproduction data selection unit 302 sets the degree of importance of the imaging device 21 used to image the selected cutting images as the degree of importance of each of the selected cutting images. The reproduction data selection unit 302 supplies the selected cutting image, the degree of importance of the cutting image, the cutting information metadata corresponding to the cutting image, and the camera parameter to the packing unit 320.

The packing unit 320 generates a packing image by packing (combine) a plurality cutting images into a single image.

The packing unit 320 includes a packing image generation unit 321 and a metadata generation unit 322.

The packing image generation unit 321 sets a packing layout that is a layout used to pack each cutting image while using the degree of importance of each cutting image as necessary. Then, the packing image generation unit 321 generates a packing image by mapping each cutting image in each packing area in the packing layout while using the degree of importance of each cutting image as necessary and supplies the packing image to the encoding device 25. The unit of packing may be each imaging device 21 or each transmission object. Alternatively, all the cutting images may be packed as a single packing image.

The metadata generation unit 322 generates packing information metadata indicating a position where the cutting image is mapped.

The metadata generation unit 322 supplies the cutting information metadata of each cutting image included in the packing image, the packing information metadata, and the camera parameter to the encoding device 25.

(Data for Reproduction Selecting Processing)

Figure 27:
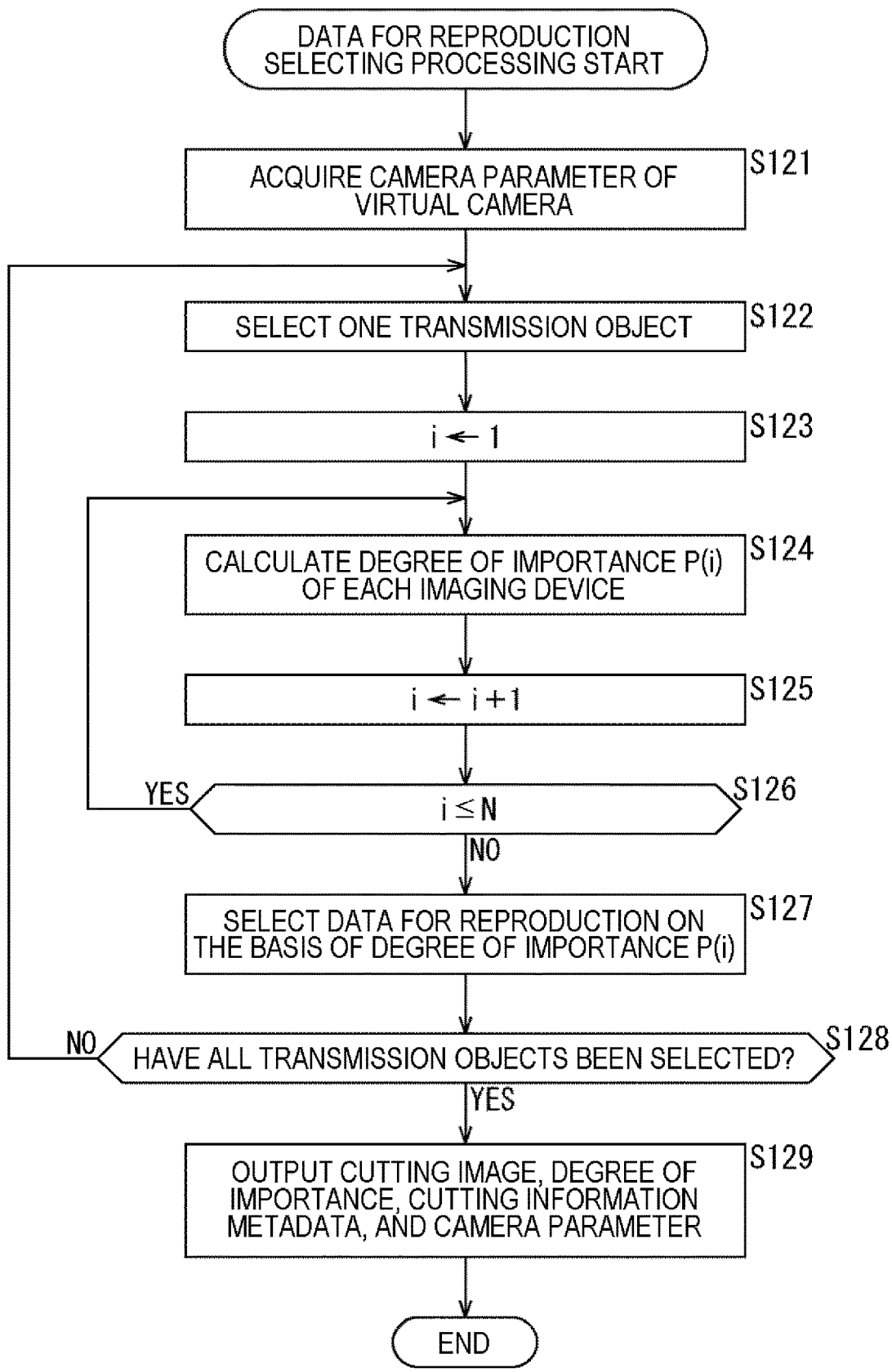
FIG. 27 is a flowchart for explaining data for reproduction selecting processing.

The data for reproduction selecting processing executed by the cutting image selection unit 300 will be described with reference to the flowchart in FIG. 27.

First, in step S121, the degree of importance setting unit 301 acquires the camera parameter of the virtual camera from the reproduction device 28 via the transmission and reception device 26 and the like. Furthermore, the degree of importance setting unit 301 acquires the camera parameter of each imaging device 21 from the cutting unit 100. The camera parameter of the virtual camera includes, for example, a parameter of the same type as the camera parameter of the imaging device 21.

In step S122, the degree of importance setting unit 301 selects one of the transmission objects.

In step S123, the degree of importance setting unit 301 sets one to a variable i.

In step S124, the degree of importance setting unit 301 calculates an degree of importance P(i) (i=1 to N) of each imaging device 21-i.

The degree of importance P(i) is calculated on the basis of, for example, at least one of relative relationships regarding positions or directions between each imaging device 21 (actual point of view) and the virtual camera.

A method of calculating the degree of importance P(i) will be described with reference to FIGS. 28 to 30. Note that, in FIGS. 28 to 30, a case will be described in which the number of imaging devices 21 is eight.

Figure 28:
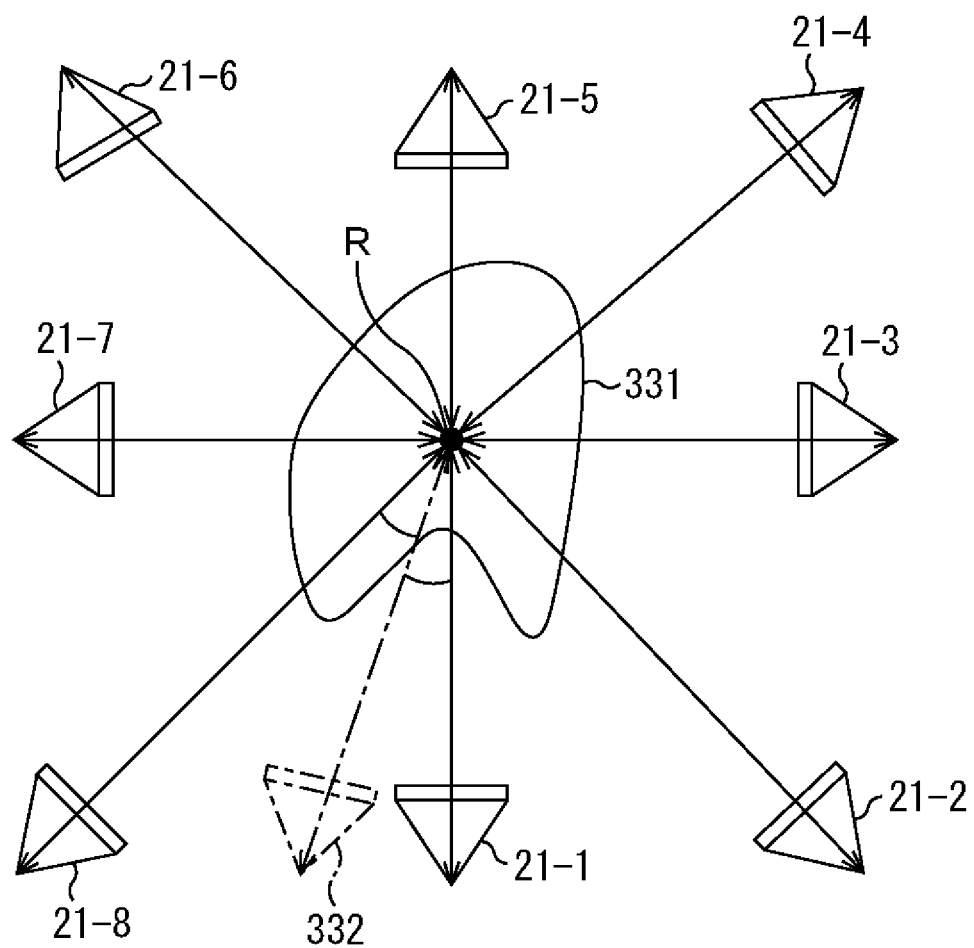
FIG. 28 is a diagram for explaining a method of calculating a degree of importance P(i).

FIG. 28 illustrates an example in which the degree of importance P(i) of each imaging device 21 is calculated on the basis of the relationship between a direction from each imaging device 21 to an object 331 to be displayed and a direction from a virtual camera 332 to the object 331. In this case, the degree of importance P(i) is calculated according to the following formula (7).

$$P(i)=Ci \cdot Cv \qquad (7)$$

Here, the reference Ci indicates a vector from the imaging device 21-i to the object 331. The reference Cv indicates a vector from the virtual camera 332 to the object 331. Ci·Cv indicates an inner product of the vector Ci and the vector Cv.

Therefore, the degree of importance P (i) is inversely proportional to an angle formed by the vector Ci and the vector Cv, and as the angle formed by the vector Ci and the vector Cv decreases, the degree of importance P(i) increases. In other words, the degree of importance P(i) of the imaging device 21 of which the direction to the object 331 is closer to that of the virtual camera 332 increases.

Note that the vector Ci and the vector Cv are set with reference to a representative point R of the object 331. The representative point R can be set by any method. For example, a point on the object 331 at which the sum of distances from optical axes of each imaging device 21 and the virtual camera 332 is a minimum value is set as the representative point R. Alternatively, for example, an intermediate position between the maximum value and the minimum value of the coordinates of the vertex of the object 331 in each of the X direction, the Y direction, and the Z direction in the world coordinate system is set as the representative point R. Alternatively, for example, the most important position of the object 331 is set as the representative point R. For example, in a case where the object 331 is a person, the center of the face of the person and the like is set as the representative point R.

Figure 29:
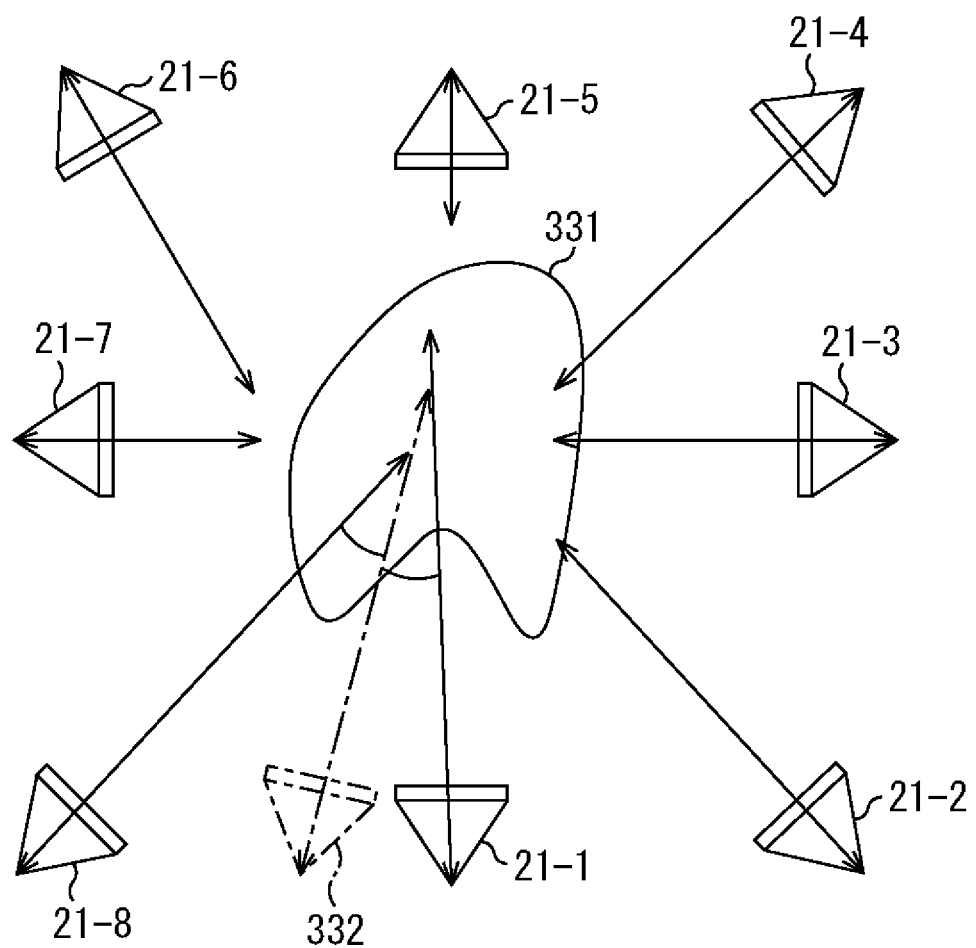
FIG. 29 is a diagram for explaining the method of calculating the degree of importance P(i).

FIG. 29 illustrates an example in which the degree of importance P(i) is calculated on the basis of the relationship between the optical axis of each imaging device 21 (actual direction of point of view) and the optical axis of the virtual camera 332 (virtual direction of point of view). In this case, the degree of importance P(i) is calculated according to the following formula (8).

$$P(i)=Zi \cdot Zv \qquad (8)$$

Here, the reference Zi indicates an optical axis vector of the imaging device 21-1. The reference Zv indicates an optical axis vector of the virtual camera 332. Zi·Zv indicates an inner product of the optical axis vector Zi and the optical axis vector Zv.

Therefore, the degree of importance P(i) is inversely proportional to an angle formed by the optical axis vector Zi and the optical axis vector Zv, and as the angle formed by the optical axis vector Zi and the optical axis vector Zv decreases, the degree of importance P(i) increases. In other words, as the direction of the optical axis of the imaging device 21 is closer to the virtual camera 332, the importance P(i) increases.

Figure 30:
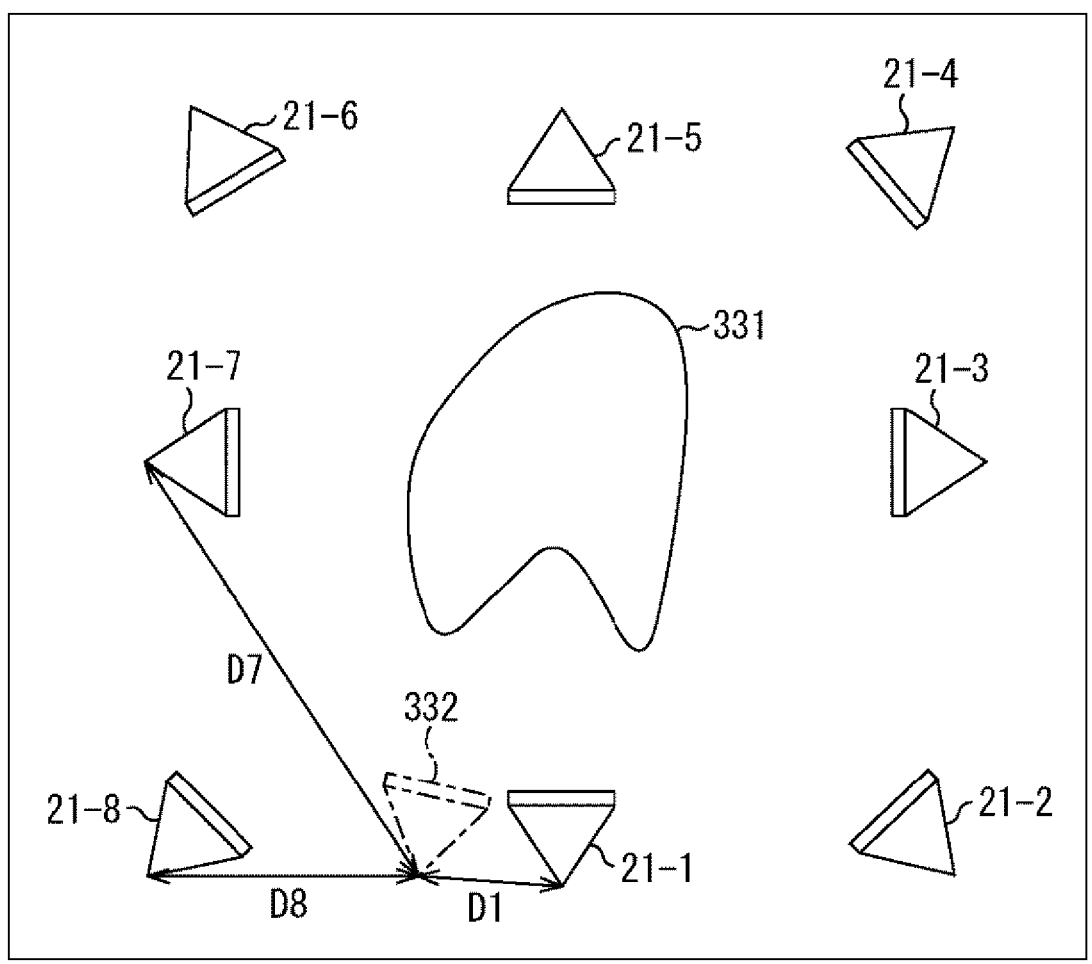
FIG. 30 is a diagram for explaining the method of calculating the degree of importance P(i).

FIG. 30 illustrates an example in which the degree of importance P(i) is calculated on the basis of a distance between each imaging device 21 and the virtual camera 332. In this case, the degree of importance P(i) is calculated according to the following formula (9).

$$P(i)=1-Di/\Sigma Di \qquad (9)$$

Here, the reference Di indicates a distance between the imaging device 21-i and the virtual camera 332.

Therefore, as the imaging device 21 is closer to the virtual camera 332, the degree of importance P(i) increases.

Note that the degree of importance P(i) in FIG. 29 and the degree of importance P(i) in FIG. 30 are unrelated to the position and the movement of the object 331. Therefore, if the positions and the directions of each imaging device 21 and the virtual camera 332 were fixed, the degree of importance P (i) can be fixed.

Note that the degree of importance setting unit 301 may set the degree of importance by combining two or more of the three types of degree of importance P(i) described above.

Furthermore, the degree of importance setting unit 301 may set the degree of importance on the basis of content of the captured image imaged by each imaging device 21. For example, the degree of importance of the imaging device 21 positioned closer to the front of the object to be displayed may be set to be high. Alternatively, for example, in a case where an object to be displayed is a person, the degree of importance of the imaging device 21 that has imaged the captured image including the face may be set to be higher.

Returning to FIG. 27, in step S125, the degree of importance setting unit 301 increments the variable i by one.

In step S126, the degree of importance setting unit 301 determines whether or not the variable i is equal to or less than N. Note that the reference N indicates the number of imaging devices 21. In a case where it is determined that the variable i is equal to or less than N, the processing returns to step S124.

Thereafter, until it is determined in step S126 that the variable i is larger than N, the processing in steps S124 to S126 is repeatedly executed. With this operation, the degree of importances P(i) of all the imaging devices 21-i are calculated.

On the other hand, in a case where it is determined in step S126 that the variable i is larger than N, the processing proceeds to step S127.

In step S127, the reproduction data selection unit 302 selects data for reproduction on the basis of the degree of importance P(i). In other words, the reproduction data selection unit 302 selects Q cutting images from the imaging devices 21 having higher degree of importance P(i).

Note that all the cutting images imaged by the imaging device 21 of which the degree of importance P(i) is equal to or more than a predetermined threshold may be selected without selecting a predetermined number of cutting images. In this case, the number of cutting images to be selected is not fixed.

Furthermore, the reproduction data selection unit 302 sets the degree of importance P(i) of the imaging device 21 that has captured the cutting image as the degree of importance of each cutting image.

In step S128, the reproduction data selection unit 302 determines whether or not all the transmission objects have been selected.

In a case where it is determined in step S128 that all the transmission objects have not been selected yet, the processing returns to step S122, and the processing in steps S122 to S127 described above is repeated. In other words, the next transmission object is selected, and similar processing is executed.

On the other hand, in a case where it is determined in step S128 that ail the transmission objects have been selected, the processing proceeds to step S1129, and the reproduction data selection unit 302 supplies the selected cutting image and degree of importance of the cutting image, cutting information metadata corresponding to the cutting image, and a camera parameter to the packing unit 320, and the data for reproduction selecting processing is terminated.

(Packing Processing)

Figure 31:
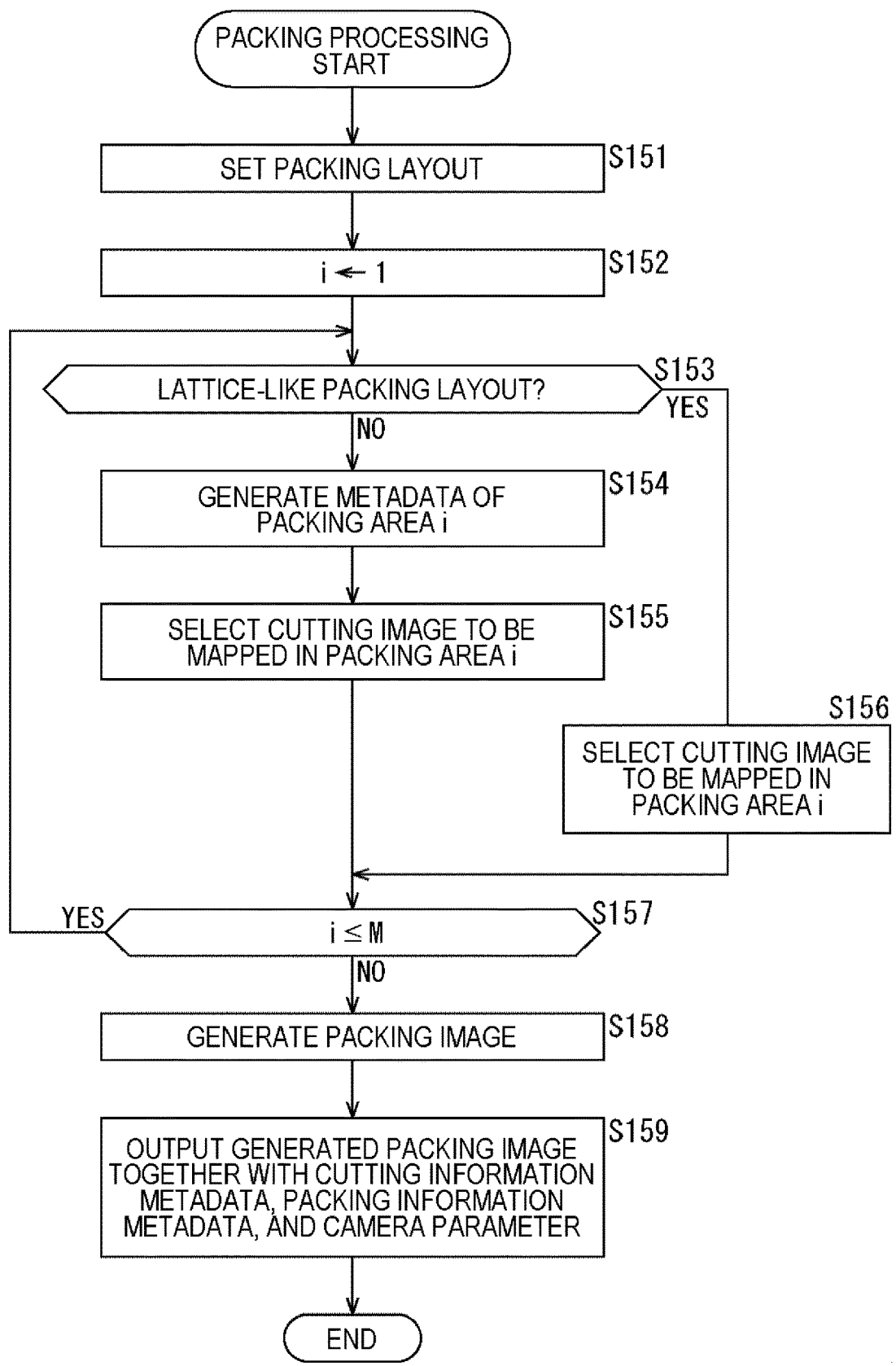
FIG. 31 is a flowchart for explaining packing processing.

Next, packing processing executed by the packing unit 320 will be described with reference to the flowchart in FIG. 31.

First, in step S151, the packing image generation unit 321 sets a packing layout. Here, in the packing layout, a layout of a packing area for mapping the cutting image in a rectangular area same as the packing image is illustrated.

For example, the packing layout is set on the basis of the number of selected cutting images (referred to as selection number below) and the degree of importance of each cutting image.

For example, in a case where the selection number of cutting images can vary, the packing layout is set on the basis of the selection number. For example, a packing layout is set in which a rectangular area as large as the packing image is divided into the selection number of packing areas. At this time, the shapes and the sizes of the packing areas may be the same or different. In a case where the shapes and the sizes are different from each other, for example, the packing area where the cutting image with a higher degree of importance is mapped is larger.

Figure 32:
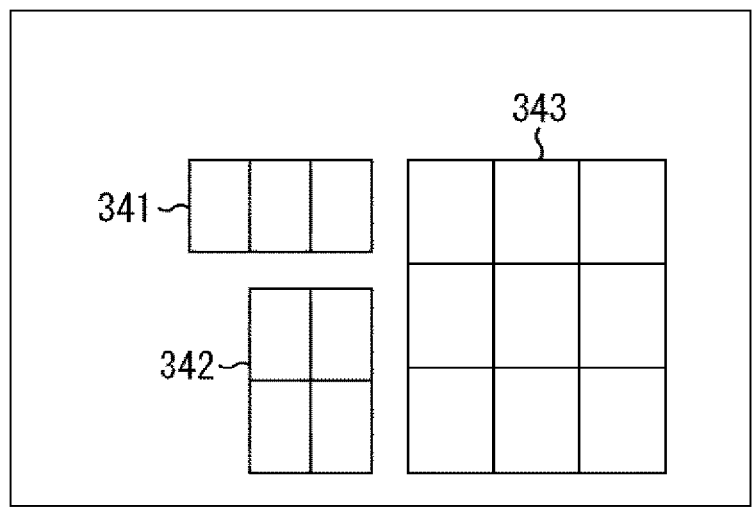
FIG. 32 is a diagram of an example of a packing layout.

FIG. 32 illustrates an example of a packing layout in which packing areas having the same shape and size are arranged in a lattice.

In a packing layout 341, rectangular packing areas having the same shape and size are arranged in one vertical row and three horizontal columns. In a packing iayout 342, rectangular packing areas having the same shape and size are arranged in two vertical rows and two horizontal columns. In a packing layout 343, rectangular packing areas having the same shape and size are arranged in three vertical rows and three horizontal columns.

On the other hand, in a case where the selection number of the cutting images is fixed, the packing layout may be fixed or changed as necessary. In a case where the packing layout is fixed, the shapes and the sizes of the packing areas may be the same or different. In a case where the shapes or the sizes of the packing areas are different from each other, for example, a packing area where the cutting image with a higher degree of importance is mapped is larger. On the other hand, in a case where the packing layout can be changed, for example, the size of each packing area is set according to the degree of importance of each cutting image. For example, the packing area where the cutting image with a higher degree of importance is mapped is larger.

In step S152, the packing image generation unit 321 sets one to the variable i.

In step S153, the packing image generation unit 321 determines whether or not the packing layout is a lattice-like packing layout. In a case where the packing areas having the same shape and size are not arranged in a lattice in the set packing layout, the packing image generation unit 321 determines that the packing layout is not the lattice-like packing layout, and the processing proceeds to step S154.

In step S154, the metadata generation unit 322 generates metadata of a packing area i. Specifically, in a case of the packing layout that is not a lattice-like packing layout, the packing information metadata includes multiple pieces of packing area metadata corresponding to the packing areas. Then, the metadata generation unit 322 generates packing area metadata corresponding to the packing area i.

Figure 33:
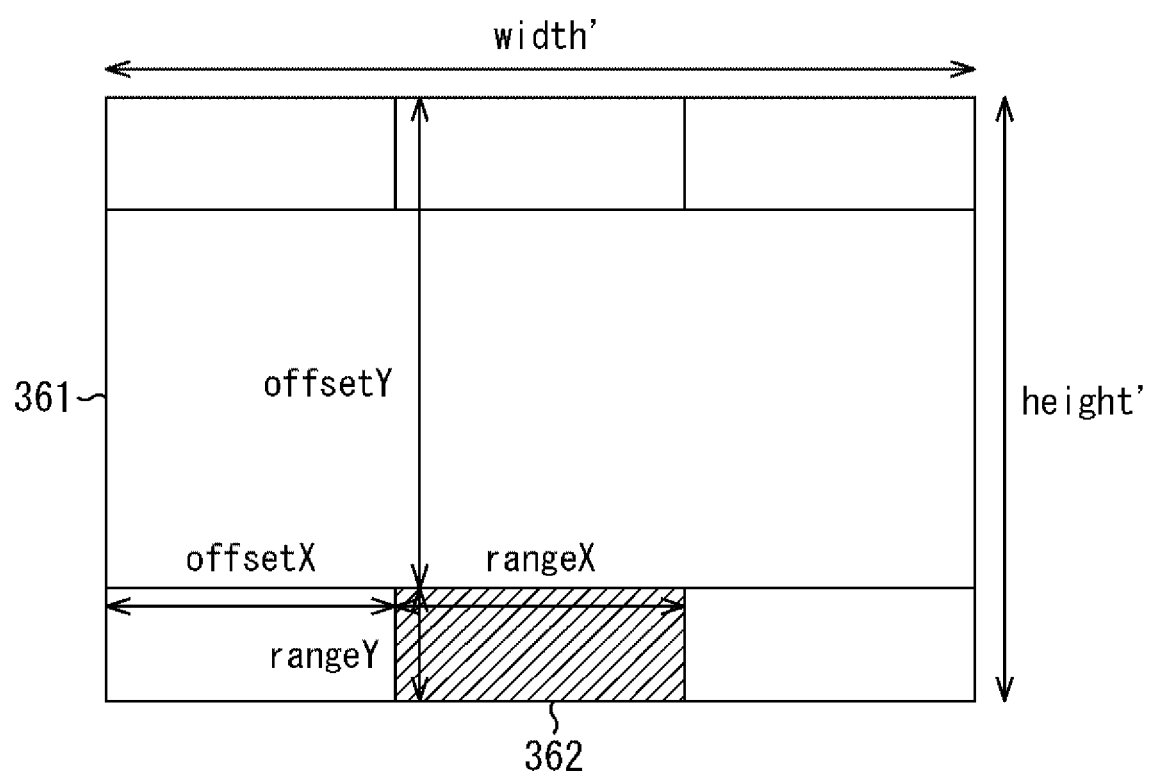
FIG. 33 is a diagram of an example of a packing layout that is not a lattice-like layout.

FIG. 33 illustrates an example of a packing layout that is not a lattice-like packing layout.

In a packing layout 361 in FIG. 33, packing areas having the same shape and size are arranged in one vertical row and three horizontal columns on each of the upper side and the lower side of a large packing area at the center.

For example, each parameter of packing area metadata of a packing area 362 indicated by hatching in the packing layout 361 is calculated according to the following formulas (10) to (13).

$$occupancyX = rangeX/width' \quad (10)$$

$$occupancyY = rangeY/height' \quad (11)$$

$$normOffsetX = offsetX/width' \quad (12)$$

$$normOffsetY = offsetY/height' \quad (13)$$

Here, width' indicates the width of the packing iayout 361 (packing image), and height' indicates the height of the packing layout 361. The term rangeX is the width of the packing area 362, and the term rangeY indicates the height of the packing area 362. The term offsetX indicates a distance in the X direction (width direction) between the upper left corner of the packing layout 361 and the upper left corner of the packing area 362, and the term offsetY indicates a distance in the Y direction (height direction) between the upper left corner of the packing layout 361 and the upper left corner of the packing area 362.

Therefore, the term occupancyX indicates an occupancy of the packing area 362 in the X direction in the packing layout 361 (packing image), and the term occupancyY indicates an occupancy of the packing area 362 in the Y direction in the packing layout 361. The term normOffsetX is a parameter obtained by normalizing offsetX, and the term normOffsetY is a parameter obtained by normalizing offsetY.

In step S155, the packing image generation unit 321 selects a cutting image to be mapped in the packing area i. At this time, for example, the packing image generation unit 321 selects the cutting image so that the cutting image with a higher degree of importance is mapped in the larger packing area. Alternatively, for example, the packing image generation unit 321 selects a cutting image having a shape close to the shape of the packing area i.

Furthermore, the metadata generation unit 322 adds identification information (ID) indicating the imaging device 21 corresponding to the selected cutting image to the packing area metadata.

FIG. 34 illustrates a specific example of the packing area metadata.

In the example in FIG. 34, normOffsetX, occupancyX, normOffsetY, and occupancyY are respectively set to 0.33, 0.33, 0.8, and 0.2. Furthermore, camera id is set to one. The reference camera_id indicates a parameter indicating the ID of the imaging device 21 corresponding to the cutting image mapped in the packing area.

After the cutting image to be mapped in the packing area i is selected and the ID of the imaging device 21 is added to the packing area metadata corresponding to the packing area i in step S155, the processing proceeds to step S157.

On the other hand, in a case where it is determined in step S153 that the packing layout is a lattice-like packing layout, the processing proceeds to step S156.

In step S156, the packing image generation unit 321 selects the cutting image to be mapped in the packing area i as in the processing in step S155. Furthermore, the metadata generation unit 322 adds the ID of the imaging device 21 corresponding to the selected cutting image to the packing information metadata.

Figure 35:
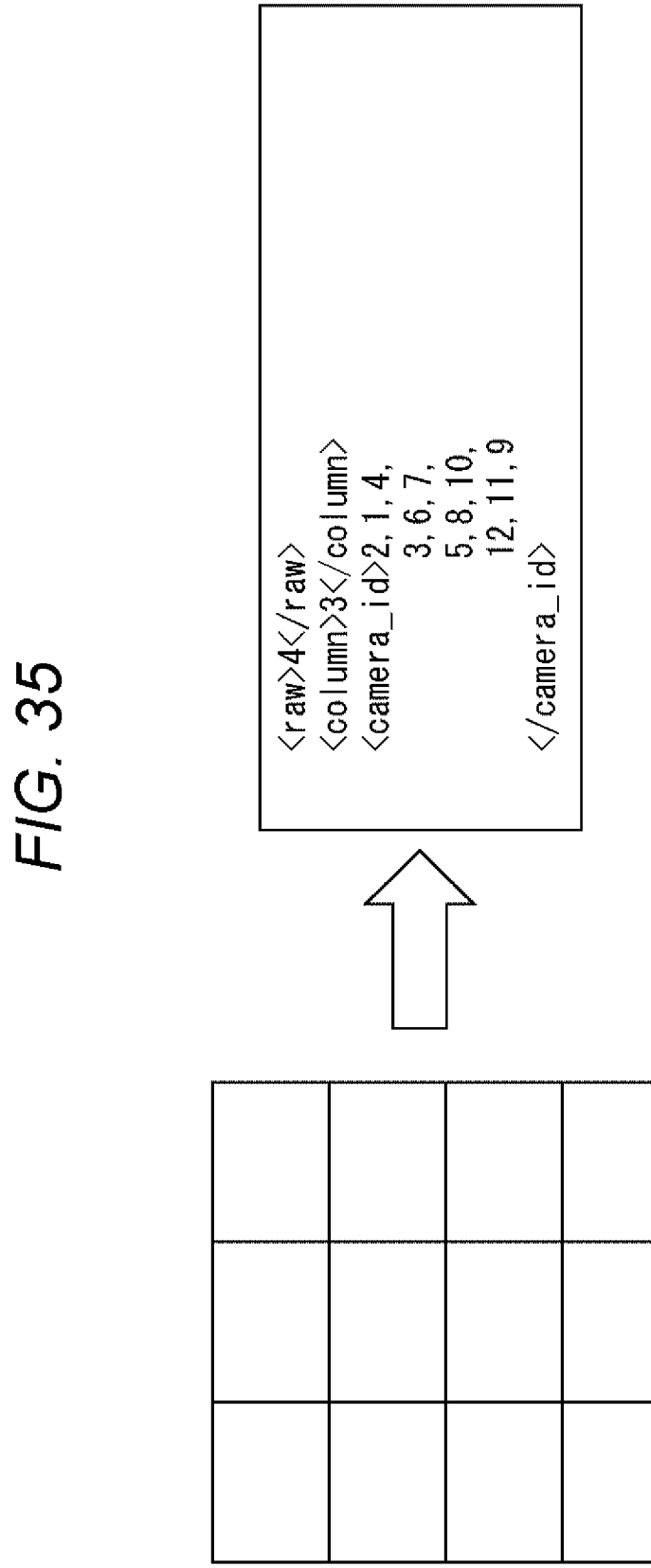
FIG. 35 is a diagram of an example of packing information metadata.

FIG. 35 illustrates an example of the packing information metadata corresponding to the lattice-like packing layout.

The left side of FIG. 35 illustrates an example of the packing layout. In this packing layout, the packing areas having the same shape and size are arranged in a lattice of four vertical rows and three horizontal columns.

The right side of FIG. 35 illustrates an example of the packing information metadata generated with respect to the packing layout on the left side. In this example, a parameter raw indicating the number of rows in the packing layout is set to four, and a parameter column indicating the number of columns is set to three. Furthermore, the parameter camera_id indicating the ID of the imaging device 21 corresponding to the cutting image to be mapped in each packing area is set. For example, camera_id of a packing area in the first row and the first column is set to two, camera_id of a packing area in the first row and the second column is set to one, and camera_id of a packing area in the second row and the first column is set to three.

For example, the metadata generation unit 322 sets values of the parameters raw and column in the processing in first step S156 in a loop. Furthermore, in the processing in step S156 in each loop, the metadata generation unit 322 sets the ID of the imaging device 21 corresponding to the cutting image to the parameter camera_id corresponding to the packing area where the cutting image is mapped.

In step S156, the cutting image to be mapped in the packing area i is selected, and the ID of the imaging device 21 is added to the packing information metadata. Thereafter, the processing proceeds to step S157.

In step S157, the metadata generation unit 322 determines whether or not the variable i is equal to or less than M. Note that the reference M represents the number of packing areas in the packing layout.

In a case where it is determined in step S157 that the variable i is equal to or less than M, the processing returns to step S153, and the processing in steps S153 to S157 is repeatedly executed until it is determined in step S157 that the variable i is larger than M. With this operation, the cutting image to be mapped in each packing area in the packing layout is selected, and the packing information metadata is generated.

On the other hand, in a case where it is determined in step S157 that the variable i is larger than M, the processing proceeds to step S158.

In step S158, the packing image generation unit 321 generates a packing image. Specifically, the packing image generation unit 321 maps each cutting image in each packing area of the packing layout. With this operation, a packing image in which a plurality of cutting images is combined into one piece of an image is generated.

Figure 36:
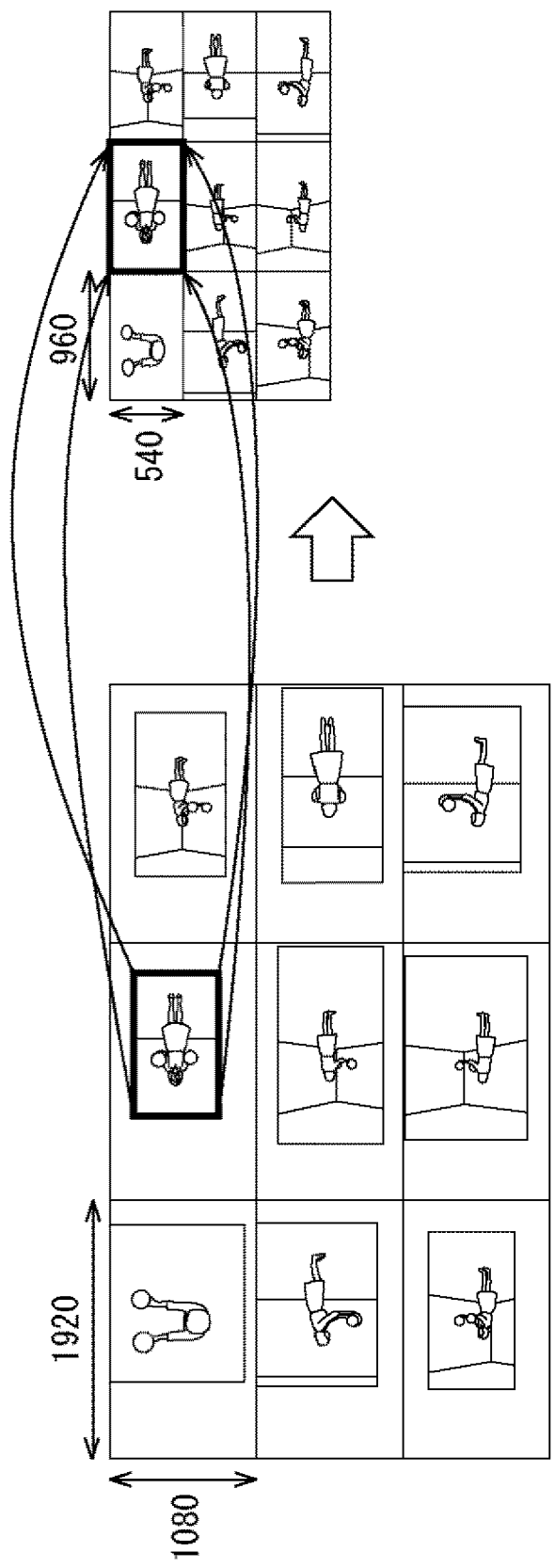
FIG. 36 is a diagram for explaining generation of a packing image.

For example, as illustrated in FIG. 36, cutting images cut from nine captured images including vertically arranged 1080 pixels and horizontally arranged 1920 pixels are respectively mapped in packing areas, each including vertically arranged 540 pixels and horizontally arranged 960 pixels, in the packing layout that are arranged in three rows and three columns. With this operation, the nine cutting images are combined into a single packing image.

Figure 37:
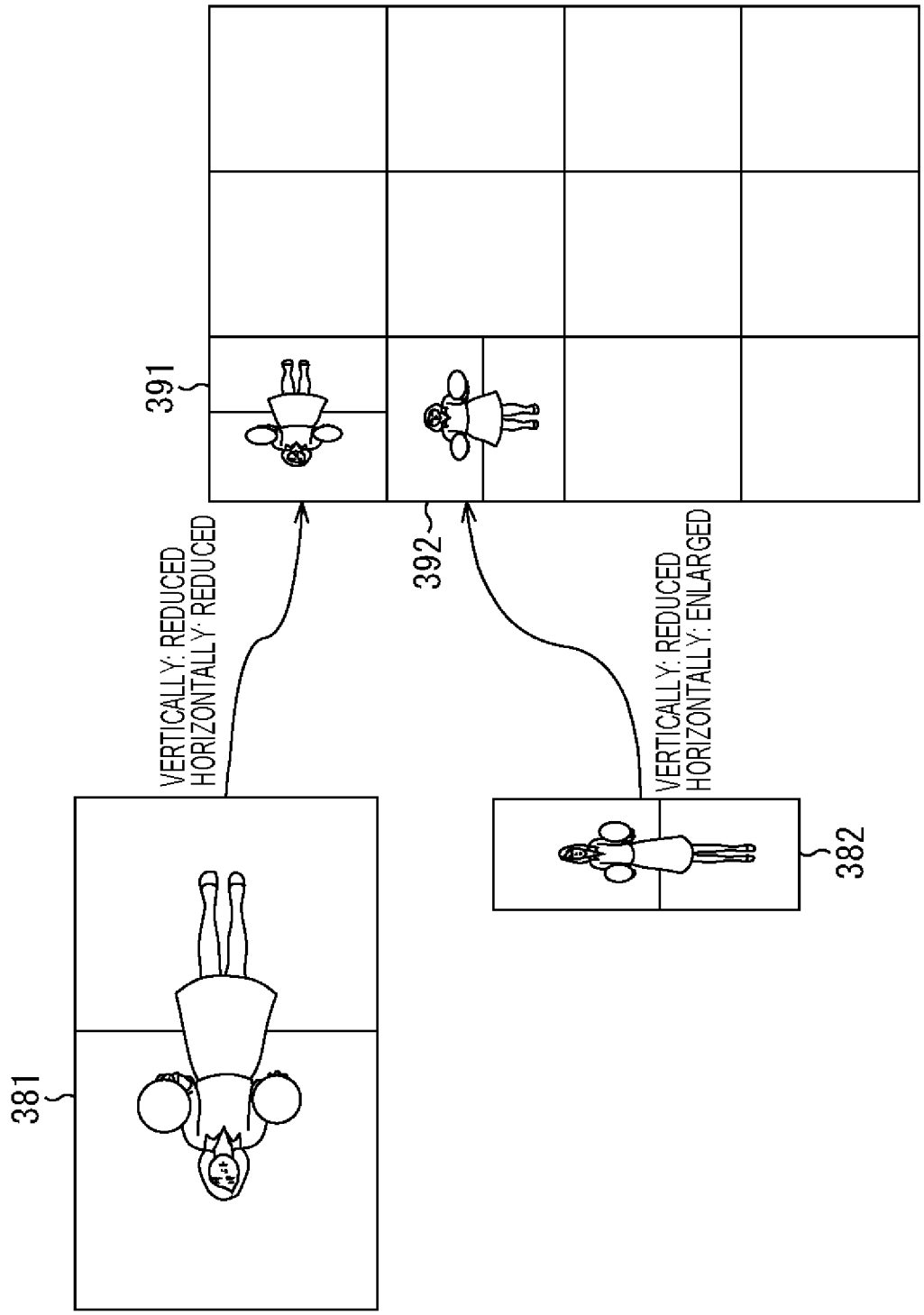
FIG. 37 is a diagram for explaining zooming of a cutting image.

At this time, the packing image generation unit 321 zooms the cutting image so as to adjust the size of each cutting image to the size of the packing area where the cutting image is mapped. For example, as illustrated in FIG. 37, in a case where a cutting image 381 is mapped in a packing area 391, the lengths of the cutting image 381 in the vertical direction and the horizontal direction are reduced. Furthermore, in a case where a cutting image 382 is mapped in a packing area 392, the length of the cutting image 382 in the vertical direction is reduced, and the length in the horizontal direction is enlarged.

Similarly, the packing image generation unit 321 maps each cutting image in each packing area of the packing layout. With this operation, a packing image in which the cutting images are combined into one piece of an image is generated.

In step S159, the packing unit 320 outputs the generated packing image together with cutting information metadata of each cutting image, the packing information metadata of the packing image, and the camera parameter to the encoding device 25, and the packing processing is terminated.

(Fifth Object Selection Processing)

Figure 38:
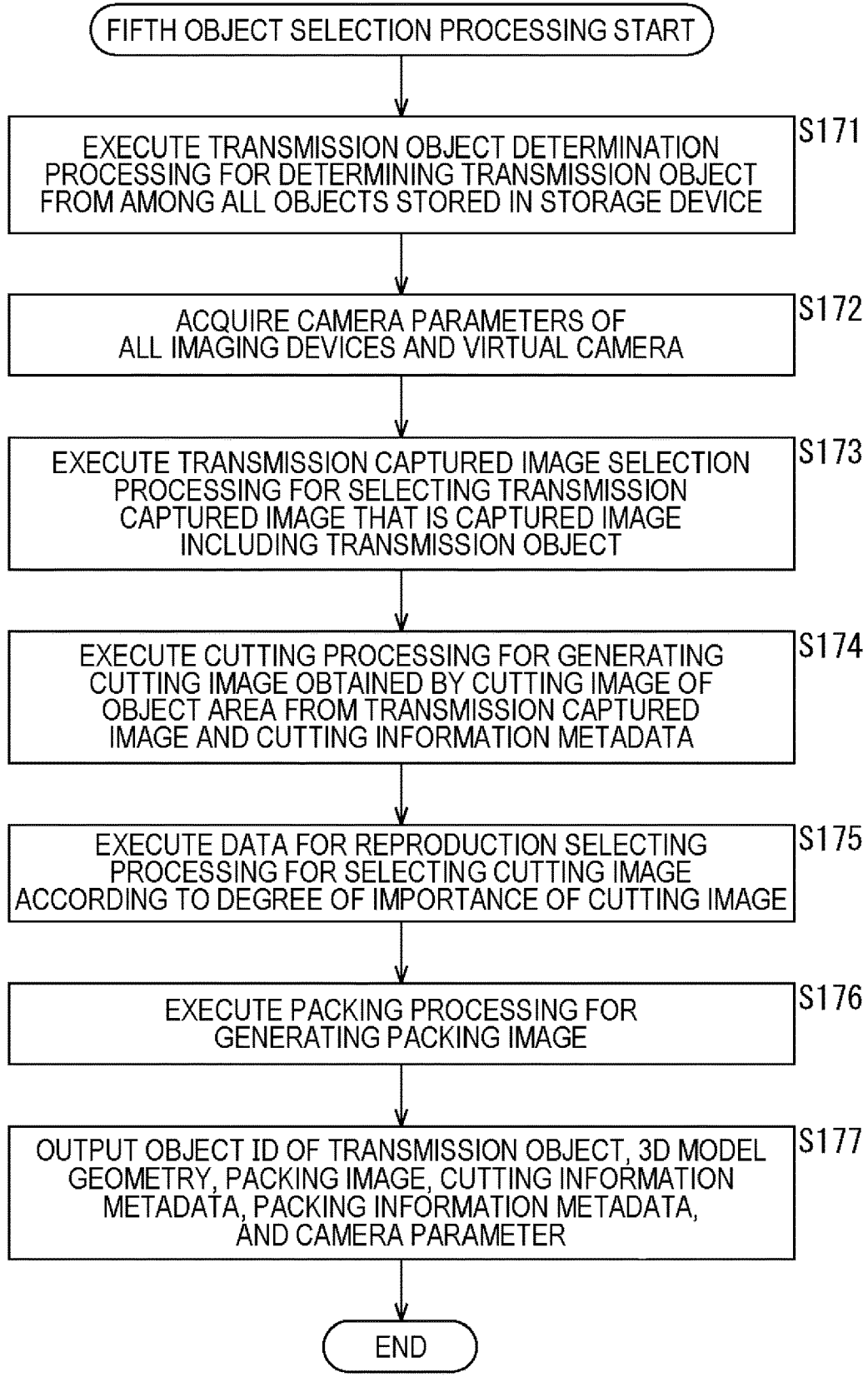
FIG. 38 is a flowchart for explaining fifth object selection processing.

FIG. 38 is a flowchart for explaining object selection processing (fifth object selection processing) by the selection device 24E. This processing is started, for example, when the reproduction device 28 is turned on and the viewer performs an operation for starting reproduction.

First, in step S171, the 3D model selection unit 61 executes transmission object determination processing for determining the transmission object from among all the objects stored in the storage device 23.

In other words, in step S171, the 3D model selection unit 61 executes the first object selection processing in FIG. 8 for determining the transmission object on the basis of the virtual camera viewing range information as the object specification information or the second object selection processing in FIG. 12 for determining the transmission object on the basis of the object specification information indicating the object specified by the viewer. The object ID and the 3D model data of the transmission object obtained as a result of the processing are supplied to the image selection unit 81.

In step S172, the image selection unit 81 acquires the camera parameters of all the imaging devices 21 and the virtual camera.

In step S173, the image selection unit 81 executes transmission captured image selection processing for selecting the transmission captured image that is the captured image including the transmission object from among the captured images as many as the number of imaging devices 21. In other words, the image selection unit 81 executes the processing in steps S53 to S57 in FIG. 16. With this operation, one or more transmission captured images of the captured images imaged by the plurality of imaging devices 21 and the camera parameter of the imaging device 21 are supplied to the cutting unit 100.

In step S174, the cutting unit 100 executes the cutting processing for generating the cutting image obtained by cutting the image of the object area from one or more transmission captured images and the cutting information metadata indicating the position of the cutting area. In other words, the cutting unit 100 executes the processing in steps S71 to S77 in FIG. 21. The generated cutting image, the cutting information metadata of the cutting image, and the camera parameters of all the imaging devices 21 and the virtual camera are supplied to the cutting image selection unit 300.

In step S175, the cutting image selection unit 300 executes the data for reproduction selecting processing for selecting the cutting image according to the degree of importance of the cutting image so that the number of cutting images to be transmitted to the reproduction device 28 as the data for reproduction is a predetermined value (for example, equal to or less than Q). In other words, the cutting image selection unit 300 executes the processing in steps S121 to S129 in FIG. 27.

In step S176, the packing unit 320 executes the packing processing for generating a packing image by packing the plurality of cutting images selected by the cutting image selection unit 300 into a single piece of an image. In other words, the packing unit 320 executes the processing in steps S151 to S158 in FIG. 31.

In step S177, the selection device 24E outputs the object ID of the transmission object, the 3D model geometry, the packing image, the cutting information metadata, the packing information metadata, and the camera parameter to the encoding device 25, and the fifth object selection processing is terminated. The object ID of the transmission object and the 3D model geometry are output from the 3D model selection unit 61, and the packing image, the cutting information metadata, the packing information metadata, and the camera parameter are output from the packing unit 320.

According to the fifth object selection processing, since only the 3D model data of the object specified by the object specification information is transmitted to the reproduction device 28, the transmission band can be reduced.

Furthermore, according to the transmission captured image selection processing, the captured image that does not include the object specified by the object specification information is not transmitted as a non-transmission captured image. Therefore, the transmission band can be further reduced.

Moreover, since the cutting image obtained by cutting the image of the object area from the captured image including the object is generated and transmitted, the transmission band can be further reduced than that in a case where the captured image is transmitted as it is.

Furthermore, according to the data for reproduction selecting processing, since the number of cutting images is reduced to a predetermined number according to the degree of importance of the cutting image and the cutting images are packed into a single piece of the image and transmitted by the packing processing, the image can be viewed at an optimal resolution while reducing the transmission band.

8. Sixth Embodiment of Selection Device (Exemplary Configuration of Selection Device)

Figure 39:
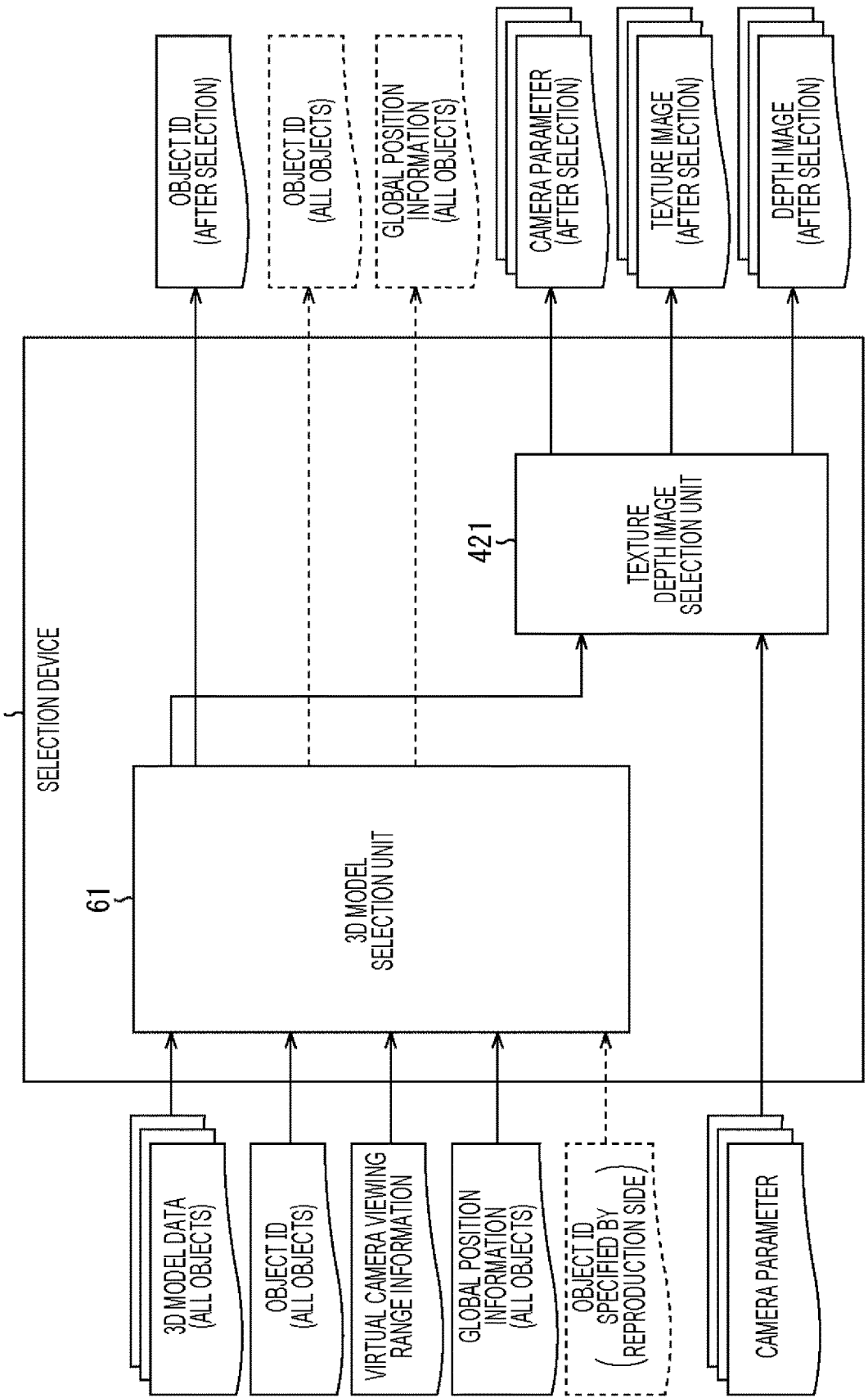
FIG. 39 is a block diagram of an exemplary configuration of a sixth embodiment of the selection device.

FIG. 39 illustrates an exemplary configuration of a selection device 24F as a sixth embodiment of the selection device 24.

In the sixth embodiment, components corresponding to those of the first to fifth embodiments are denoted with the same reference numerals, and the description thereof will be omitted.

In the selection device 24F, the multi-texture depth format is applied as the data format of the 3D model data in which the color information of the object includes captured images as many as the number of imaging devices 21 and the geometry information of the object includes depth images as many as the number of imaging devices 21. Note that, in the following description, the captured image as the color information is referred to as a texture image so as to be easily distinguished from the depth image.

The selection device 24F includes a 3D model selection unit 61 and a texture depth image selection unit 421. In other words, the selection device 24F has a configuration in which the texture depth image selection unit 421 is added, in addition to the 3D model selection unit 61 as in the third embodiment.

The 3D model data of all the objects is supplied to the 3D model selection unit 61. The 3D model data includes the texture images and the depth images as many as the number of imaging devices 21.

The 3D model selection unit 61 determines (select) a transmission object from among all the objects stored in the storage device 23 on the basis of the object specification information. The 3D model selection unit 61 supplies 3D model data of the determined transmission object, in other words, a plurality of texture images and depth images to the texture depth image selection unit 421.

The camera parameters of all the imaging devices 21 are supplied from the storage device 23 to the texture depth image selection unit 421.

The texture depth image selection unit 421 executes processing similar to the processing of the image selection unit 61 according to the third embodiment illustrated in FIG. 13. However, the 3D model data used by the image selection unit 81 according to the third embodiment is the data in the multi-texture geometry format. Whereas, the 3D model data used by the texture depth image selection unit 421 is the data in the multi-texture depth format. The texture depth image selection unit 421 is different from the image selection unit 81 in this point.

In other words, the texture depth image selection unit 421 executes the transmission image selection processing for selecting a texture image and a depth image including the transmission object from among the texture images and the depth images as many as the number of imaging devices 21.

Figure 40:
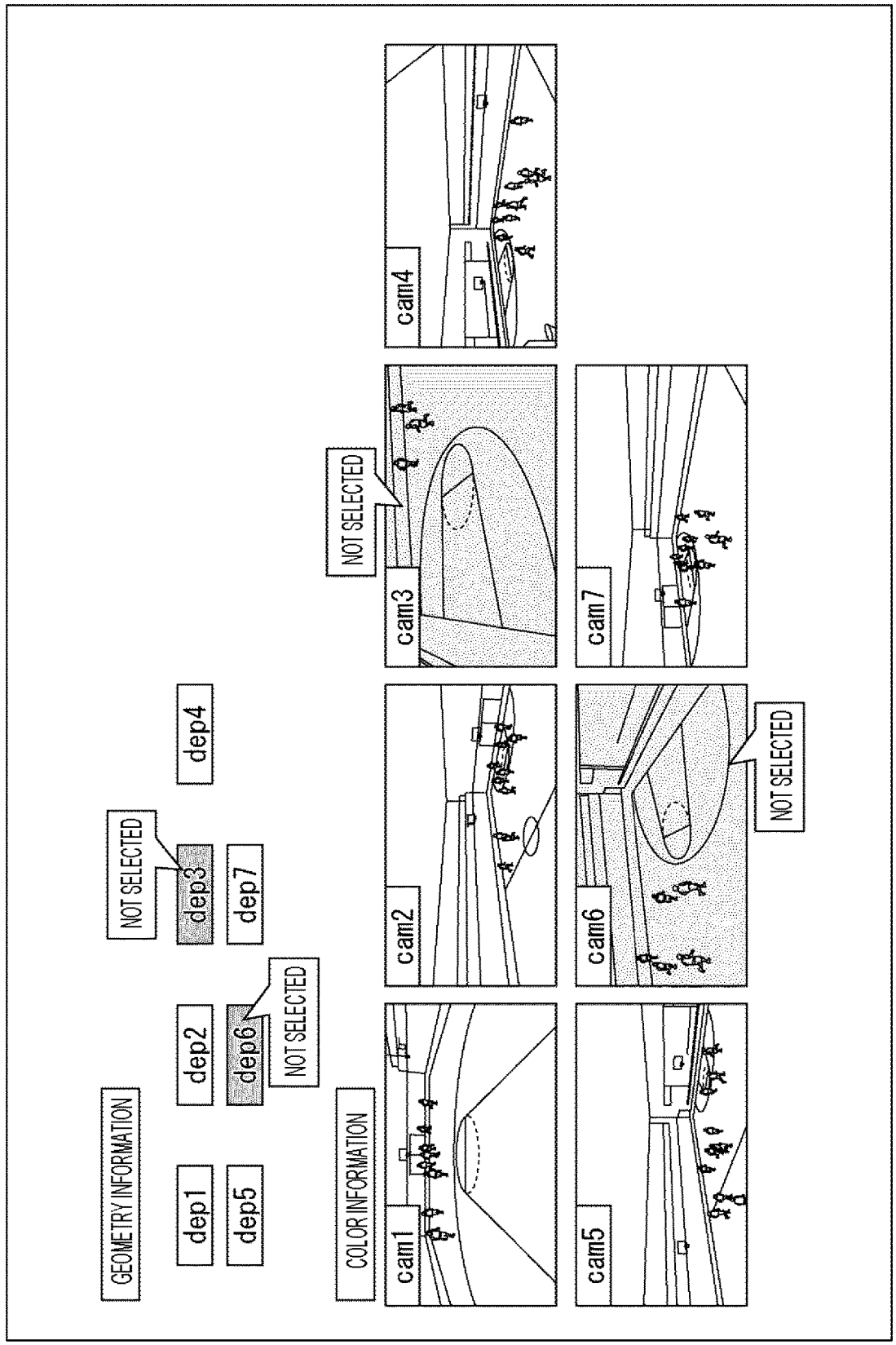
FIG. 40 is a diagram for explaining transmission image selection processing.

FIG. 40 is a diagram for explaining the transmission image selection processing executed by the texture depth image selection unit 421. FIG. 40 corresponds to FIG. 15 described in the third embodiment.

When FIG. 40 is compared with FIG. 15 described in the third embodiment, the texture image that is the color information is the same, and the geometry information is changed from the geometry information expressed by the polygon meshes to the geometry information expressed by the depth image. In FIG. 40, references dep 1 to dep 7 indicate depth images generated by the seven imaging devices 21-1 to 21-7.

As in the example described in FIG. 15, it is assumed that texture images imaged by the imaging devices 21-3 and 21-6 be determined as the texture images that are not transmitted from among the seven texture images imaged by the seven imaging devices 21-1 to 21-7. In this case, similarly for the depth image, the texture depth image selection unit 421 determines the depth images generated by the imaging devices 21-3 and 21-6 as depth images that are not transmitted.

The texture depth image selection unit 421 outputs the object ID and the 3D model data of the transmission object to the encoding device 25. However, the 3D model data is data in the multi-texture depth format expressed by the texture image and the depth image, and includes only the texture image and the depth image including the transmission object from among the captured images as many as the number of imaging devices 21. Furthermore, the image selection unit 81 outputs the camera parameter of the imaging device 21 corresponding the texture image and the depth image to be transmitted as the 3D model data to the encoding device 25.

(Sixth Object Selection Processing)

Figure 41:
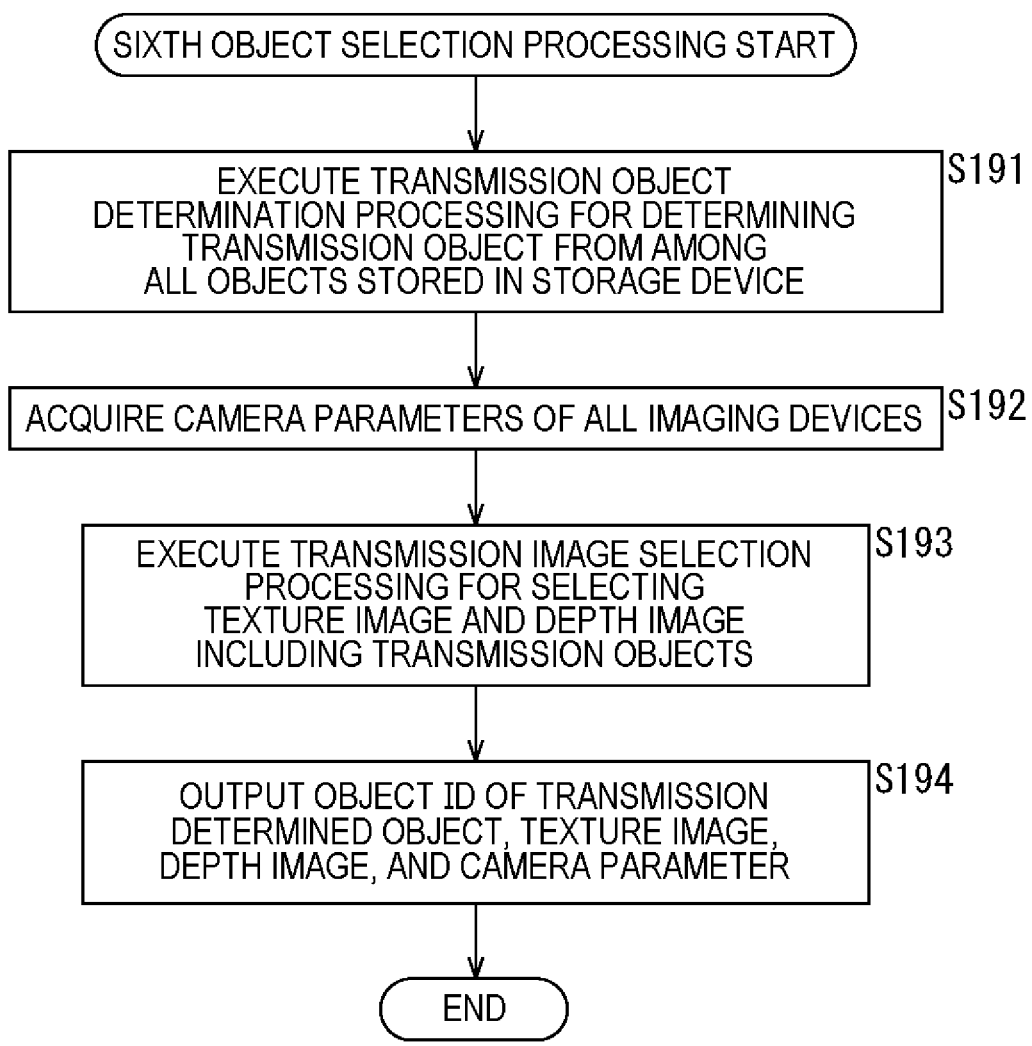
FIG. 41 is a flowchart for explaining sixth object selection processing.

FIG. 41 is a flowchart for explaining object selection processing (sixth object selection processing) by the selection device 24F. This processing is started, for example, when the reproduction device 28 is turned on and the viewer performs an operation for starting reproduction.

First, in step 8191, the 3D model selection unit 61 executes transmission object determination processing for determining the transmission object from among all the objects stored in the storage device 23.

In other words, in step S191, the 3D model selection unit 61 executes the first object selection processing in FIG. 8 for determining the transmission object on the basis of the virtual camera viewing range information as the object specification information or the second object selection processing in FIG. 12 for determining the transmission object on the basis of the object specification information indicating the object specified by the viewer. The object ID and the 3D model data of the transmission object obtained as a result of the processing are supplied to the texture depth image selection unit 421.

In step S192, the texture depth image selection unit 421 acquires the camera parameters of all the imaging devices 21 from the storage device 23.

In step S193, the texture depth image selection unit 421 executes the transmission image selection processing for selecting a texture image and a depth image including the transmission object from among the texture images and the depth images as many as the number of imaging devices 21.

In step S194, the selection device 24F outputs the object ID of the transmission object, the 3D model data including the texture image and the depth image including the transmission object, and the camera parameter of the imaging device 21 corresponding to the texture image and the depth image to be transmitted to the encoding device 25, and the sixth object selection processing is terminated. The object ID of the transmission object is output from the 3D model selection unit 61, and the 3D model data and the camera parameter are output from the texture depth image selection unit 421.

According to the sixth object selection processing, since only the 3D model data of the object specified by the object specification information is transmitted to the reproduction device 28, the transmission band can be reduced.

Furthermore, according to the transmission image selection processing, since the texture image and the depth image that do not include the object specified by the object specification information are not transmitted, the transmission band can be further reduced.

9. Seventh Embodiment of Selection Device (Exemplary Configuration of Selection Device)

Figure 42:
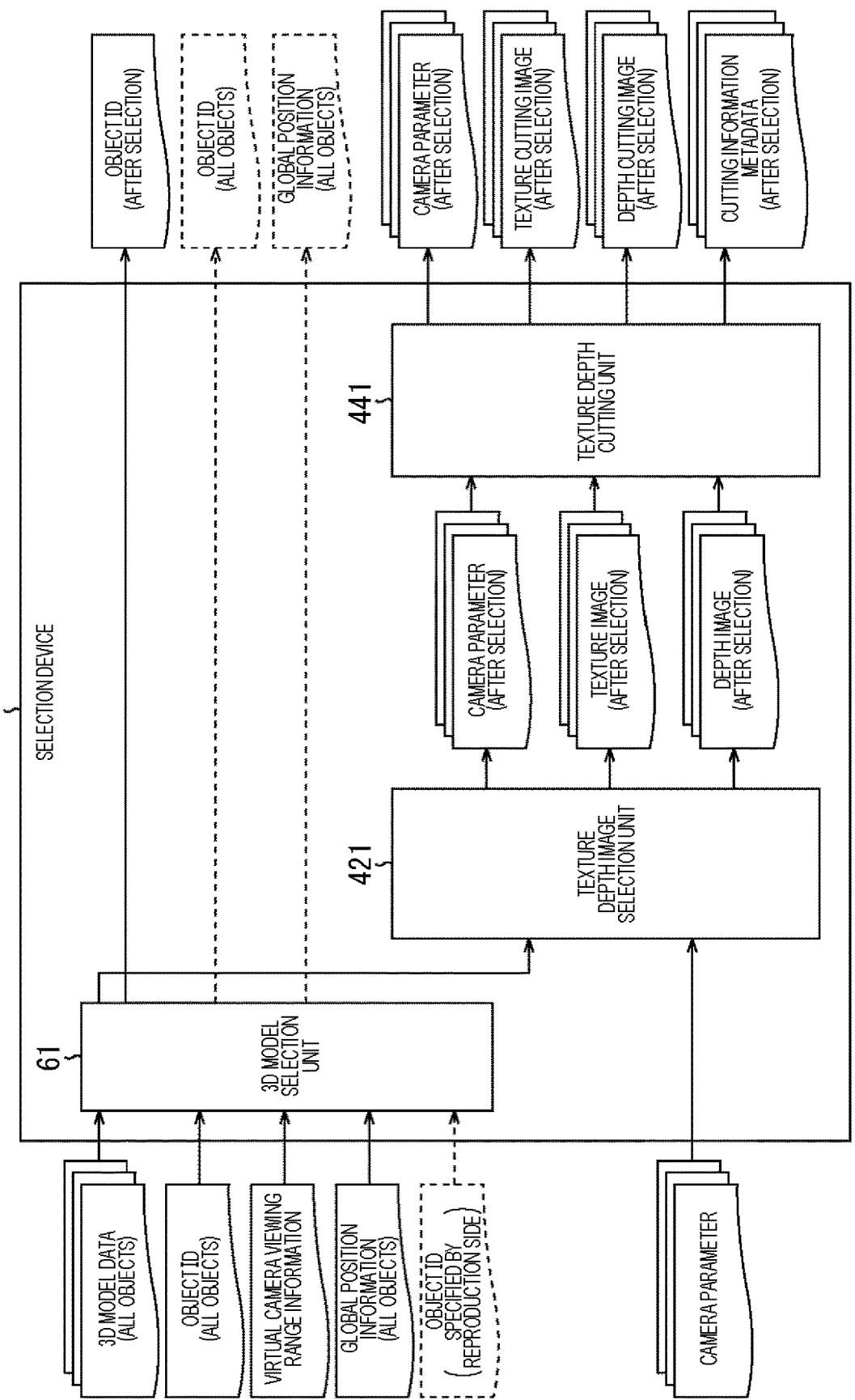
FIG. 42 is a block diagram of an exemplary configuration of a seventh embodiment of the selection device.

FIG. 42 illustrates an exemplary configuration of a selection device 24G as a seventh embodiment of the selection device 24.

In the seventh embodiment, components corresponding to those of the first to sixth embodiments are denoted with the same reference numerals, and the description thereof will be omitted.

In the selection device 24G, the multi-texture depth format is applied as the data format of the 3D model data as in the sixth embodiment.

The selection device 24G includes a 3D model selection unit 61, a texture depth image selection unit 421, and a texture depth cutting unit 441.

In other words, the selection device 24G according to the seventh embodiment has a configuration in which the texture depth cutting unit 441 is added to the 3D model selection unit 61 and the texture depth image selection unit 421 as in the sixth embodiment illustrated in FIG. 39. Other configuration of the seventh embodiment is the same as that of the sixth embodiment.

The texture image and the depth image including the transmission object and the camera parameter of the imaging device 21 are supplied from the texture depth image selection unit 421 to the texture depth cutting unit 441.

The texture depth cutting unit 441 executes the cutting processing for cutting an image of an object area similarly to the cutting unit 100 in the fourth embodiment illustrated in FIG. 17. However, the data format of the 3D model data is the multi-texture geometry format expressed by the polygon mesh and the texture image in the fourth embodiment. Whereas, in the seventh embodiment, the data format is the multi-texture depth format expressed by the texture image and the depth image. The seventh embodiment is different from the fourth embodiment in this point.

More specifically, the texture depth cutting unit 441 generates a texture cutting image by cutting an image of an object area from a texture image including a transmission object supplied from the texture depth image selection unit 421. The generation of the texture cutting image is similar to that of the cutting unit 100 according to the fourth embodiment.

Furthermore, the texture depth cutting unit 441 generates a depth cutting image by cutting an image of an object area from a depth image including a transmission object supplied from the texture depth image selection unit 421.

Moreover, the texture depth cutting unit 441 generates cutting information metadata indicating positions of the cutting areas from the texture image and the depth image. The texture depth cutting unit 441 supplies the texture cutting image, the depth cutting image, the cutting information metadata of these images, and the camera parameter of each imaging device 21 to the encoding device 25.

(Description of Depth Image)

Figure 43:
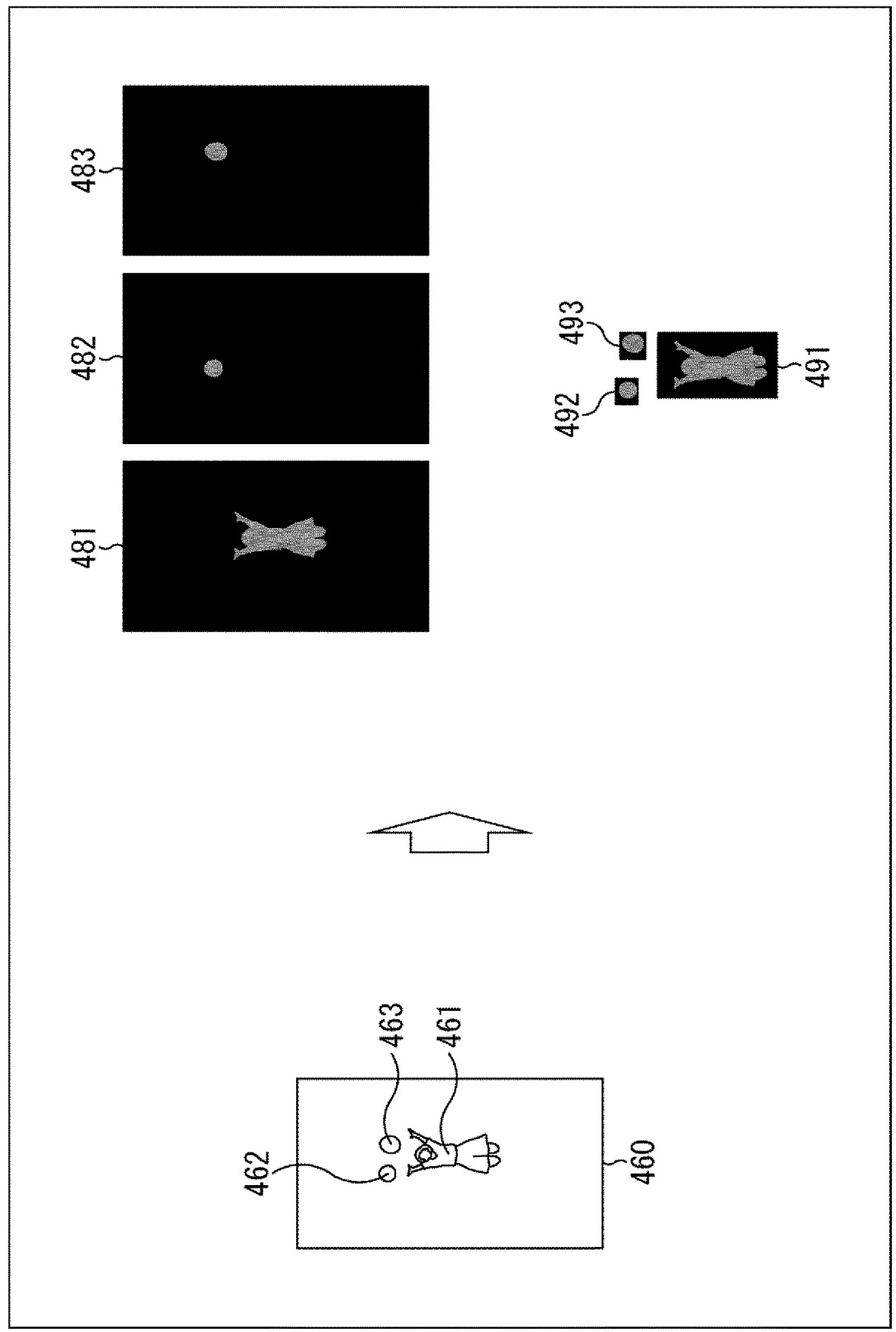
FIG. 43 is a diagram for explaining a depth image.

FIG. 43 is a diagram for explaining a depth image.

In the example in FIG. 43, in a texture cutting image 460, three objects 461 to 463 are imaged.

In this case, the texture depth cutting unit 441 generates a depth cutting image for each transmission object.

Specifically, as illustrated in the upper right portion of FIG. 43, for example, the texture depth cutting unit 441 generates a depth cutting image 481 for the object 461. The depth cutting image 481 is an image having the same Size as the texture cutting image 460, and a pixel value in an area of the object 461 is expressed by a predetermined resolution indicating a distance z of the object 461, and a pixel value in an area other than the area of the object 461 is expressed by an arbitrary fixed value (zero in example in FIG. 43).

The texture depth cutting unit. 441 generates a depth cutting image 482 for the object 462. The depth cutting image 482 is an image having the same size as the texture cutting image 460, and a pixel value in an area of the object 462 is expressed by a predetermined resolution indicating a distance z of the object 462, and a pixel value in an area other than the area of the object 462 is expressed by an arbitrary fixed value (zero in example in FIG. 43).

Similarly, the texture depth cutting unit 411 generates a depth cutting image 483 for the object 463. The depth cutting image 483 is an image having the same size as the texture cutting image 460, and a pixel value in an area of the object 463 is expressed by a predetermined resolution indicating a distance z of the object 463, and a pixel value in an area other than the area of the object 463 is expressed by an arbitrary fixed value (zero in example in FIG. 43).

Note that the size of the depth cutting image may be different for each object.

Specifically, for example, as illustrated in the lower right portion of FIG. 43, regarding the object 461, the texture depth cutting unit 441 generates a minimum-sized rectangular depth cutting image 491 including an area in which a pixel value of an area corresponding to the area of the object 461 on the texture cutting image 460 indicates the distance z of the object 461.

Similarly, the texture depth cutting unit 441 generates a minimum-sized rectangular depth cutting image 492 including an area corresponding to the area of the object 462 on the texture cutting image 460 for the object 462 and a minimum-sized rectangular depth cutting image 493 including an area corresponding to the area of the object 463 on the texture cutting image 460 for the object 463.

In this case, a data amount of the depth cutting image can be reduced in comparison with a case where the depth cutting image having the same size as the texture cutting image 460 is generated.

Figures 44, 45:
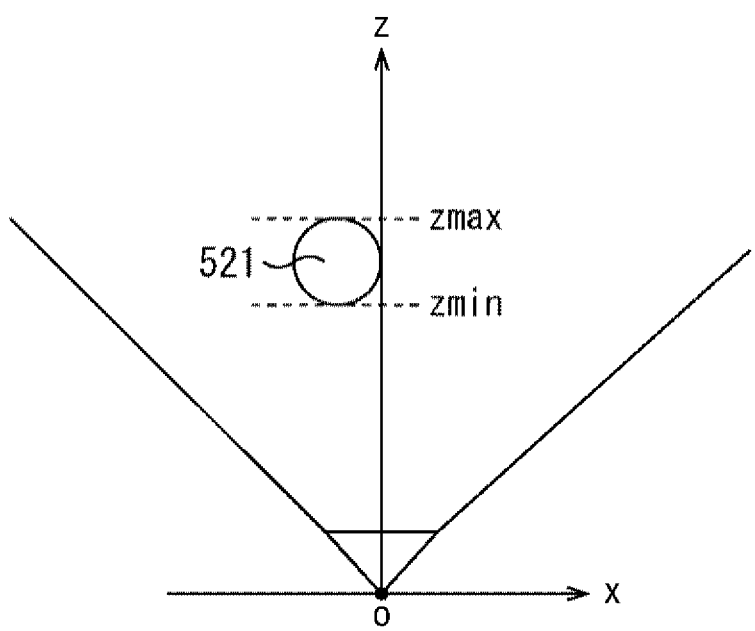
FIG. 44 is a diagram of an example of the cutting information metadata.
FIG. 45 is a diagram for explaining a minimum value zmin and a maximum value zmax.

FIG. 44 illustrates an example of cutting information metadata.

Positions of the cutting areas from the texture image and the depth image in the X direction (width direction) and the Y direction (height direction) are respectively indicated as offsetX, rangeX, offsetY, and rangeY described with reference to FIG. 23.

Alternatively, the positions of the cutting areas may be expressed by occupancyX, occupancyY, normOffsetX, and normOffsetY in the formulas (1) to (4) dividing by the width width' or the height height' of the texture image and the depth image.

Moreover, the cutting information metadata in the seventh embodiment includes a minimum value zmin and a maximum value zmax of a z coordinate as cutting information regarding the depth cutting image.

FIG. 45 is a diagram for explaining the minimum value zmin and the maximum value zmax.

As illustrated in FIG. 15, when it is assumed that a minimum value and a maximum value of a z coordinate of an object 521 be the minimum value zmin and the maximum value zmax, the minimum value zmin and the maximum value zmax are stored in the cutting information metadata. By transmitting the minimum value zmin and the maximum value zmax for each object, quantization for each object can be performed.

(Seventh Object Selection Processing)

Figure 46:
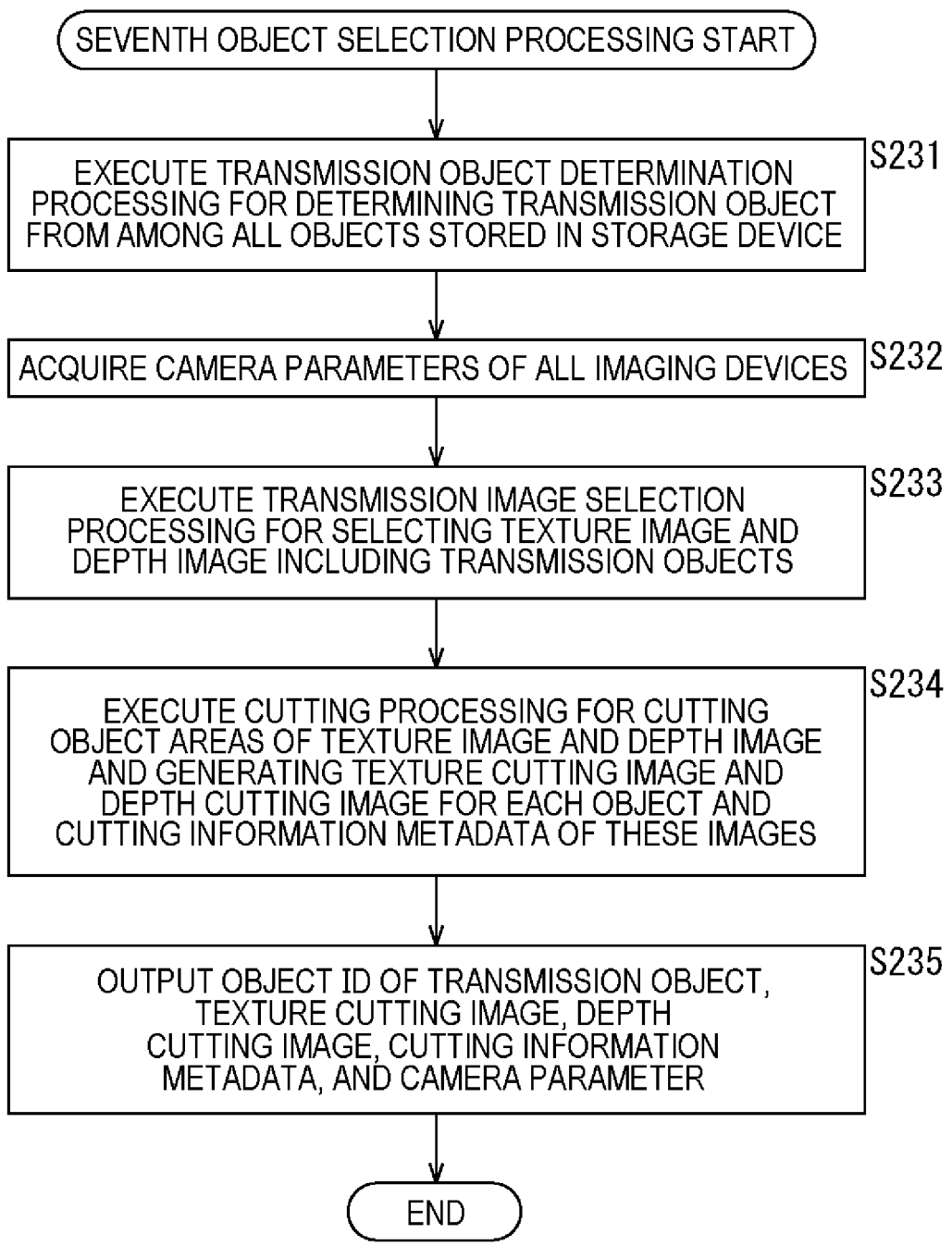
FIG. 46 is a flowchart for explaining seventh, object selection processing.

FIG. 46 is a flowchart for explaining object selection processing (seventh object selection processing) by the selection device 24C. This processing is started, for example, when the reproduction device 28 is turned on and the viewer performs an operation for starting reproduction.

First, in step S231, the 3D model selection unit 61 executes transmission object determination processing for determining the transmission object from among all the objects stored in the storage device 23.

In other words, in step S231, the 3D model selection unit 61 executes the first object selection processing in FIG. 8 for determining the transmission object on the basis of the virtual camera viewing range information as the object specification information or the second object selection processing in FIG. 12 for determining the transmission object on the basis of the object specification information indicating the object specified by the viewer. The object ID and the 3D model data of the transmission object obtained as a result of the processing are supplied to the texture depth image selection unit 421.

In step S232, the texture depth image selection unit 421 acquires the camera parameters of all the imaging devices 21 from the storage device 23.

In step S233, the texture depth image selection unit 421 executes the transmission image selection processing for selecting a texture image and a depth image including the transmission object from among the texture images and the depth images as many as the number of imaging devices 21.

In the step S234, the texture depth cutting unit 441 executes the cutting processing for cutting the object areas of the texture image and the depth image including the transmission object and generating the texture cutting image and the depth cutting image for each object and the cutting information metadata of these images.

In step S235, the selection device 24G outputs the object ID of the transmission object, the 3D model data including the texture cutting image and the depth cutting image for each transmission object, the cutting information metadata, and the camera parameter to the encoding device 25, and the seventh object selection processing is terminated. The object ID of the transmission object is output from the 3D model selection unit 61, and the 3D model data, the cutting information metadata, and the camera parameter are output from the texture depth cutting unit 441.

According to the seventh object selection processing, since only the 3D model data of the object specified by the object specification information is transmitted to the reproduction device 28, the transmission band can be reduced.

Furthermore, according to the transmission image selection processing, since the texture image and the depth image that do not include the object specified by the object specification information are not transmitted, the transmission band can be further reduced.

Moreover, since the texture cutting image and the depth cutting image obtained by cutting the image of the object area from the texture image and the depth image including the object are generated and transmitted, the transmission band can be further reduced than a case where the texture image and the depth image are transmitted.

Note that, in the seventh embodiment, a configuration may be used in which at least one of the cutting image selection unit 300 or the packing unit 320 as in the fifth embodiment illustrated in FIG. 26 is further provided in the latter part of the texture depth cutting unit 441 and the texture cutting image and the depth cutting image are further selected or are packed into a single piece of an image.

10. Distribution Processing and Reproduction Processing

Finally, distribution processing that is processing of an entire distribution side of the image processing system 10 and reproduction processing that is processing of the reproduction side will be described.

(Distribution Processing)

Figure 47:
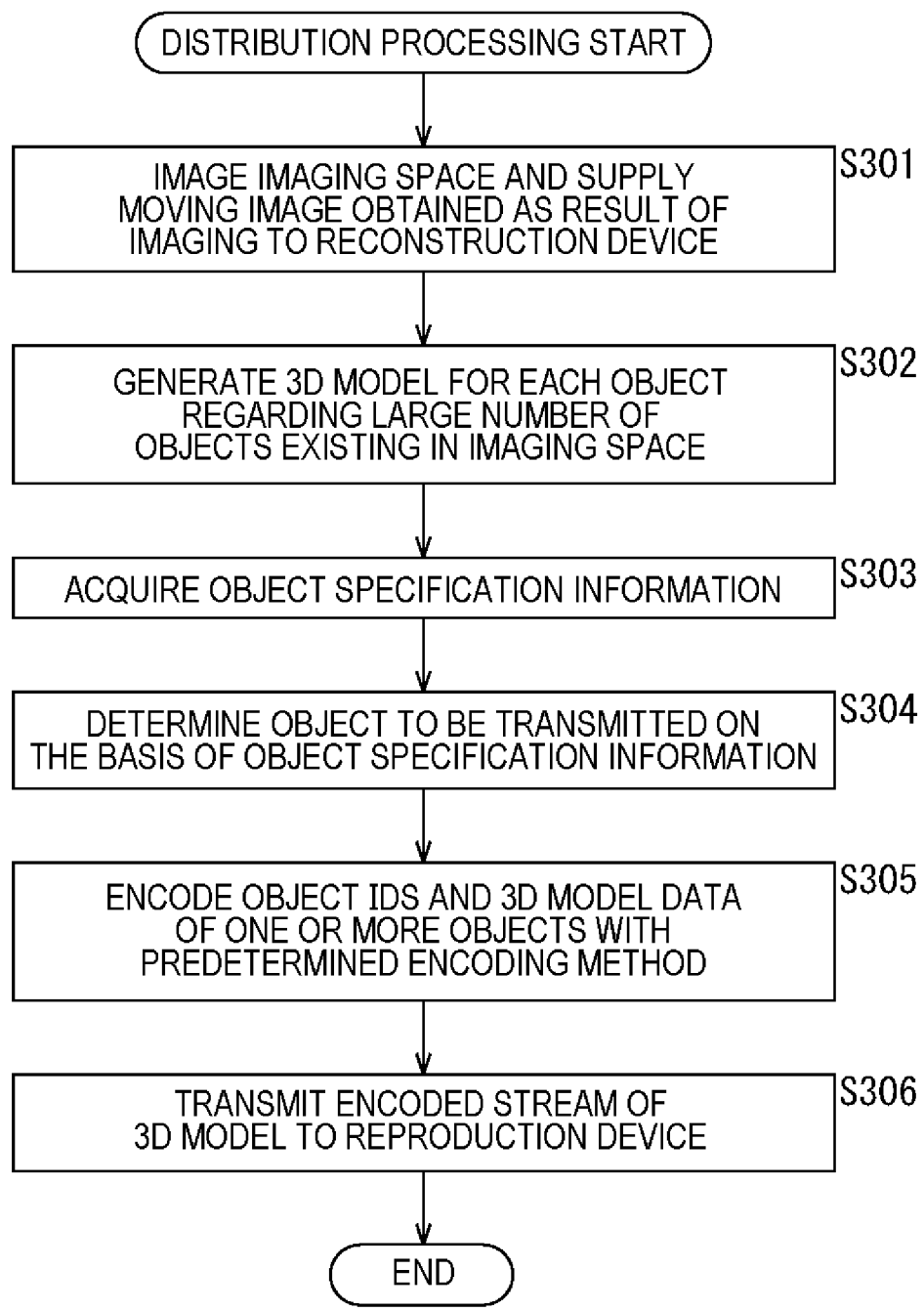
FIG. 47 is a flowchart for explaining distribution processing.

First, the distribution processing by the distribution side of the image processing system 10 will be described with reference to the flowchart in FIG. 47.

First, in step S301, each of the plurality of imaging devices 21 images a predetermined imaging space and supplies a moving image obtained as a result of imaging to the reconstruction device 22.

In step S302, the reconstruction device 22 generates a 3D model for each object regarding a large number of objects existing in the imaging space by using the moving image in the imaging space supplied from each of the imaging devices 21-1 to 21-N and supplies the generated 3D model data of each object to the storage device 23.

An arbitrary method can be adopted to determine what is set as an object in the moving image or how to separate the object, and each object is appropriately separated, and the 3D model data for each object is stored in the storage device 23.

In step S303, the selection device 24 acquires the object specification information that specifies the object transmitted from the reproduction device 28 from the transmission and reception device 26.

The object specification information is, for example, the virtual camera viewing range information that is information regarding the viewing range of the virtual camera, information regarding the object ID of the object specified by the viewer as the display target, and the like. In a case where the information regarding the object ID is acquired as the object specification information, the object ID and the global position information of each object are transmitted to the reproduction device 28 in advance.

In step S304, the selection device 24 determines (select) an object to be transmitted from among all the objects stored in the storage device 23 on the basis of the object specification information and supplies the object IDs and the 3D model data of one or more determined objects to the encoding device 25. As details of this processing, any one of the first to seventh object selection processing is executed.

In step S305, the encoding device 25 encodes the object IDs and the 3D model data of one or more objects that are determined to be transmitted, for example, with a predetermined encoding method such as the AVC method and the HEVC method. An encoded stream of the 3D model obtained by encoding is supplied to the transmission and reception device 26.

In step S306, the transmission and reception device 26 transmits an encoded stream of the 3D model supplied from the encoding device 25 to the reproduction device 28 via the network 27.

According to the distribution processing described above, the 3D models of a large number of objects, imaged and generated by the plurality of imaging devices 21, are partially selected, and the 3D model data can be transmitted so as to be reproduced by the reproduction device 28.

(Reproduction Processing)

Figure 48:
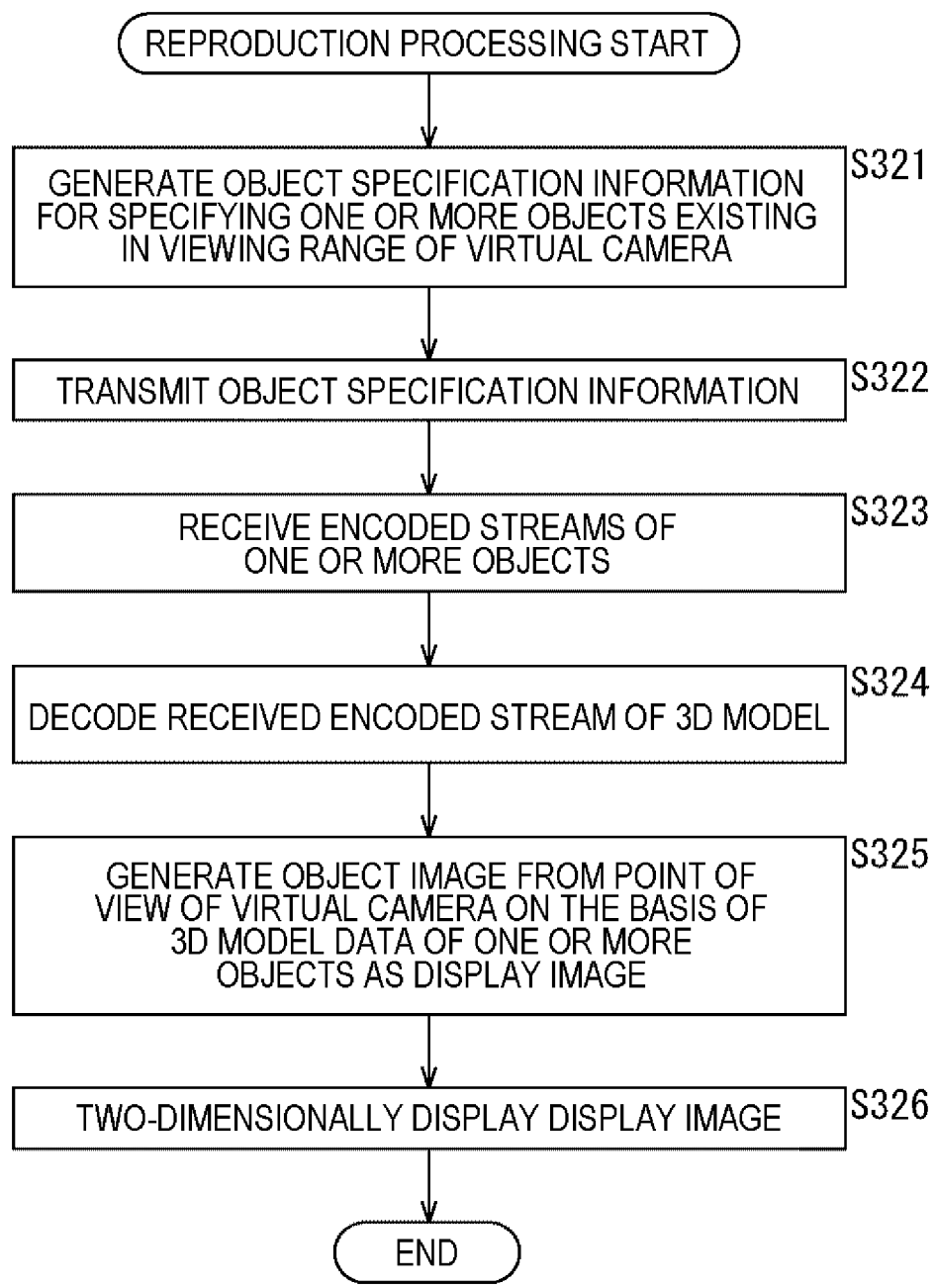
FIG. 48 is a flowchart for explaining reproduction processing.

Next, the reproduction processing by the reproduction side of the image processing system 10 will be described with reference to the flowchart in FIG. 48.

First, in step S321, the virtual point of view detection unit 44 of the reproduction device 28 generates object specification information for specifying one or more objects existing in the viewing range of the virtual camera and supplies the generated information to the transmission and reception unit 41.

The object specification information is, for example, the virtual camera viewing range information that is information regarding the viewing range of the virtual camera, information regarding the object ID of the object specified by the viewer as the display target, and the like. In a case where the information regarding the object ID is acquired as the object specification information, the object ID and the global position information of each object are transmitted from the transmission and reception device 26 to the reproduction device 28 in advance.

In step S322, the transmission and reception unit 41 transmits the object specification information supplied from the virtual point of view detection unit 44 to the transmission and reception device 26 via the network 27.

In step S323, the transmission and reception unit 41 receives (acquire) the encoded streams obtained by encoding the 3D model data of one or more objects supplied from the transmission and reception device 26 and supplies the encoded stream to the decoding unit 42.

In step S324, the decoding unit 42 decodes the encoded stream of the 3D model supplied from the transmission and reception unit 41 with a method corresponding to the encoding method of the encoding device 25. The decoding unit 42 supplies the 3D model data of one or more objects obtained by decoding to the drawing unit 43.

In step S325, the drawing unit 43 generates an image of the object (object image) from the point of view of the virtual camera as a display image on the basis of the 3D model data of one or more objects supplied from the decoding unit 42 and supplies the display image to the display device 29.

In step S326, the display device 29 two-dimensionally displays the display image supplied from the drawing unit 43, and the reproduction processing is terminated.

According to the reproduction processing described above, the 3D models of a large number of objects imaged and generated by the plurality of imaging devices 21 can be partially selected and displayed on the display device 29.

According to the image processing system 10, the 3D model data of only the object that satisfies a predetermined condition on the basis of the object specification information among a large number of objects imaged and generated by the plurality of imaging devices 21 is transmitted to the reproduction side.

In this way, by transmitting the 3D model data of only the necessary object of all the objects included in the imaging space, a processing load on the reproduction side can be reduced, and the transmission band can be reduced, while securing the image quality of the object image viewed by the viewer. The 3D model data of unnecessary objects is not transmitted so that the image quality of the object image viewed by the viewer can be improved.

For example, in a case where the virtual camera viewing range information that is the information regarding the viewing range of the virtual camera is adopted as the object specification information, the transmission band can be reduced and the display image can be generated by transmitting only the 3D model data of the object in the viewing range of the viewer.

For example, in a case where the information regarding the object ID of the object specified by the viewer as the display target is adopted as the object specification information, the viewer can specify the object to be displayed, the display image can be generated while reducing the transmission band.

11. Exemplary Configuration of Computer

The above-mentioned series of processing can be executed by hardware or software. In a case where the series of the processing is executed by the software, a program included in the software is installed in a computer. Here, the computer includes a computer incorporated in dedicated hardware and, for example, a general personal computer and the like which can perform various functions by installing various programs.

Figure 49:
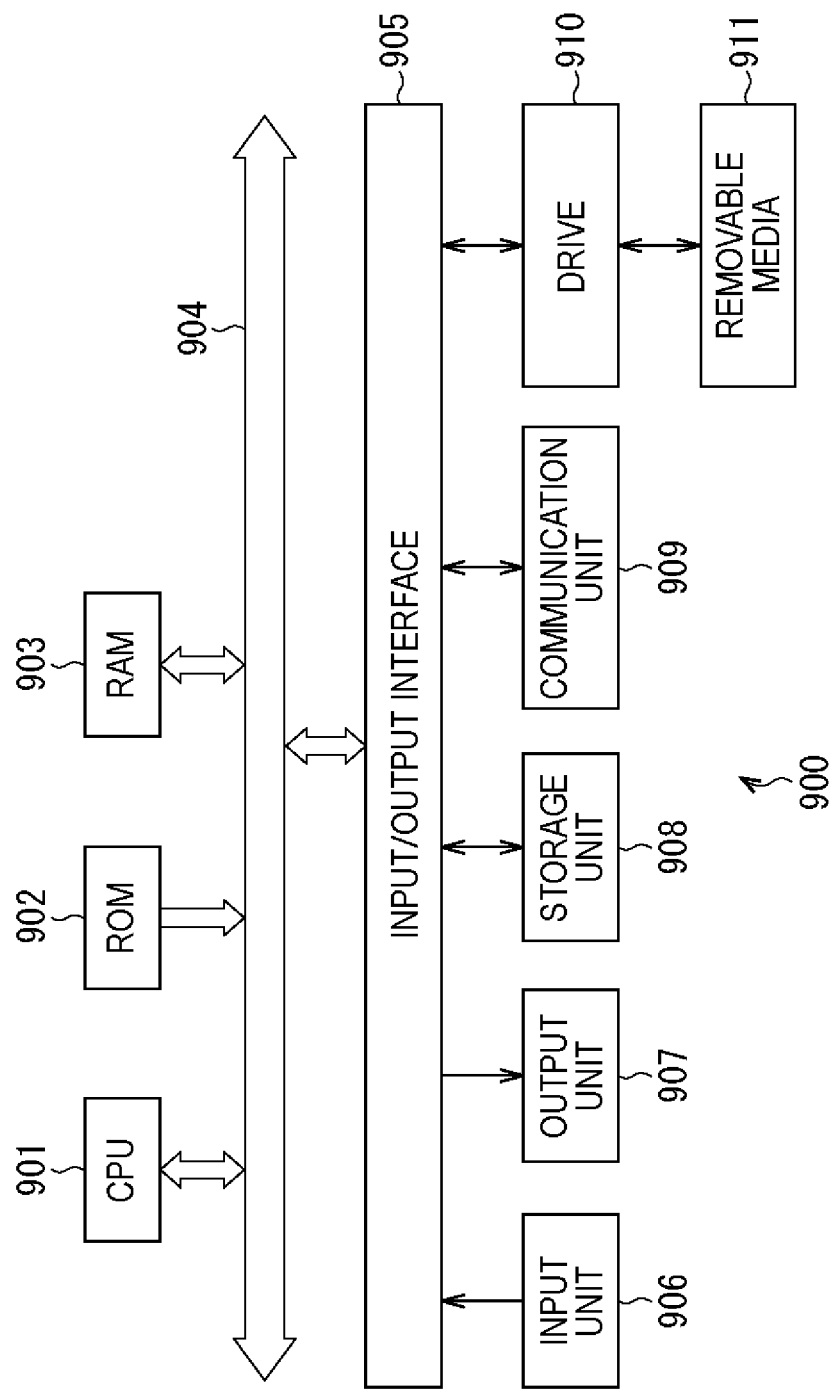
FIG. 49 is a block diagram of an exemplary configuration of a computer to which the present disclosure is applied.

FIG. 49 is a block diagram of an exemplary configuration of hardware of the computer for executing the above-mentioned series of processing by the program.

In a computer 900, a central processing unit (CPU) 901, a read only memory (ROM) 902, and a random access memory (RAM) 903 are connected to each other with a bus 904.

Moreover, an input/output interface 905 is connected to the bus 904. An input unit 906, an output unit 907, a storage unit 908, a communication unit 909, and a drive 910 are connected to the input/output interface 905.

The input unit 906 includes a keyboard, a mouse, a microphone, and the like. The output unit 907 includes a display, a speaker, and the like. The storage unit 908 includes a hard disk, a non-volatile memory, and the like. The communication unit 909 includes a network interface and the like. The drive 910 drives a removable media 911 such as a magnetic disk, an optical disk, an optical magnetic disk, or a semiconductor memory.

In the computer 900 configured as described above, the CPU 901 loads, for example, the program stored in the storage unit 908 to the RAM 903 via the input/output interface 905 and the bus 904 and executes the program so that the above-mentioned series of processing is executed.

The program executed by the computer 900 (CPU 901) is, for example, can be provided by recording it to the removable media 911 as a package media and the like. Furthermore, the program can be provided via a wired or wireless transmission medium such as a local area network, the Internet, and digital satellite broadcasting.

In the computer 900, the program can be installed to the storage unit 908 via the input/output interface 905 by mounting the removable media 911 in the drive 910. Furthermore, the program can be received by the communication unit 909 via the wired or wireless transmission media and installed to the storage unit 908. In addition, the program can be previously installed to the ROM 902 and the storage unit 908.

Note that, the program executed by the computer 900 may be a program in which processing is executed along the order described herein in a time series manner and a program in which the processing is executed in parallel or at a necessary timing, for example, when a call has been made.

12. Application Example

The technology according to the present disclosure can be applied to various products. For example, the technology according to the present disclosure may be realized as an apparatus to be mounted on any type of mobile body such as a car, an electric vehicle, a hybrid electric vehicle, a motorcycle, a bicycle, a personal mobility, an airplane, a drone, a ship, and a robot, a construction machine, and an agricultural machine (tractor).

Figure 50:
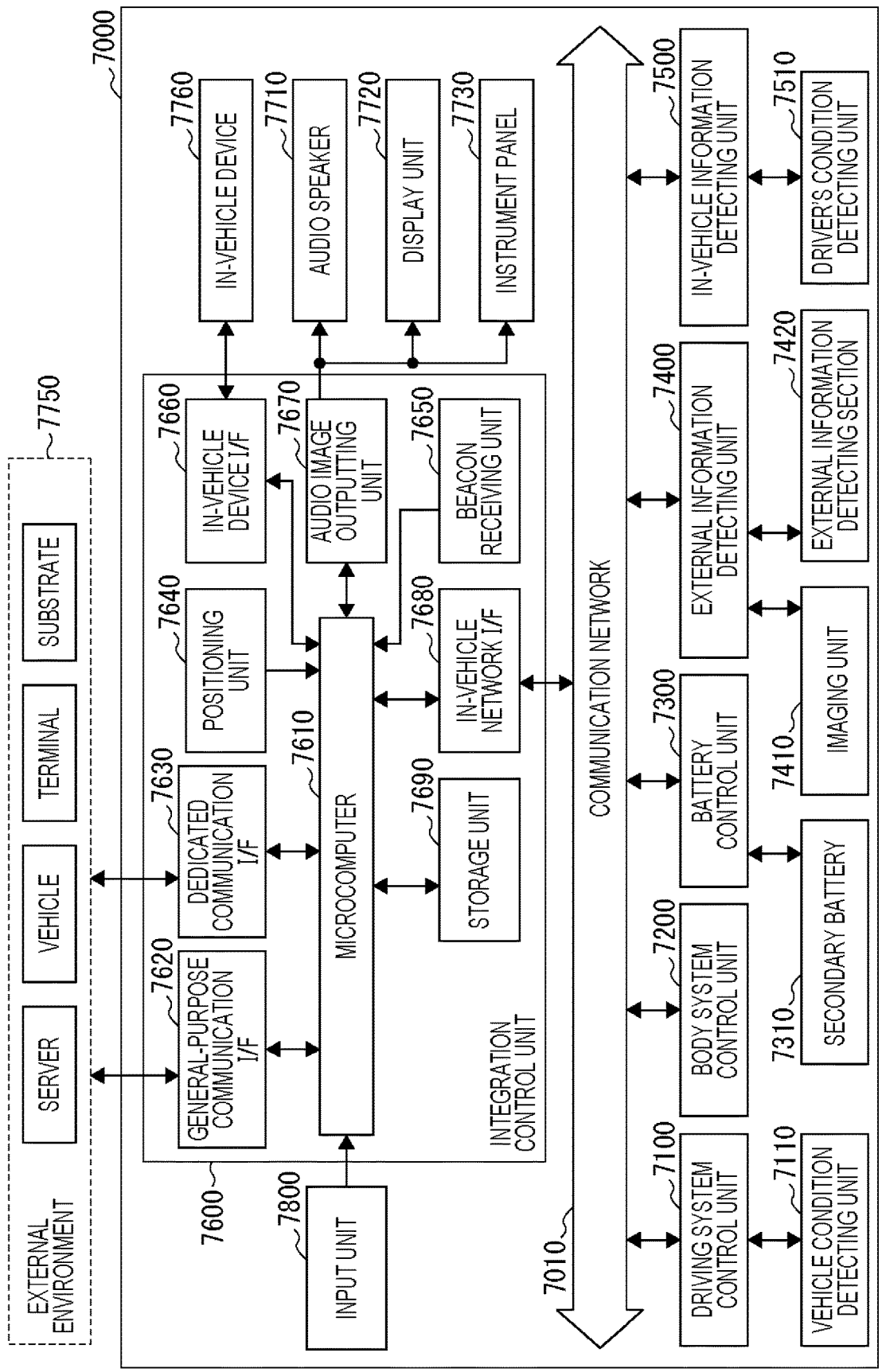
FIG. 50 is a block diagram of an exemplary schematic configuration of a vehicle control system.

FIG. 50 is a block diagram of an exemplary schematic configuration of a vehicle control system 7000 which is an example of a mobile body control system to which the technology according to the present disclosure may be applied. The vehicle control system 7000 includes a plurality of electronic control units connected via a communication network 7010. In the example illustrated in FIG. 50, the vehicle control system 7000 includes a driving system control unit 7100, a body system control unit 7200, a battery control unit 7300, an external information detecting unit 7400, an in-vehicle information detecting unit 7500, and an integration control unit 7600. The communication network 7010 for connecting the plurality of control units may be an in-vehicle communication network compliant with an optional standard, for example, the Controller Area Network (CAN), Local Interconnect Network (LIN), the Local Area Network (LAN), the FlexRay (registered trademark), or the like.

Each control unit includes a microcomputer which executes operation processing in accordance with various programs, a storage unit which stores the program executed by the microcomputer or a parameter or the like used for various operations, and a driving circuit which drives devices to be controlled. Each control unit includes a network I/F to communicate with other control unit via the communication network 7010 and a communication I/F to communicate by wired or wireless communication with devices inside/outside the vehicle, a sensor, or the like. In FIG. 50, as functional configurations of the integration control unit 7600, a microcomputer 7610, a general-purpose communication I/F 7620, a dedicated communication I/F 7630, a positioning unit 7640, a beacon receiving unit 7650, an in vehicle device I/F 7660, an audio image outputting unit 7670, an in-vehicle network I/F 7680, and a storage unit 7690 are illustrated. Other control unit similarly includes a microcomputer, a communication I/F, a storage unit, and the like.

The driving system control unit 7100 controls an operation of a device relating to a driving system of the vehicle in accordance with various programs. For example, the driving system control unit 7100 functions as a control device of a device such as a driving force generating device to generate a driving force of the vehicle such as an internal combustion engine or a driving motor, a driving force transmitting mechanism to transmit the driving force to wheels, a steering mechanism which adjusts a steering angle of the vehicle, and a braking device which generates a braking force of the vehicle. The driving system control unit 7100 may have a function as a control device such as an antilock brake system (ABS) or an electronic stability control (ESC).

The driving system control unit 7100 is connected to a vehicle condition detecting unit 7110. The vehicle condition detecting unit 7110 includes at least one of, for example, a gyro sensor which detects an angular velocity of a shaft rotary motion of a vehicle body, an acceleration sensor which detects an acceleration of the vehicle, and sensors to detect an operation amount of an accelerator pedal, an operation amount of a brake pedal, a steering angle of a steering wheel, an engine speed, a rotational speed of a wheel, or the like. The driving system control unit 7100 executes operation processing by using the signal input from the vehicle condition detecting unit 7110 and controls an internal combustion engine, a driving motor, an electric power steering device, a brake device, or the like.

The body system control unit 7200 controls operations of various devices attached to the vehicle body in accordance with various programs. For example, the body system control unit 7200 functions as a control device of a keyless entry system, a smart key system, a power window device, or various lamps such as a head lamp, a back lamp, a brake lamp, a direction indicator, or a fog lamp. In this case, a radio wave transmitted from a portable machine for substituting a key or signals of various switches may be input to the body system control unit 7200. The body system control unit 7200 receives the input of the radio wave or the signal and controls a door locking device, the power window device, the lamp, and the like of the vehicle.

The battery control unit 7300 controls a secondary battery 7310 which is a power supply source of the driving motor according to various programs. For example, a battery device including the secondary battery 7310 inputs information such as a battery temperature, a battery output voltage, or a residual capacity of the battery, to the battery control unit 7300. The battery control unit 7300 executes operation processing by using these signals and controls temperature regulation of the secondary battery 7310 or controls a cooling device included in the battery device and the like.

The external information detecting unit 7400 detects external information of the vehicle including the vehicle control system 7000. For example, the external information detecting unit 7400 is connected to at least one of an imaging unit 7410 or an external information detecting section 7420. The imaging unit 7410 includes at least one of a time of flight (ToF) camera, a stereo camera, a monocular camera, an infrared camera, or other camera. The external information detecting section 7420 includes, for example, at least one of an environment sensor to detect current whether or meteorological phenomenon or a surrounding information detecting sensor to detect other vehicle, an obstacle, a pedestrian, or the like around the vehicle including the vehicle control system 7000.

The environment, sensor may be, for example, at least one of a raindrop sensor which detects rainy weather, a fog sensor which detects fog, a sunshine sensor which detects a sunshine degree, or a snow sensor which detects snow fall. The surrounding information detecting sensor may be at least one of an ultrasonic sensor, a radar apparatus, and a light detection and ranging, laser imaging detection and ranging (LIDAR) device. The imaging unit 7410 and the external information detecting section 7420 may be included as independent sensors and devices and may be included as a device formed by integrating a plurality of sensors and devices.

Figure 51:
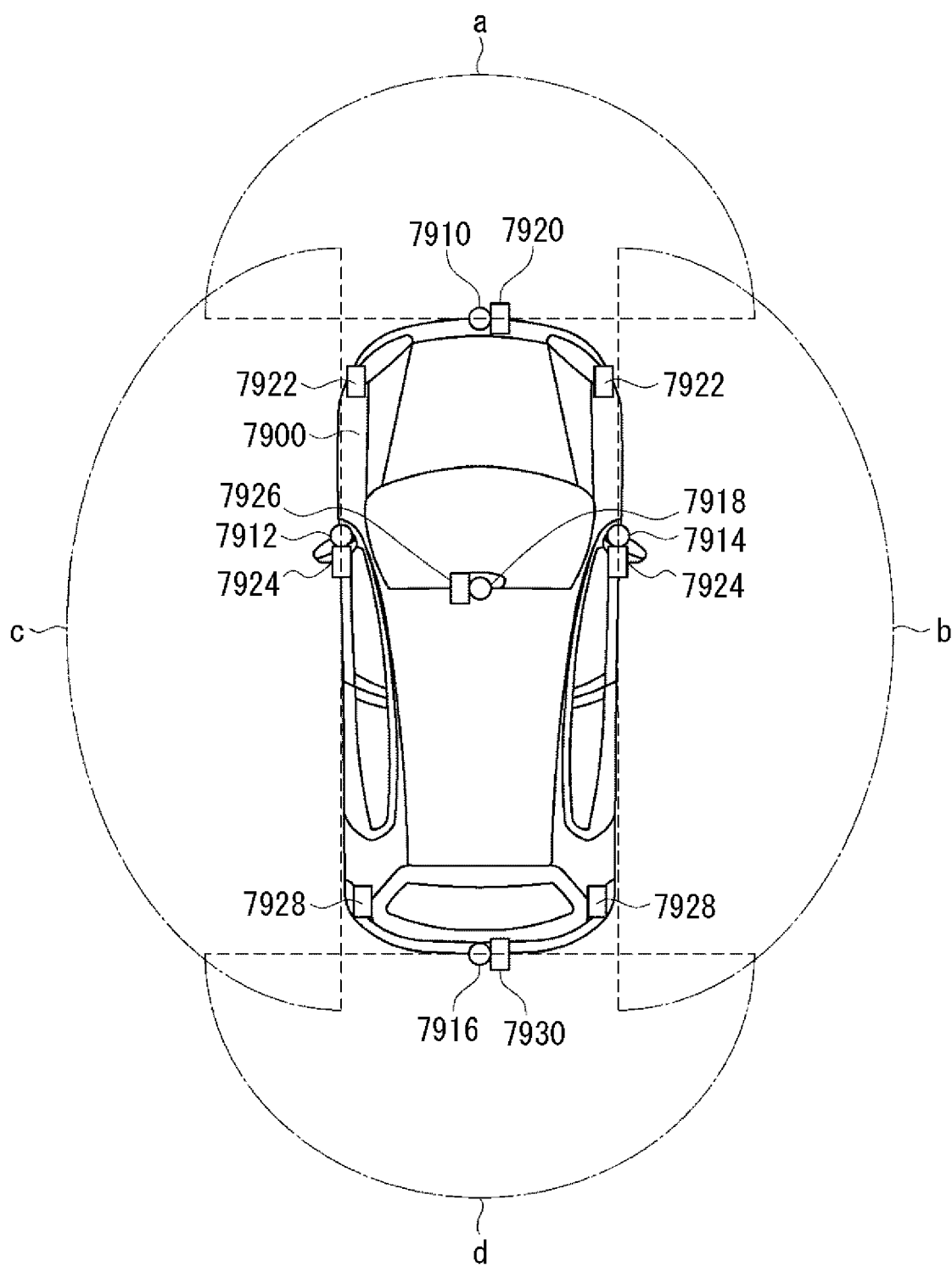
FIG. 51 is an explanatory diagram of exemplary set positions of an external information detecting unit and imaging units.

Here, in FIG. 51, an example of set positions of the imaging units 7410 and the external information detecting sections 7420 is illustrated. Each of the imaging units 7910, 7912, 7914, 7916, and 7918 are provided in at least one of, for example, a front nose, a side mirror, a rear bumper, a back door, or an upper side of a windshield in the vehicle interior of the vehicle 7900. The imaging unit 7910 provided in the front nose and the imaging unit 7918 provided on the upper side of the windshield in the vehicle interior mainly obtain images on the front side of the vehicle 7900. The imaging units 7912 and 7914 provided in the side mirrors mainly obtain images on the sides of the vehicle 7900. The imaging unit 7916 provided in the rear bumper or the back door mainly obtains an image on the back side of the vehicle 7900. The imaging unit 7918 provided on the upper side of the windshield in the vehicle interior is mainly used to detect a preceding vehicle, a pedestrian, an obstacle, a traffic light, a traffic sign, a traffic lane, or the like.

Note that, in FIG. 51, exemplary photographing ranges of the respective imaging units 7910, 7912, 7914, and 7916 are illustrated. An imaging range a indicates an imaging range of the imaging unit 7910 provided in the front nose, and imaging ranges b and c respectively indicate imaging ranges of the imaging units 7912 and 7914 provided in the side mirrors. An imaging range d indicates an imaging range of the imaging unit 7916 provided in the rear bumper or the back door. For example, image data imaged by the imaging units 7910, 7912, 7914, and 7916 is superposed so that a bird's-eye image of the vehicle 7900 viewed from above can be obtained.

External information detecting units 7920, 7922, 7924, 7926, 7928, and 7930 respectively provided on the front, rear, side, corner, and upper side of the windshield of the vehicle interior of the vehicle 7900 may be, for example, ultrasonic sensors or radar apparatuses. The external information detecting units 7920, 7926, and 7930 provided in the front nose, the rear bumper, the back door, and the upper side of the windshield in the vehicle interior of the vehicle 7900 may be, for example, LIDAR devices. The external information detecting units 7920 to 7930 are mainly used to detect a preceding vehicle, a pedestrian, an obstacle, or the like.

The description will be continued with reference to FIG. 50 again. The external information detecting unit 7400 makes the imaging unit 7410 capture an image outside the vehicle and receives the captured image data. Furthermore, the external information detecting unit 7400 receives detection information from the external information detecting section 7420 connected to the external information detecting unit 7400. In a case where the external information detecting section 7420 is an ultrasonic sensor, a radar apparatus, or a LIDAR device, the external information detecting unit 7400 makes the external information detecting section 7420 transmit ultrasonic waves, radio waves, or the like and receives information regarding the received reflected waves. The external information detecting unit 7400 may execute processing for detecting an object such as a person, a car, an obstacle, a sign, or letters on the road or distance detection processing on the basis of the received information. The external information detecting unit 7400 may execute environment recognition processing for recognizing rain, fog, a road surface condition, or the like on the basis of the received information. The external information detecting unit 7400 may calculate a distance to an object outside the vehicle on the basis of the received information.

Furthermore, the external information detecting unit 7400 may execute image recognition processing for recognizing a person, a car, an obstacle, a sign, letters on the road, or the like or the distance recognition processing on the basis of the received image data. The external information detecting unit 7400 may generate a bird's-eye image or a panoramic image by executing processing such as distortion correction or positioning to the received image data and synthesizing the image data imaged by the different imaging units 7410. The external information detecting unit 7400 may execute viewpoint conversion processing by using the image data imaged by the different imaging units 7410.

The in-vehicle information detecting unit 7500 detects in-vehicle information. The in-vehicle information detecting unit 7500 is connected to, for example, a driver's condition detecting unit 7510 for detecting a condition of a driver. The driver's condition detecting unit 7510 may include a camera for imaging the driver, a biosensor for detecting biological information of the driver, a microphone for collecting sound in the vehicle interior, or the like. The biosensor is provided, for example, in a seat surface, a steering wheel, or the like and detects biological information of an occupant who sits on the seat or a driver who holds a steering wheel. On the basis of the detection information input from the driver's condition detecting unit 7510, the in-vehicle information detecting unit 7500 may calculate a fatigue degree or a concentration degree of the driver and may determine whether or not the driver falls asleep. The in-vehicle information detecting unit 7500 may execute processing such as noise canceling processing to the collected audio signal.

The integration control unit 7600 controls a whole operation in the vehicle control system 7000 according to various programs. The integration control unit 7600 is connected to an input unit 7800. The input unit 7800 realized by a device, to which the occupant can perform an input operation, for example, a touch panel, a button, a microphone, a switch, a lever, or the like. The integration control unit 7600 may receive data obtained by recognizing sound input by a microphone. The input unit 7800 may be, for example, a remote control device using infrared rays or other radio waves and may be an external connection device such as a mobile phone or a personal digital assistant (FDA) corresponding to the operation of the vehicle control system 7000. The input unit 7800 may be, for example, a camera. In this case, the occupant can input information by using a gesture. Alternatively, data obtained by detecting a movement of a wearable device worn by an occupant may be input. Moreover, the input unit 7800 may include, for example, an input control circuit or the like which generates an input signal on the basis of the information input by the occupant and the like by using the input unit 7800 and outputs the input signal to the integration control unit 7600. The occupant and the like input various data and instruct a processing operation to the vehicle control system 7000 by operating the input unit 7800.

The storage unit 7690 may include a Read Only Memory (ROM) for storing various programs executed by a microcomputer and a Random Access Memory (RAM) for storing various parameters, calculation results, a sensor value, or the like. Furthermore, the storage unit 7690 may be realized by a magnetic storage device such as a Hard Disc Drive (HDD), a semiconductor storage device, an optical storage device, a magneto-optical storage device, or the like.

The general-purpose communication I/F 7620 mediates general communication with various devices existing in an external environment 7750. The general-purpose communication I/F 7620 may implement a cellular communication protocol such as the Global System of Mobile communications (GSM) (registered trademark), the WiMAX (registered trademark), the Long Term Evolution (LIE) (registered trademark), or the LIE-Advanced (LIE-A) or other wireless communication protocol such as wireless LANs (Wi-Fi (registered trademark)) and the Bluetooth (registered trademark). For example, the general-purpose communication I/F 7620 may be connected to a device (for example, application server or control server) existing on an external network (for example, internet, cloud network, or company-specific network) via a base station or an access point. Furthermore, the general-purpose communication I/F 7620 may be connected to a terminal existing near the vehicle (for example, terminal of driver, pedestrian, or shop or machine type communication (MTC) terminal), for example, by using the peer to peer (P2P) technology.

The dedicated communication I/F 7630 supports a communication protocol established to be used for the vehicle. The dedicated communication I/F 7630 may, for example, implement a standard protocol such as the Wireless Access in Vehicle Environment (WAVE) which is a combination of the IEEE 802.11p of a lower layer and the IEEE 1609 of an upper layer, the Dedicated Short Range Communications (DSRC), or a cellular communication protocol. The dedicated communication. I/F 7630 typically performs V2X communication which is a concept including one or more of vehicle to vehicle communication, vehicle to infrastructure communication, vehicle to home communication, and vehicle to pedestrian communication.

For example, the positioning unit 7640 receives a GNSS signal (for example, GPS signal from global positioning system (GPS) satellite) from a global navigation satellite system (GNSS) satellite and executes positioning. Then, the positioning unit. 7640 generates position information including a latitude, a longitude, and a height of the vehicle. Note that the positioning unit 7640 may specify the current position by exchanging a signal with a wireless access point or may obtain the position information from a terminal such as a mobile phone, a PHS, or a smartphone having a positioning function.

The beacon receiving unit 7650, for example, receives radio waves or electromagnetic waves transmitted from a wireless station installed on the road or the like and obtains information including the current position, traffic congestion, a closed area, a required time, or the like. Note that the function of the beacon receiving unit 7650 may be included in the dedicated communication I/F 7630 described above.

The in-vehicle device I/F 7660 is a communication interface for mediating connection between the microcomputer 7610 and various in-vehicle devices 7760 in the vehicle. The in-vehicle device I/F 7660 may establish wireless connection by using a wireless communication protocol such as a wireless LAN, the Bluetooth (registered trademark), Near Field Communication (NFC), or a wireless USE (WUSB). Furthermore, the in-vehicle device I/F 7660 may establish wired connection such as a Universal Serial Bus (USB), a High-Definition Multimedia Interface (HDMI) (registered trademark), or a Mobile High-definition Link (MHL) via a connection terminal (and cable as necessary) which is not illustrated. The in-vehicle device 7760 may include, for example, at least one of a mobile device or a wearable device owned by the occupant, or an information device carried in or attached to the vehicle. Furthermore, the in-vehicle device 7760 may include a navigation device which searches a route to an arbitrary destination. The in-vehicle device I/F 7660 exchanges a control signal or a data signal with the in-vehicle device 7760.

The in-vehicle network I/F 7680 is an interface for mediating the communication between the microcomputer 7610 and the communication network 7010. The in-vehicle network I/F 7680 transmits and receives a signal and the like in accordance with a predetermined protocol supported by the communication network 7010.

The microcomputer 7610 of the integration control unit 7600 controls the vehicle control system 7000 according to various programs on the basis of information obtained via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of a driving force generating device, a steering mechanism, or a braking device on the basis of the obtained information inside and outside the vehicle and output a control instruction to the driving system control unit 7100. For example, the microcomputer 7610 may perform cooperative control to realize a function of an Advanced Driver Assistance System (ADAS) including collision avoidance or impact relaxation of the vehicle, a following travel based on a distance between vehicles, a vehicle speed maintaining travel, a vehicle collision warning, a lane deviation warning of the vehicle, or the like. Furthermore, the microcomputer 7610 controls the driving force generating device, the steering mechanism, the braking device, or the like on the basis of the obtained information around the vehicle so as to perform cooperative control for automatic drive in which the vehicle autonomously travels without depending on an operation by the driver and the like.

The microcomputer 7610 may generate three-dimensional distance information between the vehicle and an object such as a building and a person around the vehicle and create local map information including peripheral information of the current position of the vehicle on the basis of the information obtained via at least one of the general-purpose communication I/F 7620, the dedicated communication I/F 7630, the positioning unit 7640, the beacon receiving unit 7650, the in-vehicle device I/F 7660, or the in-vehicle network I/F 7680. Furthermore, the microcomputer 7610 may predict a danger such as a collision of the vehicle, approach of a pedestrian or the like, or entry to the closed road on the basis of the obtained information and generate a warning signal. The warning signal may be, for example, a signal to generate warning sound or to light a warning lamp.

The audio image outputting unit 7670 transmits an output signal which is at least one of a voice or an image to an output device which can visually or auditorily notify information of the occupant of the vehicle or the outside of the vehicle. In the example in FIG. 50, an audio speaker 7710, a display unit 7720, and an instrument panel 7730 are exemplified as the output devices. The display unit 7720 may include, for example, at least one of an on-board display or a head-up display. The display unit 7720 may have an augmented reality (AR) display function. The output device may be a device other than the above devices, such as a wearable device such as a headphone, a glass-type display worn by the occupant, a projector, or a lamp. In a case where the output device is a display device, the display device visually displays the result obtained by various processing executed by the microcomputer 7610 or information received from the other control unit in various formats such as a text, an image, a chart, and a graph. Furthermore, in a case where the output device is a sound output device, the sound output device converts an audio signal including reproduced audio data, acoustic data, or the like into an analog signal and auditorily outputs the signal.

Note that, in the example illustrated in FIG. 50, at least two control units connected via the communication network 7010 may be integrated as a single control unit. Alternatively, each control unit may include a plurality of control units. Moreover, the vehicle control system 7000 may include other control unit which is not illustrated. Furthermore, in the above description, other control unit may have a part of or all of the function of any one of controls units. That is, if information can be transmitted and received via the communication network 7010, any one of the control units may execute predetermined operation processing. Similarly, a sensor or a device connected to any one of the control units may be connected to the other control unit, and the plurality of control units may transmit and receive detection information to/from each other via the communication network 7010.

Note that a computer program used to implement each function of the image processing system 10 may be mounted on any one of the control units and the like. Furthermore, a computer-readable recording medium storing such a computer program can be provided. The recording medium is, for example, a magnetic disk, an optical disk, a magneto-optical disk, a flash memory, and the like. Furthermore, the computer program may be distributed, for example, via a network, without using the recording medium.

In a case where the image processing system 10 is applied to the vehicle control system 7000 described above, for example, the imaging device 21 of the image processing system 10 corresponds to at least a part of the imaging unit 7410. Furthermore, integration of the reconstruction device 22, the storage device 23, the selection device the encoding device 25, the transmission and reception device 26, and the reproduction device 28 corresponds to the microcomputer 7610 and the storage unit 7690. The display device 29 corresponds to the display unit 7720. Note that, in a case where the image processing system 10 is applied to the integration control unit 7600, the network 27 is not provided, and the line-of-sight direction and the viewing position of the viewer are input through an operation on the input unit 7800 by the occupant who is the viewer. As described above, by applying the image processing system 10 to the integration control unit 7600 in the application example illustrated in FIG. 50, the display image displaying the object only in an area desired by the viewer can be displayed on the display unit 7720 and the like with high image quality (high resolution).

Furthermore, at least a part of components of the image processing system 10 may be implemented by a module for the integration control unit 7600 illustrated in FIG. 50 (for example, integrated circuit module including single die). Alternatively, the image processing system 10 may be implemented by the plurality of control units of the vehicle control system 7000 illustrated in FIG. 50.

Furthermore, a system means herein an assembly of a plurality of components (devices, modules (parts), and the like), and it is not considered whether or not all the components are in the same housing. Therefore, both of a plurality of devices respectively housed in different housings from each other and connected via the network and a single device having a plurality of modules housed in one housing are systems.

Note that the effects described herein are only exemplary and not limited to these. There may be an additional effect.

Furthermore, the embodiments of the present disclosure are not limited to the embodiments described above and can be variously changed without departing from the scope of the present disclosure.

For example, the present disclosure can have a configuration of cloud computing in which a single function is shared and jointly processed by a plurality of devices via a network.

Furthermore, each step described with reference to the above-mentioned flowchart can be performed by the single device and can be divided and performed by the plurality of devices.

Moreover, in a case where a plurality of processing is included in one step, the plurality of kinds of processing included in one step can be performed by the single device and can be divided and performed by the plurality of devices.

Note that, the present technology can have the configuration below.

(1)

An image processing apparatus including:

a 3D model selection unit configured to select an object that satisfies a predetermined condition from among objects of a plurality of 3D models; and a transmitter configured to transmit 3D model data of the selected object.

(2)

The image processing apparatus according to (1), in which the 3D model data includes data in a format in which color information of the object is expressed by a plurality of texture images imaged from a plurality of directions and geometry information of the object is expressed by a set of points or polygon meshes.

(3)

The image processing apparatus according to (1), in which the 3D model data includes data in a format in which color information of the object is expressed by a plurality of texture images imaged from a plurality of directions and geometry information of the object is expressed by a plurality of depth images storing distance information in association with a pixel value of the texture image.

(4)

The image processing apparatus according to any one of (1) to (3), in which the 3D model selection unit selects the object that satisfies the predetermined condition on the basis of object specification information for specifying a received object.

(5)

The image processing apparatus according to (4), in which the object specification information includes virtual camera viewing range information indicating a viewing range based on a point of view of a virtual camera.

(6)

The image processing apparatus according to (5), in which the 3D model selection unit determines whether or not the predetermined condition is satisfied according to whether or not a representative value of global position information of the object is included in the viewing range of the virtual camera.

(7)

The image processing apparatus according to (4), in which the object specification information includes information regarding an object ID of an object specified by a viewer as a display target.

(8)

The image processing apparatus according to any one of (1) to (7), further including:

an image selection unit configured to select only a texture image including the object from among the plurality of texture images of the selected object, in which the generated 3D model data includes the plurality of texture images imaged from a plurality of directions, and the transmitter transmits the texture image selected by the image selection unit as the texture image of the 3D model data.

(9)

The image processing apparatus according to (8), further including:

a cutting unit configured to cut the object part of the texture image selected by the image selection unit and generate a cutting image, in which the transmitter transmits the cutting image generated by the cutting unit as the texture image of the 3D model data.

(10)

The image processing apparatus according to any one of (4) to (9), in which the 3D model data includes data in a format is which the geometry information of the object is expressed by a set of points and the color information of the object is held in association with each of the points.

(11)

The image processing apparatus according to any one of (4) to (9), in which the 3D model data includes data in a format in which the geometry information of the object is expressed by polygon meshes and the color information of the object is held in association with each of the polygon meshes.

(12)

An image processing method including steps of:

by an image processing apparatus, selecting an object that satisfies a predetermined condition from among objects of a plurality of 3D models; and transmitting 3D model data of the selected object.

(13)

An image processing apparatus including:

a receiver configured to receive 3D model data of an object selected as the object that satisfies a predetermined condition from among the objects of a plurality of 3D models; and a drawing unit configured to generate a display image of the object from a point of view of a virtual camera on the basis of the received 3D model data of the object.

(14)

The image processing apparatus according to (13), in which the 3D model data includes data in a format in which color information of the object is expressed by a plurality of texture images imaged from a plurality of directions and geometry information of the object is expressed by a set of points or polygon meshes.

(15)

The image processing apparatus according to (13), in which the 3D model data includes data in a format in which the color information of the object is expressed by a plurality of texture images imaged from a plurality of directions and the geometry information of the object is expressed by a plurality of depth images storing distance information measured from the plurality of directions in association with a pixel value of the texture image.

(16)

The image processing apparatus according to any one of (13) to (15), further including:

a virtual point of view detection unit configured to generate virtual camera viewing range information indicating a viewing range based on a point of view of the virtual camera, in which the receiver further transmits the virtual camera viewing range information.

(17)

The image processing apparatus according to any one of (13) to (15), further including:

an input unit configured to receive specification of an object by a viewer as a display target, in which the receiver further transmits information regarding an object ID of the object specified by the input unit.

(18)

The image processing apparatus according to (13), in which the 3D model data includes data in a format in which the geometry information of the object is expressed by a set of points and the color information of the object is held in association with each of the points.

(19)

The image processing apparatus according to (13), in which the 3D model data includes data in a format in which the geometry information of the object is expressed by polygon meshes and the color information of the object is held is association with each of the polygon meshes.

(20)

An image processing method including steps of:

by as image processing apparatus, receiving 3D model data of as object selected as the object that satisfies a predetermined condition from among objects of a plurality of 3D models; and generating a display image of the object from a point of view of a virtual camera on the basis of the received 3D model data of the object.

REFERENCE SIGNS LIST

10 Image processing system
21-1 to 21-N Imaging device
22 Reconstruction device
23 Storage device
24 (24A to 24G) Selection device
26 Transmission and reception device
28 Reproduction device
29 Display device
41 Transmission and reception unit
43 Drawing unit
44 Virtual point of view detection unit
45 Input unit
61(61A, 61B) 3D model selection unit.
70 Virtual camera
81 Image selection unit
100 Cutting unit
101 Object area setting unit
102 Cutting image generation unit
300 Cutting image selection unit
301 Degree of importance setting unit
302 Reproduction data selection unit
320 Packing unit
321 Packing image generation unit
322 Metadata generation unit
421 Texture depth image selection unit
441 Texture depth cutting unit
900 Computer
901 CPU
902 ROM
903 RAM
906 Input unit
907 Output unit
908 Storage unit
909 Communication unit
910 Drive

The invention claimed is:

1. An image processing apparatus comprising:

a 3D model selection unit configured to select, from an entire 3D model data including a plurality of objects existing in an imaging space, at least one object of the plurality of objects that satisfies a predetermined condition;

an encoding unit configured to encode only the 3D model data of the at least one object that satisfies the predetermined condition; and a transmitter configured to transmit, to a reproduction apparatus, only the encoded 3D model data of the at least one object that satisfies the predetermined condition, wherein the 3D model selection unit and the encoding unit are each implemented via at least one processor.

2. The image processing apparatus according to claim 1, wherein the 3D model data includes data in a format in which color information of the object is expressed by a plurality of texture images imaged from a plurality of directions and geometry information of the object is expressed by a set of points or polygon meshes.

3. The image processing apparatus according to claim 1, wherein the 3D model data includes data in a format in which color information of the object is expressed by a plurality of texture images imaged from a plurality of directions and geometry information of the object is expressed by a plurality of depth images storing distance information in association with a pixel value of the texture image.

4. The image processing apparatus according to claim 1, wherein the 3D model selection unit is further configured to select the object that satisfies the predetermined condition on a basis of object specification information for specifying a received object.

5. The image processing apparatus according to claim 4, wherein the object specification information includes virtual camera viewing range information indicating a viewing range based on a point of view of a virtual camera.

6. The image processing apparatus according to claim 5, wherein the 3D model selection unit is further configured to determine whether or not the predetermined condition is satisfied according to whether or not a representative value of global position information of the object is included in the viewing range of the virtual camera.

7. The image processing apparatus according to claim 4, wherein the object specification information includes information regarding an object ID of an object specified by a viewer as a display target.

8. The image processing apparatus according to claim 1, further comprising:

an image selection unit configured to select only a texture image including the object from among a plurality of texture images of the selected object, wherein the 3D model data includes the plurality of texture images imaged from a plurality of directions, the transmitter is further configured to transmit the texture image selected by the image selection unit as the texture image of the 3D model data, and the image selection unit is implemented via at least one processor.

9. The image processing apparatus according to claim 8, further comprising:

a cutting unit configured to cut a part of the texture image selected by the image selection unit including the object and generate a cutting image, wherein the transmitter is further configured to transmit the cutting image generated by the cutting unit as the texture image of the 3D model data, and the cutting unit is implemented via at least one processor.

10. The image processing apparatus according to claim 1, wherein
the 3D model data includes data in a format in which geometry information of the object is expressed by a set of points and color information of the object is held in association with each of the points.

11. The image processing apparatus according to claim 1, wherein
the 3D model data includes data in a format in which geometry information of the object is expressed by polygon meshes and color information of the object is held in association with each of the polygon meshes.

12. An image processing method comprising:
by an image processing apparatus,
selecting, from an entire 3D model data including a plurality of objects existing in an imaging space, at least one object of the plurality of objects that satisfies a predetermined condition;
encoding only the 3D model data of the at least one object that satisfies the predetermined condition; and
transmitting, to a reproduction apparatus, only the encoded 3D model data of the at least one object that satisfies the predetermined condition.

13. An image processing apparatus comprising:
a transceiver configured to receive only encoded 3D model data of at least one object selected, from an entire 3D model data including a plurality of objects existing in an imaging space, as the at least one object of the plurality of objects that satisfies a predetermined condition;
a decoding unit configured to decode only the encoded 3D model data of the at least one object that satisfies the predetermined condition; and
a drawing unit configured to generate a display image of the at least one object from a point of view of a virtual camera on a basis of the received encoded 3D model data of the at least one object,
wherein the drawing unit and the decoding unit are each implemented via at least one processor.

14. The image processing apparatus according to claim 13, wherein
the 3D model data includes data in a format in which color information of the object is expressed by a plurality of texture images imaged from a plurality of directions and geometry information of the object is expressed by a set of points or polygon meshes.

15. The image processing apparatus according to claim 13, wherein
the 3D model data includes data in a format in which color information of the object is expressed by a plurality of texture images imaged from a plurality of directions and geometry information of the object is expressed by a plurality of depth images storing distance information measured from the plurality of directions in association with a pixel value of the texture image.

16. The image processing apparatus according to claim 13, further comprising:
a virtual point of view detection unit configured to generate virtual camera viewing range information indicating a viewing range based on a point of view of the virtual camera, wherein
the transceiver is further configured to transmit the virtual camera viewing range information, and
the virtual point of view detection unit is implemented via at least one processor.

17. The image processing apparatus according to claim 13, further comprising:
an input unit configured to receive specification of an object by a viewer as a display target, wherein
the transceiver is further configured to transmit information regarding an object ID of the object specified by the input unit, and
the input unit is implemented via at least one processor.

18. The image processing apparatus according to claim 13, wherein
the 3D model data includes data in a format in which geometry information of the object is expressed by a set of points and color information of the object is held in association with each of the points.

19. The image processing apparatus according to claim 13, wherein
the 3D model data includes data in a format in which geometry information of the object is expressed by polygon meshes and color information of the object is held in association with each of the polygon meshes.

20. An image processing method comprising:
by an image processing apparatus,
receiving only encoded 3D model data of at least one object selected, from an entire 3D model data including a plurality of objects existing in an imaging space, as the at least one object of the plurality of objects that satisfies a predetermined condition;
decoding only the encoded 3D model data of the at least one object that satisfies the predetermined condition; and
generating a display image of the at least one object from a point of view of a virtual camera on a basis of the received encoded 3D model data of the at least one object.

21. The image processing apparatus according to claim 1, wherein the at least one objected is selected based on vertex information included in the at least one object being projected on an image plane of the virtual camera.

* * * * *